(12) United States Patent
Hofmeister et al.

(10) Patent No.: US 10,159,926 B2
(45) Date of Patent: Dec. 25, 2018

(54) TUNABLE NANOFIBER FILTER MEDIA AND FILTER DEVICES

(71) Applicant: Ultra Small Fibers, LLC, Wartrace, TN (US)

(72) Inventors: William Hudson Hofmeister, Nashville, TN (US); Robert A. Van Wyk, St. Petersburg, FL (US); Keith Allen Holloway, Maryville, TN (US)

(73) Assignee: Ultra Small Fibers, LLC, Wartrace, TN (US)

( * ) Notice: Subject to any disclaimer, the term of this patent is extended or adjusted under 35 U.S.C. 154(b) by 286 days.

(21) Appl. No.: 15/260,677

(22) Filed: Sep. 9, 2016

(65) Prior Publication Data

US 2017/0072349 A1    Mar. 16, 2017

Related U.S. Application Data

(60) Provisional application No. 62/217,550, filed on Sep. 11, 2015.

(51) Int. Cl.
*B01D 63/00* (2006.01)
*B01D 63/08* (2006.01)
(Continued)

(52) U.S. Cl.
CPC ......... *B01D 46/526* (2013.01); *B01D 63/082* (2013.01); *B01D 67/0041* (2013.01);
(Continued)

(58) Field of Classification Search
None
See application file for complete search history.

(56) References Cited

U.S. PATENT DOCUMENTS

| 2,412,947 A | 12/1946 | Brant |
| 2,928,756 A | 3/1960 | Campbell |

(Continued)

OTHER PUBLICATIONS

Aguiar, H., et al., "Structural study of sol-gel silicate glasses by IR and Raman spectroscopies," J Non-Crystalline Solids, vol. 355, No. 8, pp. 475-480 (2009).

(Continued)

*Primary Examiner* — Ana M Fortuna
(74) *Attorney, Agent, or Firm* — Eric B. Fugett; Mark A. Pitchford; Pitchford Fugett, PLLC

(57) ABSTRACT

A tunable nanofiber filter device can include a filter housing defining an interior space, the housing having defined therein and inlet and an outlet, each in fluid communication with the interior space, and a plurality of filter laminas disposed within the interior space, each filter lamina including an upper surface, a lower surface, and an aperture defined therethrough. The plurality of filter laminas can be arranged in a stack wherein the opposing surfaces of adjacent filter laminas define a portion of an interlaminar flow space extending between the opposing surfaces. The flow space can be in fluid communication with the apertures of corresponding adjacent filter laminas to form a continuous flow passage extending through the lamina stack from the inlet to the outlet. An array nanofibers can extend into the flow passage from a portion of each filter lamina such that a fluid flowed through the flow passage flows across a portion of said array.

22 Claims, 76 Drawing Sheets

(51) Int. Cl.
B01D 46/52 (2006.01)
B01D 67/00 (2006.01)
(52) U.S. Cl.
CPC .... B01D 2239/025 (2013.01); B01D 2313/21 (2013.01); B01D 2325/08 (2013.01)

(56) References Cited

U.S. PATENT DOCUMENTS

| | | |
|---|---|---|
| 4,047,290 A | 9/1977 | Weitze et al. |
| 5,342,517 A | 8/1994 | Kopf |
| 7,319,069 B2 | 1/2008 | Den et al. |
| 7,545,010 B2 | 6/2009 | Ichihara et al. |
| 7,960,251 B2 | 6/2011 | Choi et al. |
| 2003/0168401 A1 | 9/2003 | Koslow |
| 2005/0011873 A1 | 1/2005 | Withford et al. |
| 2007/0056894 A1 | 3/2007 | Connors, Jr. |
| 2008/0257813 A1 | 10/2008 | Proulx et al. |
| 2008/0269685 A1 | 10/2008 | Singh et al. |
| 2009/0047478 A1 | 2/2009 | Zhang et al. |
| 2009/0229989 A1 | 9/2009 | Urgen et al. |
| 2009/0266418 A1 | 10/2009 | Hu et al. |
| 2010/0123885 A1 | 5/2010 | Kobrin |
| 2011/0043967 A1 | 2/2011 | Kim et al. |
| 2011/0195124 A1 | 8/2011 | Jin |
| 2012/0091072 A1 | 4/2012 | Kozlov et al. |
| 2013/0216779 A1 | 8/2013 | Hofmeister et al. |
| 2014/0287230 A1* | 9/2014 | Walls .................... C23C 16/403 428/338 |
| 2015/0093550 A1 | 4/2015 | Hofmeister et al. |
| 2015/0273403 A1* | 10/2015 | Yu ....................... B01D 67/0046 96/11 |
| 2016/0193555 A1* | 7/2016 | Park ..................... D04H 1/4374 55/486 |
| 2016/0367971 A1* | 12/2016 | Zhuo .................... B01J 37/0225 |

OTHER PUBLICATIONS

Almeida, R.M., et al., "Characterization of silica-gels by infrared reflection spectroscopy," J. Non-Crystalline Solids, vol. 121, p. 193-197. (1990).
Alves, N.M., et al., "Controlling Cell Behavior Through the Design of Polymer Surfaces," Small, vol. 6, No. 20, p. 2208-2220 (2010).
Apel, P., "Track etching technique in membrane technology," Radiation Measurements, vol. 34, p. 559-566 (2001).
Armani, D. and C. Liu, "Microfabrication technology for polycaprolactone, a biodegradable polymer," J Micromechanics and Microengineering, vol. 10, No. 1, p. 80-84 (2000).
Armani, D. and C. Liu. "Re-configurable Fluid Circuits by PDMS Elastomer Micromachining," in 12th International Conference on MEMS (1998).
Bailey, T., et al., "Step and flash imprint lithography: Template surface treatment and defect analysis," J Vacuum Sci. Tech. B, vol. 18, No. 6, p. 3572-3577 (2000).
Bates, F.S., "Polymer—polymer phase-behavior," Science, 1991. 251(4996): p. 898-905.
Becker, K., "Nuclear track registration in solids by etching," Biophysik, vol. 5, No. 3, p. 207-222 (1968).
Bei, J.Z., et al., "Polycaprolactone—poly(ethylene-glycol] block copolymer .4. Biodegradation behavior in vitro and in vivo," Polymers for Advanced Technologies, 1997. 8(11): p. 693-696.
Bettinger, CJ., et al., "Engineering Substrate Topography at the Micro- and Nanoscale to Control Cell Function," Angewandte Chemie International Edition, 2009. 48(30): p. 5406-5415.
Biname, F., et al., "What makes cells move: requirements and obstacles for spontaneous cell motility," Molecular BioSystems, 2010. 6(4): p. 648-661.
Biswas, A., et al., "Advances in top-down and bottom-up surface nanofabrication: Techniques, applications & amp; future prospects," Advances in Colloid and Interface Science, 2012. 170(1-2): p. 2-27.

Brown, L., et al., "Fabrication and characterization of poly(methyl methacrylate) microfluidic devices bonded using surface modifications and solvents," Lab on a Chip, 2006. 6(1): p. 66-73.
Burneau, A and C. Carteret, "Near infrared and ab initio study of the vibrational modes of isolated silanol on silica," Physical Chemistry Chemical Physics, 2000. 2(14): p. 3217-3226.
Cabrini, S., et al., "Focused ion beam lithography for two dimensional array structures for photonic applications," Microelectronic Engineering, 2005. 78-79: p. 11-15.
Ceriotti, L., et al., "Rectangular channels for lab-on-a-chip applications," Microelectronic Engineering, 2003. 67-8: p. 865-871.
Chang, Y., et al., "A simple method for fabrication of highly ordered porous alpha alumina ceramic membranes," J. of Materials Chem., 2012. 22(15): p. 7445-7448.
Chao Wei, T., Y. et al., "Innovative through-silicon-via formation approach for wafer-level packaging applications," J. of Micromechanics and Microengineering, 2012. 22(4): p. 045019.
Chemical Forums. http://www.chemicalforums.com/index.php?topic=27483.0. Jul. 10 2008 to Feb. 3, 2010.
Chen, Y.F., et al., "Electrochemical polymerization and characterization of polypyrrole nanowires and nanotubules," Physica B-Condensed Matter, 2010. 405(10): p. 2461-2465.
Choi, C.-H., et al., "Cell interaction with three-dimensional sharp-tip nanotopography," Biomaterials, 2007. 28(9): p. 1672-1679.
Chou, S.Y. and P.R. Krauss, "Imprint lithography with sub-10 nm feature size and high throughput," Microelectronic Engineering, 1997. 35(1-4): p. 237-240.
Chou, S.Y., "Patterned magnetic nanostructures and quantized magnetic disks," Proceedings of the LEEE, 1997. 85(4): p. 652-671.
Chris, B.S., et al., "Laser-induced breakdown and damage in bulk transparent materials induced by tightly focused femto second laser pulses," Measurement Science and Technology, 2001. 12(11): p. 784.
Chuang, W.Y., et al., "Properties of the poly(vinyl alcohol)/chitosan blend and its effect on the culture of fibroblast in vitro," Biomaterials, 1999. 20(16): p. 14 79-1487.
Chung, C.K., et al., "Effects of temperature and voltage mode on nanoporous anodic aluminum oxide films by one-step anodization," Thin Solid Films, 2011. 520r51: o. 1554-1558.
Clark, P., et al., "Topographical Control of Cell Behavior .2. Multiple Grooved Substrata," Development, 1990. 108(4): p. 635-644.
Clark, P., et al., "Topographical Control of Cell Behavior .1. Simple Step Cues," Development, 1987. 99(3): p. 439-448.
Cooper, J.A., "The Role of Actin Polymerization in Cell Motility," Annual Review of Physiology, 1991. 53(1): p. 585-605.
Costa, L., et al., "Femtosecond laser machined microfluidic devices for imaging of cells during chemotaxis," J. Laser Applications, 2011. 23(4).
Courvoisier, F., et al., Applications of femtosecond Bessel beams to laser ablation. Applied Physics A, 2012: p. 1-6.
Courvoisier, F., et al., "Surface nanoprocessing with nondiffracting femtosecond Bessel beams," Optics Letters, 2009. 34(20): p. 3163-3165.
Crespi, A.,Et al., "Three-dimensional Mach-Zehnder interferometer in a microfluidic chip for spatially-resolved label-free detection," Lab on a Chip, 2010. 10(9): p. 1167-1173.
Cui, Y., et al., "Nanowire nanosensors for highly sensitive and selective detection of biological and chemical species," Science, 2001. 293(5533): p. 1289-1292.
Curtis, A and C. Wilkinson, "Topographical control of cells," Biomaterials, 1997. 18(24): p. 1573-1583.
Curtis, A.S.G. and M. Varde, "Control of Cell Behavior—Topological Factors," J. Nat'l Cancer Inst., 1964. 33(1): p. 15-26.
De Leo, M., et al., "Towards a better understanding of gold electroless deposition in track-etched templates," Chemistry of Materials, 2007. 19(24): p. 5955-5964.
De, M., et al., "Applications of Nanoparticles in Biology," Advanced Materials, 2008. 20(22): p. 4225-4241.
DellaVolpe, C., S. at al., "A comparative analysis of surface structure and surface tension of hybrid silica films," J. Non-Crystalline Solids, 1997. 209(1-2): p. 51-60.

(56) References Cited

OTHER PUBLICATIONS

Delobelle, B., et al., "A detailed study through the focal region of near-threshold single-shot femtosecond laser ablation nano-holes in borosilicate glass," Optics Communications, 2011. 284: p. 5746-5757.
Dobos, AM., et al., "Surface properties and biocompatibility of cellulose acetates," J. App. Polymer Sci., 2012. 125r41: p. 2521-2528.
Dowell, W.C.T., "Carbon-stabilized collodion substrates for electron microscopy," J. App. Physics, 1957. 28(5): p. 634-635.
Du, D., et al., "Laser-induced breakdown by impact ionization in sio2 with pulse widths from 7 ns to 150fs," App. Phys. Lett., 1994. 64(23): p. 3071-3073.
Duan, X. and C.M. Lieber, "General Synthesis of Compound Semiconductor Nanowires," Advanced Materials, 2000. 12(4): p. 298-302.
Dunn, G.A. and J.P. Heath, "New Hypothesis of Contact Guidance in Tissue- Cells," Experimental Cell Research, 1976. 101(1): p. 1-14.
Eigler, D.M. and E.K. Schweizer, "Positioning single atoms with a scanning tunneling microscope," Nature, 1990, 344(6266): p. 524-526.
Ekblom, P., et al., "Cell-matrix interactions and cell adhesion during development," Annu Rev Cell Biol, 1986. 2: p. 27-47.
Feng, Z.S., et al., "A novel humidity sensor based on alumina nanowire films," J. Physics D-Applied Physics, 2012. 45(22).
Ferrari, M., "Cancer nanotechnology: Opportunities and challenges," Nature Reviews Cancer, 2005. 5(3): p. 161-171.
Feynman, R.P., "There's plenty of room at the bottom," Eng. Sci., vol. 23, No. 5, pp. 22-36 (1960).
Feynman, R.P., "There's plenty of room at the bottom [data storage]," J. Microelectromechanical Systems, 1992. 1(1): p. 60-66.
Fischer, B.E. and R. Spohr, "Production and use of nuclear tracks—imprinting structure on solids," Reviews of Modern Physics, 1983. 55(4): p. 907-948.
Fisher, I.,et al., "Dielectric property-microstructure relationship for nanoporous silica based thinfilms," J. App. Phys., 2004. 95(10): p. 5762-5767.
Fleischer, R.L., et al., "Particle track identification—application of a new technique to apollo helmets," Science, 1970. 170(3963): p. 1189-91
Flory, "The configuration of real polymer chains," J. Chem. Phys., vol. 17, No. 3, pp. 303-310 (1949).
Gates, B.D., et al., "Unconventional nanofabrication," Ann. Rev. Mat. Res., 2004. 34: p. 339-372.
Gattass, R.R. and E. Mazur, "Femtosecond laser micromachining in transparent materials," Nature Photonics, 2008. 2(4): p. 219-225.
Geiger, B., et al., "Environmental sensing through focal adhesions," Nat. Rev. Mol. Cell Biol., 2009. 10(1): p. 21-33.
Ghibaudo, M., et al., "Mechanics of cell spreading within 3D-micropatterned environments," Lab on a Chip, 2011. 11(5): p. 805-812.
Ghibaudo, M., et al., "Substrate Topography Induces a Cross over from 2D to 3D Behavior in Fibroblast Migration," Biophys. J., 2009. 97(1): p. 357-368.
Gil, E.S. and S.M. Hudson, "Stimuli-reponsive polymers and their bioconjugates," Progress in Polymer Science, 2004. 29(12): p. 1173-1222.
Glezer, E.N ., et al., "Three-dimensional optical storage inside transparent materials," Opt. Lett., 1996. 21(24): p. 2023-2025.
Glezer, E.N. and E. Mazur, "Ultrafast-laser driven micro-explosions in transparent materials," Applied Physics Letters, 1997. 71(7): p. 882-884.
Green, AM., et al., "Fibroblast response to microtextured silicone surfaces: Texture orientation into or out of the surface," J. of Biomed. Mat. Res., 1994. 28(5): p. 647-653.
Grier, D.G., "A revolution in optical manipulation," Nature, 2003. 424(6950): p. 810-816.
Griffith, G.W., "Quantitation of silanol in silicones by FTIR spectroscopy," Industrial & Engineering Chemistry Product Research and Development, 1984. 23(4): p. 590-593.
Gudiksen, M.S., et al., "Growth of nanowire superlattice structures for nanoscale photonics and electronics," Nature, 2002. 415(6872): p. 617-620.
Guo, L.J., "Nanoimprint lithography: Methods and material requirements," Advanced Materials, 2007. 19(4): p. 495-513.
Guo, L.J., P.R. Krauss, and S.Y. Chou, Nanoscale silicon field effect transistors fabricated using imprint lithography. Applied Physics Letters, 1997. 71(13): p. 1881-1883.
Guo, L.J., "Recent progress in nanoimprint technology and its applications," J. Physics D-Applied Physics, 2004. 37(11): p. R123-R141.
Guo, X.M., et al., "Synthesis and characterization of carbon sphere-silica coreshell structure and hollow silica spheres," Colloids and Surfaces a—Physicochemical and Engineering Aspects, 2009. 345(1-3): p. 141-146.
Gwyn, C.W., et al., "Extreme ultraviolet lithography," J. Vacuum Sci. & Tech. B, 1998. 16(6): p. 3142-3149.
Harrison, R.G., "The cultivation of tissues in extraneous media as a method of morphogenetic study," Anatomical Record, 1912. 6(4): p. 181-193.
Harrison, R.G., "The reaction of embryonic cells to solid structures," J. Exp. Zoology, 1914. 17(4): p. 521-544.
Hatton, B., et al., "Low-temperature synthesis of nanoscale silica multilayers—atomic layer deposition in a test tube," J. Mat. Chem., 2010. 2or29): p. 6009-6013.
Heidari, B., et al., "Large scale nanolithography using nanoimprint lithography," J. Vacuum Sci. & Tech. B, 1999. 17(6): p. 2961-2964.
Hench, L.L., "Sol-gel materials for bioceramic applications," Curr. Op. Solid State & Mat. Sci., 1997. 2(5): p. 604-610.
Herbstman, J.F. and A.J. Hunt, "High-aspect ratio nanochannel formation by single femtosecond laser pulses," Optics Express, 2010. 18(16): p. 16840-16848.
Higgins, J. S., et al., "Studies of cyclic and linear poly(dimethyl siloxanes): 3. Neutron scattering measurements of the dimensions of ring and chain polymers," Polymer, vol. 20, No. 5, pp. 553-558 (1979).
Hiralal, P., et al., "Nanowires for energy generation," Nanotechnology, 2012. 23(19).
Ho, C. M. and Y. C. Tai, "Micro electro mechanical systems (MEMS) and fluid flows," Ann. Rev. Fluid Mech., vol. 30, No. 1, pp. 579-612 (1998).
Hoffman-Kim, D., et al., "Topography, Cell Response, and Nerve Regeneration," in Ann. Rev. Biomed. Eng., vol. 12, M.L. Yarmush, J.S. Duncan, and M.L. Grav, Editors. 2010, Annual Reviews: Palo Alto. p. 203-231.
Hofman, R., et al., "FTIR and XPS studies on corrosion-resistant Si02 coatings as a function of the humidity during deposition," Surface and Interface Analysis, 1996. 24(1): p. 1-6.
Huang, X.H., et al., "Gold Nanorods: From Synthesis and Properties to Biological and Biomedical Applications," Adv. Mat., 2009. 21(48): p. 4880-4910.
Hulteen, J.C. and C.R. Martin, "A general template-based method for the preparation of nanomaterials," J. Mat. Chem., 1997. 7(7): p. 1075-1087.
International Search Report dated Dec. 8, 2016 in corresponding PCT Pat. Application No. PCT/US2016/051171.
Jager, M. and A. Wilke, "Comprehensive biocompatibility testing of a new PMMAHA bone cement versus conventional PMMA cement in vitro," J. Biomat. Sci.-Polymer Edition, 2003. 14(11): p. 1283-1298.
Judeinstein, P. and C. Sanchez, "Hybrid organic-inorganic materials: A land of multi-disciplinarity," J. Mat. Chem., 1996. 6(4): p. 511-525.
Kamiya, K., et al., "Comparative study of structure of silica gels from different sources," Journal of Sol-Gel Science and Technology, 2000. 19(1-3): p. 495-499.
Keldysh, L.V., "Ionization in the field of a strong electromagnetic wave," Soviet Physics JETP, 1965. 20: p. 1307-1314.
Keller, A. and A. O'Connor, "A study on the relation between chain folding and chain length in polyethylene," Polymer, vol. 1, No. 2, pp. 163-168 (1960).

(56) References Cited

OTHER PUBLICATIONS

Kesting, R.E., et al., "Vincent, Semipermeable membranes of cellulose acetate for desalination in process of reverse osmosis .2. Parameters affecting membrane gel structure," J. App. Polymer Sci., 1965.9(5): p. 1873-&.
Kim, S.B., et al., "The characteristics of a hydroxyapatite-chitosan-PMMA bone cement," Biomaterials, 2004. 25(26): p. 5715-5723.
Kiyama, S., et al., "Examination of Etching Agent and Etching Mechanism on Femtosecond Laser Microfabrication of Channels Inside Vitreous Silica Substratest," J. Phys Chem. C, 2009. 113r271: p. 11560-11566.
Klank, H., et al., "CO2-laser micromachining and back-end processing for rapid production of PMMA-based microfluidic systems," Lab on a Chip, 2002. 2(4): p. 242-246.
Klaus, J.W., et al., "Growth of Si02 at room temperature with the use of catalyzed sequential half-reactions," Science, 1997, vol. 278, No. 5354, p. 1934-1936.
Knopp, D., et al., "Bioanalytical applications of biomolecule-functionalized nanometer-sized doped silica particles," Analytica Chimica Acta, 2009. 647(1): p. 14-30.
Kobayashi, Y., et al., "Silica coating of silver nanoparticles using a modified Stober method," J. Colloid and Interface Science, 2005. 283(2): p. 392-396.
Kong, D., et al., "Topological Insulator Nanowires and Nanoribbons," Nano Letters, 2009. 10(1): p. 329-333.
Kong, L.S., et al., "Writing and reading 7.5 Gbits/in(2) longitudinal quantized magnetic disk using magnetic force microscope tips," Leee Transactions on Magnetics, 1997, vol. 33, No. 5, p. 3019-3021.
P. R. Krauss and S. Y. Chou, "Nano-compact disks with 400 Gbit/in(2) storage density fabricated using nanoimprint lithography and read with proximal probe," Appl. Phys. Lett., vol. 71, p. 3174-3176 (1997).
Kriegel, R.J., et al., "Cranioplasty for large skull defects with PMMA (polymethylmethacrylate) or Tutoplast((R)) processed autogenic bone grafts," Zentralblatt Fur Neurochirurgie, 2007. 68(4): p. 182-189.
Kyotani, T., et al., "Chemical modification of carbon-coated anodic alumina films and their application to membrane filter," J. Membrane Science, 2002. 196(2): p. 231-239.
Labet, M. and W. Thielemans, "Synthesis of polycaprolactone: a review," Chemical Society Reviews, 2009. 38(12): p. 3484-3504.
Lebib, A., et al., "Nanoimprint lithography for a large area pattern replication," Microelectronic Engineering, 1999. 46(1-4): p. 319-322.
Lee, K., et al., "Self-Ordered, Controlled Structure Nanoporous Membranes Using Constant Current Anodization," Nano Letters, 2008. 8(12): p. 4624-4629.
Lee, M.-H., et al., "Fabrication of ultra-high-density nanodot array patterns (-3 Tbits/in.[sup 2]) using electron-beam lithography," J. Vacuum Sci. & Tech. B: Microelectronics and Nanometer Structures, 2011. 29(6): p. 061602-5.
Lee, W., et al., "Fast fabrication of long-range ordered porous alumina membranes by hard anodization," Nature Materials, 2006. 5(9): p. 741-747.
Lee, W., et al., "Structural engineering of nanoporous anodic aluminium oxide by pulse anodization of aluminium," Nature Nanotechnology, 2008. 3(4): p. 234-239.
Leitao, D.C., et al., "Nanoscale Topography: A Tool to Enhance Pore Order and Pore Size Distribution in Anodic Aluminum Oxide," J. Phys. Chem. C, 2011. 115(17): p. 8567-8572.
Li, AP., et al., "Hexagonal pore arrays with a 50-420 nm interpore distance formed by self-organization in anodic alumina," J. App. Phys., 1998. 84(11): p. 6023-6026.
Li, F.Y., et al., "On the growth of highly ordered pores in anodized aluminum oxide," Chemistry of Materials, 1998. 10(9): p. 2470-2480.
Li, H.W., et al., "Nanocontact printing: A route to sub-SO-nm-scale chemical and biological patterning. Langmuir," 2003. 19(6): p. 1963-1965.
Li, S.M., et al., "Enzymatic degradation of block copolymers prepared from epsilon-caprolactone and poly( ethylene glycol)," Biomacromolecules, 2002. 3(3): p. 525-530.
Li, Y., et al., "Formation and microstructures of unique nanoporous AAO films fabricated by high voltage anodization," J. Mat. Chem., 2011. 21(26): p. 9661-9666.
Li, Y., et al., "Novel AAO films and hollow nanostructures fabricated by ultra-high voltage hard anodization," Chem. Comms., 2010. 46(2): p. 309-311.
Liang, D., B.S. Hsiao, and B. Chu, Functional electrospun nanofibrous scaffolds for biomedical applications. Advanced Drug Delivery Reviews, 2007. 5WI4): p. 1392-1412.
Liong, M., et al., Multifunctional inorganic nanoparticles for imaging, targeting, and drug delivery. Acs Nano, 2008. 2(5): p. 889-896.
Liu, S.H., et al., "Gram-scale synthesis and biofunctionalization of silica-coated silver nanoparticles for fast colorimetric DNA detection," Analytical Chem., 2005. 77(8): p. 2595-2600.
Long, Z.J. and W.-K. Liu, "Keldysh theory of strong-field ionization," Canadian J. Phys., 2010. 88(4): p. 227-245.
Lord, M.S., et al., "Influence of nanoscale surface topography on protein adsorption and cellular response," Nano Today, 2010. 5(1): p. 66-78.
Luckarift, H.R., et al., "Enzyme immobilization in a biomimetic silica support," Nature Biotechnology, 2004. 22(2): p. 211-213.
Lutolf, M.P. and J.A. Hubbell, "Synthetic biomaterials as instructive extracellular microenvironments for morphogenesis in tissue engineering," Nature Biotechnology, 2005. 23(1): p. 47-55.
Ma, D.L., et al., "Multifunctional nano-architecture for biomedical applications," Chemistry of Materials, 2006. 18(7): p. 1920-1927.
Madani-Grasset and Bellouard, "Femtosecond laser micromachining of fused silica molds," Optics Express, vol. 18, No. 21, p. 21826-21840 (2010).
Majumdar, J.D. and I. Manna, "Laser processing of materials," Sadhana-Academy Proceedings in Engineering Sciences, 2003. 28: p. 495-562.
Makhija, S.N. and P.R. Vavia, "Controlled porosity osmotic pum p-based controlled release systems of pseudoephedrine—I. Cellulose acetate as a semipermeable membrane," J. Controlled Release, 2003. 89(1): p. 5-18.
Mark James, E., "Overview of Siloxane Polymers, in Silicones and Silicone-Modified Materials," 2000, Am. Chem. Soc. p. 1-10.
Marrian, C.R.K. and D.M. Tennant, "Nanofabrication," J. Vacuum Sci. & Tech. A: Vacuum, Surfaces, and Films, 2003. 21(5): p. S207-S215.
Marrian, C.R.K. and E.S. Snow, "Proximal probe lithography and surface modification," Microelectronic Engineering, 1996. 32(1-4): p. 173-189.
Martina, M. and D.W. Hutmacher, "Biodegradable polymers applied in tissue engineering research: a review," Polymer Int., 2007. 56(2): p. 145-157.
Masuda, H. and K. Fukuda, "Ordered metal nanohole arrays made by a 2-step replication of honeycomb structures of anodic alumina," Science, 1995. 268(5216): p. 1466-1468.
Masuda, H., et al., "Highly ordered nanochannel-array architecture in anodic alumina," Applied Physics Letters, 1997. 71(19): p. 2770-2772.
Masuda, H., et al., "Self-ordering of cell arrangement of anodic porous alumina formed in sulfuric acid solution," J. Electrochemical Society, 1997. 144(5): p. L127-L130.
Masuda, H., et al., "Self-ordering of cell configuration of anodic porous alumina with large-size pores in phosphoric acid solution," Japanese J. Appl. Phys. Part 2-Letters, 1998. 37(11A): p. L1340-L1342.
Mata, A., et al, "Characterization of polydimethylsiloxane (PDMS) properties for biomedical micro/nanosystems," Biomedical Microdevices, 2005. 7(4): p. 281-293.
McAlpine, M.C., et al., "Nanoimprint lithography for hybrid plastic electronics," Nano Letters, 2003. 3(4): p. 443-445.
McDonald, J.C., et al., "Fabrication of microfluidic systems in poly(dimethylsiloxane)," Electrophoresis, 2000. 21(1): p. 27-40.
McKellop, H., et al., "Development of an extremely wear-resistant ultra high molecular weight polyethylene for total hip replacements," J. Orthopaedic Res., 1999. 17(2): p. 157-167.

(56) References Cited

OTHER PUBLICATIONS

Mendonca, C.R., et al., "Femtosecond laser waveguide micromachining of PM MA films with azoaromatic chromophores," Optics Express, 2008. 16(1): p. 200-206.
Mohamed, K. and A. Mohamad, "A review of the development of hybrid atomistic—continuum methods for dense fluids," Microfluidics and Nanofluidics, vol. 8, No. 3, pp. 283-302 (2010).
Morales, A.M. and C.M. Lieber, "A Laser Ablation Method for the Synthesis of Crystalline Semiconductor Nanowires," Science, 1998. 279(5348): p. 208-211.
Mou, L., et al., "Copolymer of star poly(epsilon-caprolactone] and polyglycidols as potential carriers for hydrophobic drugs," Polymers for Adv. Tech., 2012. 23(4): p. 748-755.
Muench, F., et al., "Fabrication of porous rhodium nanotube catalysts by electroless plating," J. Mat. Chem., 2012. 22(25): p. 12784-12791.
Nagayama, H., et al., "A New Process for Silica Coating," J. Electrochemical Society, 1988. 135(8): p. 2013-2016.
Nakamura, M., et al., "Infrared absorption spectra and compositions of evaporated silicon oxides (SiOx)," Solid State Comms., 1984. 50(12): p. 1079-1081.
Ng, C. and K. Yu, "Proliferation of Epithelial Cells on PDMS Substrates with Micropillars Fabricated with Different Curvature Characteristics," Biointerphases, 2012. 7(1): p. 1-8.
Nielsch, K., et al., "Self-ordering regimes of porous alumina: The 10% porosity rule," Nano Letters, 2002. 2(7): p. 677-680.
Noh, K., et al., "Guided nanostructures using anodized aluminum oxide templates," Nano, 2011. 6(6): p. 541-555.
Norman, J. and T. Desai, "Methods for fabrication of nanoscale topography for tissue engineering scaffolds," Annals of Biomed. Eng., 2006. 34(1): p. 89-101.
Nuttelman, C.R., et al., "Attachment of fibronectin to poly (vinyl alcohol) hydrogels promotes NIH3T3 cell adhesion, proliferation, and migration," J. Biomed. Mat. Res., 2001. 57(2): p. 217-223.
Ohara, P.T. and R.C. Buck, "Contact guidance in vitro: A light, transmission, and scanning electron microscopic study," Exp. Cell Res., 1979. 121(2): p. 235-249.
Pai, P.G., et al., "Infrared spectroscopic study of siox films produced by plasma enhanced chemical vapor-deposition," J. Vacuum Sci. & Tech. A-Vacuum Surfaces and Films, 1986. 4(3): p. 689-694.
Paradossi, G., et al., "Poly(vinyl alcohol) as versatile biomaterial for potential biomedical applications," J. Mat. Sci.—Materials in Medicine, 2003. 14(8): p. 687-691.
Parito et al., "Photolithographically Patterned Surface Modification of Poly(dimethylsiloxane) via UV-Initiated Graft Polymerization of Acrylates," 2006, Langmuir, vol. 22, p. 3453-3455.
Pasquarello, A and R. Car, "Dynamical charge tensors and infrared spectrum of amorphous Si02," Phys. Rev. Lett., 1997. 79[9]: p. 1766-1769.
Pearson, D.H. and R.J. Tonucci, "Nanochannel glass replica membranes," Science, 1995. 270(5233): p. 68-70.
Pearson, D.H. and R.J. Tonucci, "Parallel patterning with nanochannel glass replica membranes," Adv. Mat., 1996. 8(12): p. 1031-1034.
Penano, J.R., et al., "Transmission of intense femtosecond laser pulses into dielectrics," Phys. Rev. E, 2005. 72(3): p. 036412.
Piner, R.D., et al., "'Dip-pen' nanolithography," Science, 1999. 283(5402): p. 661-663.
Priezjev, N. V., et al., "Slip behavior in liquid films on surfaces of patterned wettability: Comparison between continuum and molecular dynamics simulations," Phys. Rev. E, vol. 71, No. 4, p. 041608 (2005).
Qin, D., et al., "Soft lithography for micro- and nanoscale patterning," Nature Protocols, 2010. 5(3): p. 491-502.
Raimondo, T., et al., "Greater osteoblast and endothelial cell adhesion on nanostructured polyethylene and titanium," Int. J. Nanomed., 2010. 5: p. 647-652.
Ramanathan, K., et al., "Individually Addressable Conducting Polymer Nanowires Array," Nano Letters, 2004. 4[7]: p. 1237-1239.
Ross, A.M., et al., "Physical Aspects of Cell Culture Substrates: Topography, Roughness, and Elasticity," Small, 2012. 8(3): p. 336-355.
Santos, A., et al., "Nanoporous anodic alumina obtained without protective oxide layer by hard anodization," Materials Lett., 2012. 67(1): p. 296-299.
Santra, S., et al., "Synthesis and characterization of silica-coated iron oxide nanoparticles in microemulsion: The effect of nonionic surfactants," Langmuir, 2001. 17(10): p. 2900-2906.
Sarkany, J., "Effects of water and ion-exchanged counterion on the FTIR spectra of ZSM-5. I. NaH-ZSM-5: H-bonding with OH groups of zeolite and formation of H+(H20)(n)," Applied Catalysis A-General, 1999. 188(1-2): p. 369-379.
Schaffer, C.B., et al., "Morphology of femtosecond laser induced structural changes in bulk transparent materials," Appl. Phys. Lett., 2004. 84(9): p. 1441-1443.
Schroedter, A., et al., "Biofunctionalization of silica-coated CdTe and gold nanocrystals," Nano Letters, 2002. 2(12): p. 1363-1367.
Schwirn, K., et al., "Self-ordered anodic aluminum oxide formed by H2S04 hard anodization," Acs Nano, 2008. 2(2): p. 302-310.
Scott, D.B. and R.W.G. Wyckoff, "Electron microscopy of tooth structure by the shadowed collodion replica method," Public Health Reports, 1947. 62(42): p. 1513-1516.
Selvan, S.T., et al., "Functional and Multifunctional Nanoparticles for Bioimaging and Biosensing," Langmuir, 2010. 26(14): p. 11631-11641.
Shinoda, M., et al., "Femtosecond laser-induced formation of nanometer-width grooves on synthetic single-crystal diamond surfaces," J. App. Phys., 2009. 105(5): p. 053102-4.
Singhvi, R., et al., "Effects of substratum morphology on cell physiology," Biotech. Bioeng., 1994, vol. 43, No. 8, p. 764-771.
Smith, H.J., et al., "X-ray nanolithography: Extension to the limits of the lithographic process," Microelectronic Engineering, 1996. 32(1-4): p. 143-158.
Squires and Quake, "Microfluidics: fluid physics at the nanoliter scale," Rev. Mod. Phys., vol. 77, No. 3, pp. 977-1026 (2005).
Stevens, M.M. and J.H. George, "Exploring and Engineering the Cell Surface Interface," Science, 2005. 310(5751): p. 1135-1138.
Stewart, M.D. and C.G. Willson, "Imprint materials for nanoscale devices," Mrs Bulletin, 2005. 30(12): p. 947-951.
Stokes Equations, https://en.wikipedia.org/wiki/Navier%E2%80%93Stokes_equations, last accessed Nov. 30, 2016.
Su, W.T., et al., "Micropillar substrate influences the cellular attachment and laminin expression," J. Biomed. Mat. Res. Part A, 2010. 93A(4): p. 1463-1469.
Sun, L., et al., "Fabrication of nanoporous single crystal mica templates for electrochemical deposition of nanowire arrays," J. Mat. Sci., 2000. 35(5): p. 1097-1103.
Sun, Y.G. and J.A. Rogers, "Inorganic semiconductors for flexible electronics," Adv. Materials, 2007. 19(15): p. 1897-1916.
Taepaiboon, P., et al., "Vitamin-loaded electrospun cellulose acetate nanofiber mats as transdermal and dermal therapeutic agents of vitamin A acid and vitamin E," Euro J. Pharmaceutics and Biopharmaceutics, 2007. 67(2): p. 387-397.
Tan, H., et al., "Roller nanoimprint lithography," J. Vacuum Sci. & Tech. B, 1998. 16(6): p. 3926-3928.
Tan, W.H., et al., "Bionanotechnology based on silica nanoparticles," Med. Res. Rev., 2004. 24(5): p. 621-638.
Thompson, E.W. and D.F. Newgreen, "Carcinoma invasion and metastasis: A role for epithelial-mesenchymal transition?" Cancer Res., 2005, vol. 65, No. 14, p. 5991-5995.
Tonucci, R.J., et al., "Nanochannel Array Glass," Science, 1992. 258(5083): p. 783-785.
Torres, A.J., et al., "Nanobiotechnology and Cell Biology: Micro- and Nanofabricated Surfaces to Investigate Receptor-Mediated Signaling," Ann. Rev. Biophys., 2008, vol. 37, No. 1, p. 265-288.
Vajandar, S.K., et al., "Si02-coated porous anodic alumina membranes for high flow rate electroosmotic pumping," Nanotechnology, 2007. 18(27).
Van Kan, J.A., et al., "Three-dimensional nanolithography using proton beam writing," App. Phys. Lett., 2003, vol. 83, No. 8, p. 1629-1631.

(56) References Cited

OTHER PUBLICATIONS

Vazquez, R.M., et al., "Integration of femtosecond laser written optical wave guides in a lab-on-chip," Lab Chip, 2009, p. 91-96.
Wang, C.G., et al., "Synthesis, assembly, and biofunctionalization of silica-coated gold nanorods for colorimetric biosensing," Advanced Functional Materials, 2006. 16(13): p. 1673-1678.
Weiss, P., "Experiments on cell and axon orientation in vitro: The role of colloidal exudates in tissue organization," J. Exp. Zoology, 1945. 100(3): p. 353-386.
White et al., "Single-pulse ultrafast-laser machining of high aspect nanoholes at the surface of Si02," Optics Express, vol. 16, No. 19, p. 14411-14420 (2008).
Whitesides, G.M., et al., "Soft lithography in biology and biochemistry," Ann. Rev. Biomed. Eng., 2001, vol. 3, p. 335-373.
Whitney, T.M., et al., "Fabrication and magnetic-properties of arrays of metallic nanowires," Science, 1993. 261(5126): p. 1316-1319.
Woldering, L.A., et al., "Periodic arrays of deep nanopores made in silicon with reactive ion etching and deep UV lithography," Nanotechnology, 2008. 19(14).
Wolfe, J.C. and B.P. "Craver, Neutral particle lithography: a simple solution to charge-related artefacts in ion beam proximity printing," J. Phys. D—Appl. Phys., 2008. 41(2).
Written Opinion dated Dec. 8, 2016 in corresponding PCT Pat. Application No. PCT/US2016/051171.
Wu, Y., et al., "Superconducting Mg B2 Nanowires," Advanced Materials, 2001. 13(19): p. 1487-1489.
Xia, Y.N. and G.M. Whitesides, Soft lithography. Annual Review of Materials Science, 1998. 28: p. 153-184.
Xia, Y.N., et al., "One-dimensional nanostructures: Synthesis, characterization, and applications," Advanced Materials, 2003. 15(5): p. 353-389.
Xia, Y.N., et al., "Unconventional methods for fabricating and patterning nanostructures," Chemical Reviews, 1999. 99(7): p. 1823-1848.
Xu, C.L., et al., "Electrodeposition of ferromagnetic nanowire arrays on AAO/ Ti/Si substrate magnetic storage devices," Materials Letters, 2006. 60(19): p. 2335-2338.
Yang, Y., et al., "Lipid coated mesoporous silica nanoparticles as photosensitive drug carriers," Physical Chemistry Chemical Physics, 2010. 12(17): p. 4418-4422.
Youn Sang Kim et al. "High density nanostructure transfer in soft molding using polyurethane acrylate molds and polyelectrolyte multilayers," Nanotech., vol. 14, No. 10, pp. 1140-1144 (2003).
Young, D.A., "Etching of radiation damage in lithium fluoride," Nature, 1958. 182(4632): p. 375-377.
Young, G.B., et al., "A comparison of subdermal wire electrodes with collodion applied disk electrodes in long-term EEG recordings in ICU," Clinical Neurophysiology, 2006. 117(6): p. 1376-1379.
Zach, M.P., et al., "Molybdenum Nanowires by Electrodeposition," Science, 2000. 290(5499): p. 2120-2123.
Zalloum, O.H.Y., et al., "An amplified femtosecond laser system for material micro-/nanostructuring with an integrated Raman microscope," Review of Scientific Instruments, 2010. 81(5).
Zalloum, O.H.Y., et al., "On femtosecond micromachining of HPHT single-crystal diamond with direct laser writing using tight focusing," Optics Express, 2010. 18(12): p. 13122-13135.

\* cited by examiner

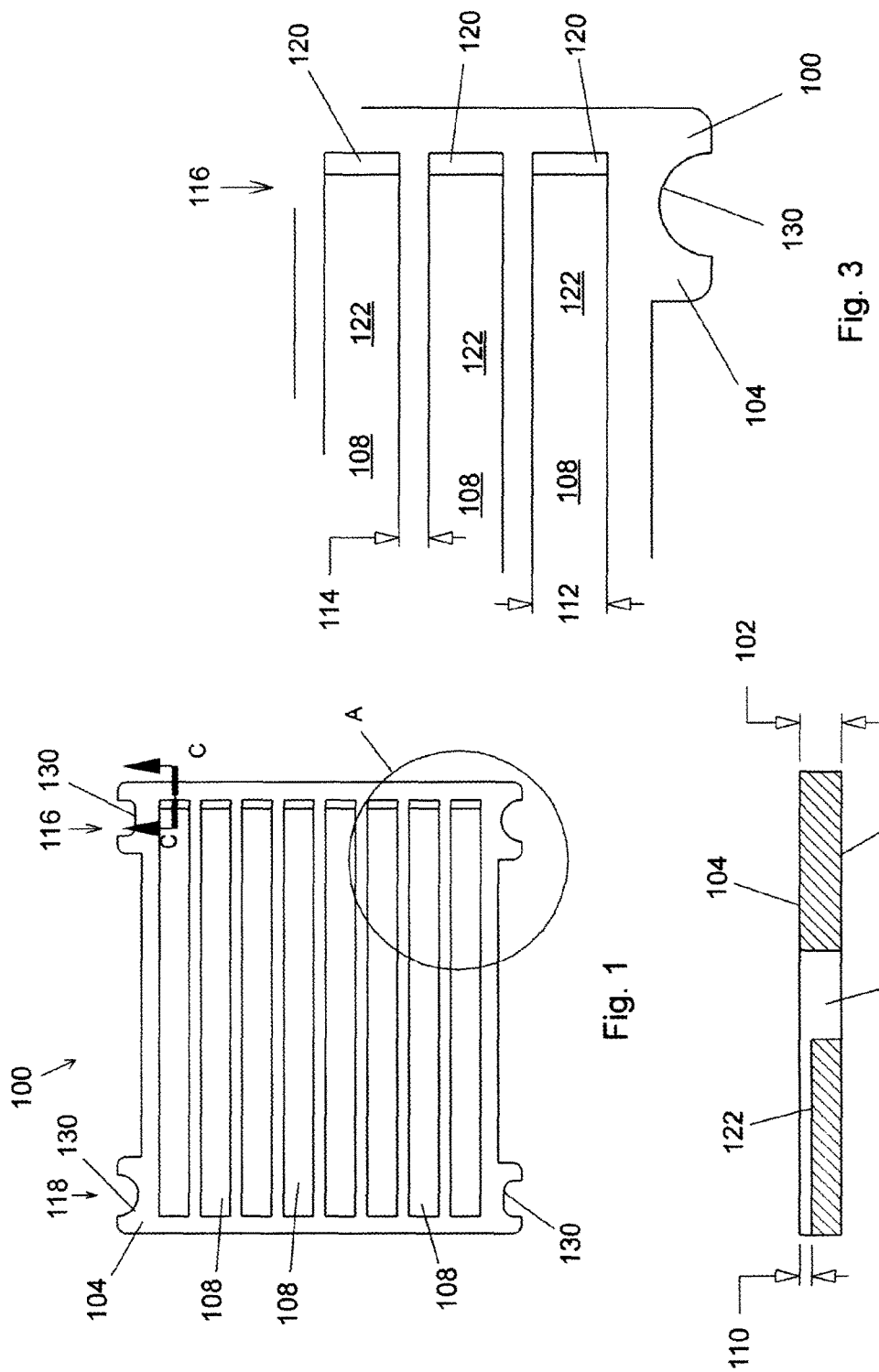

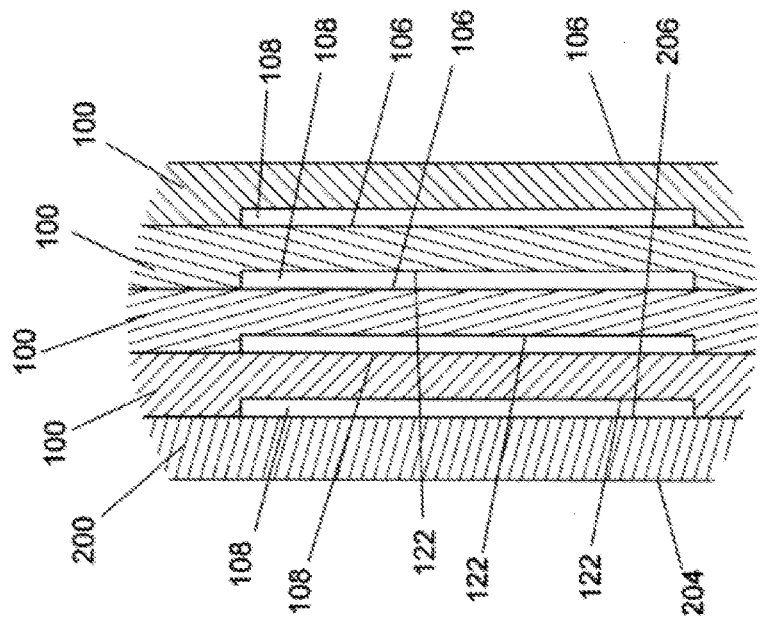
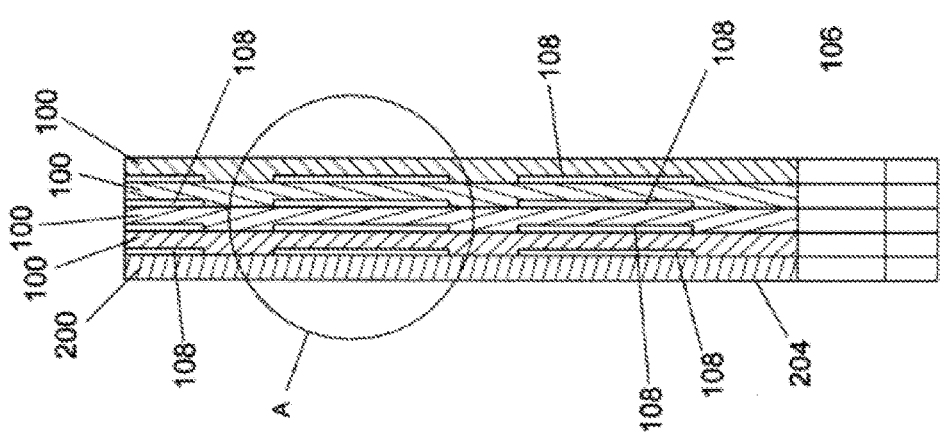
Fig. 12A
Fig. 12B

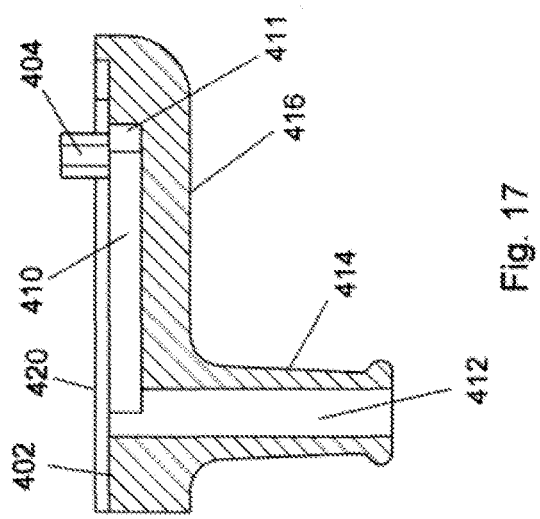
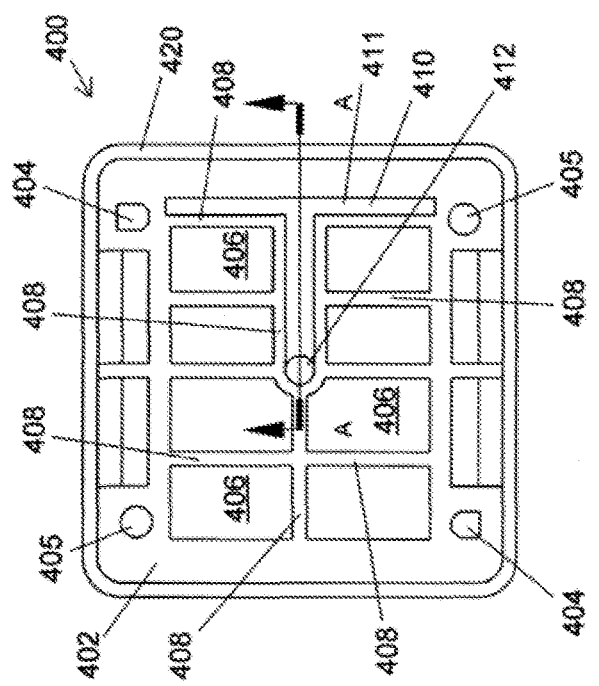
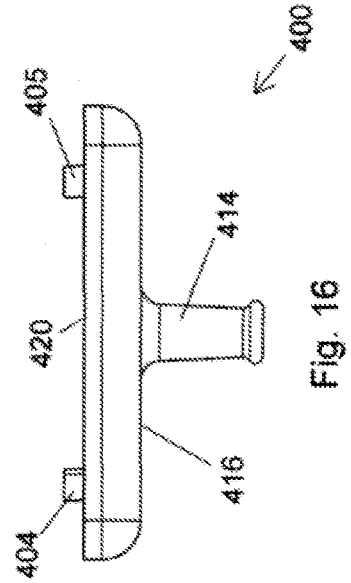

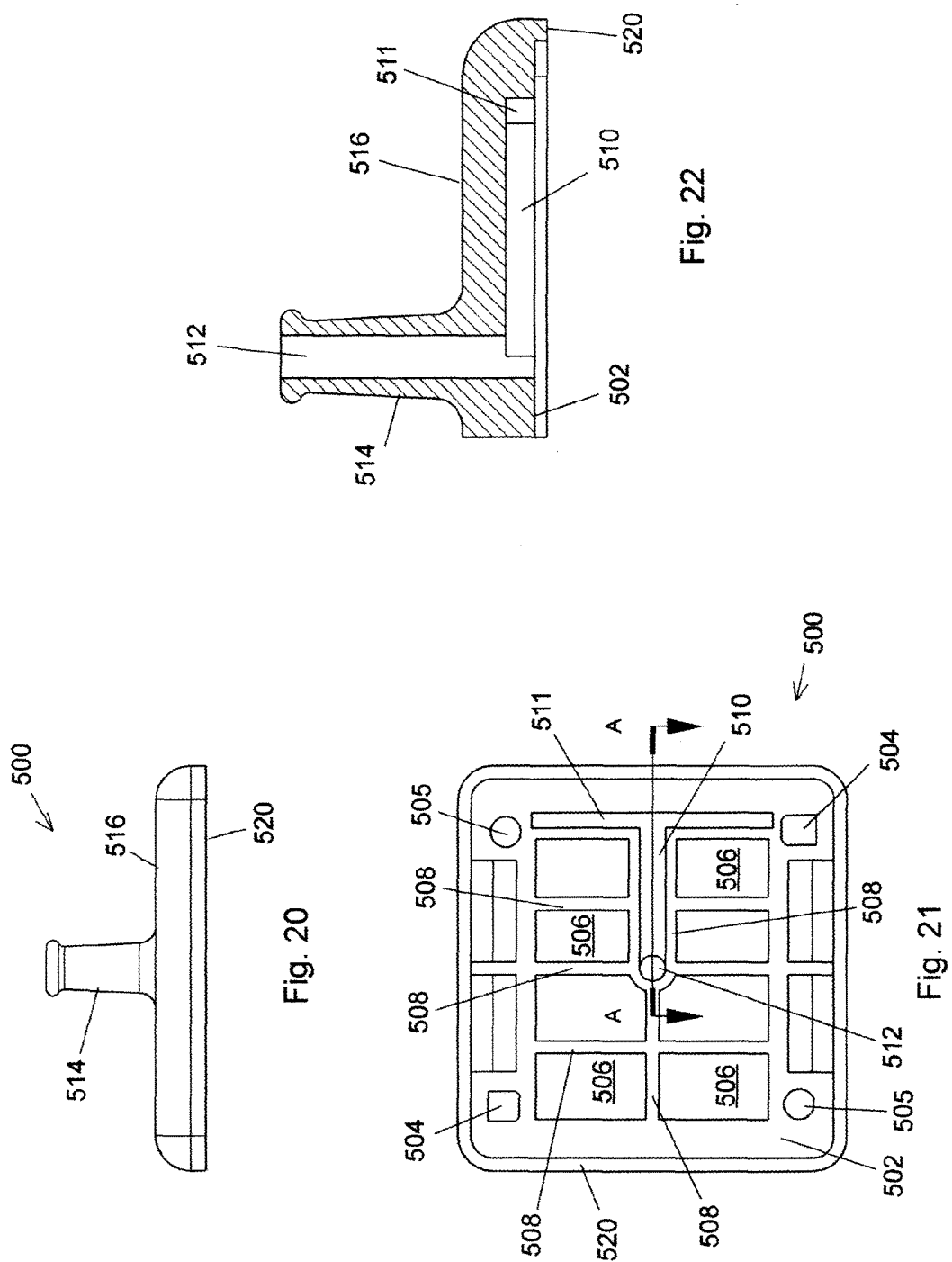

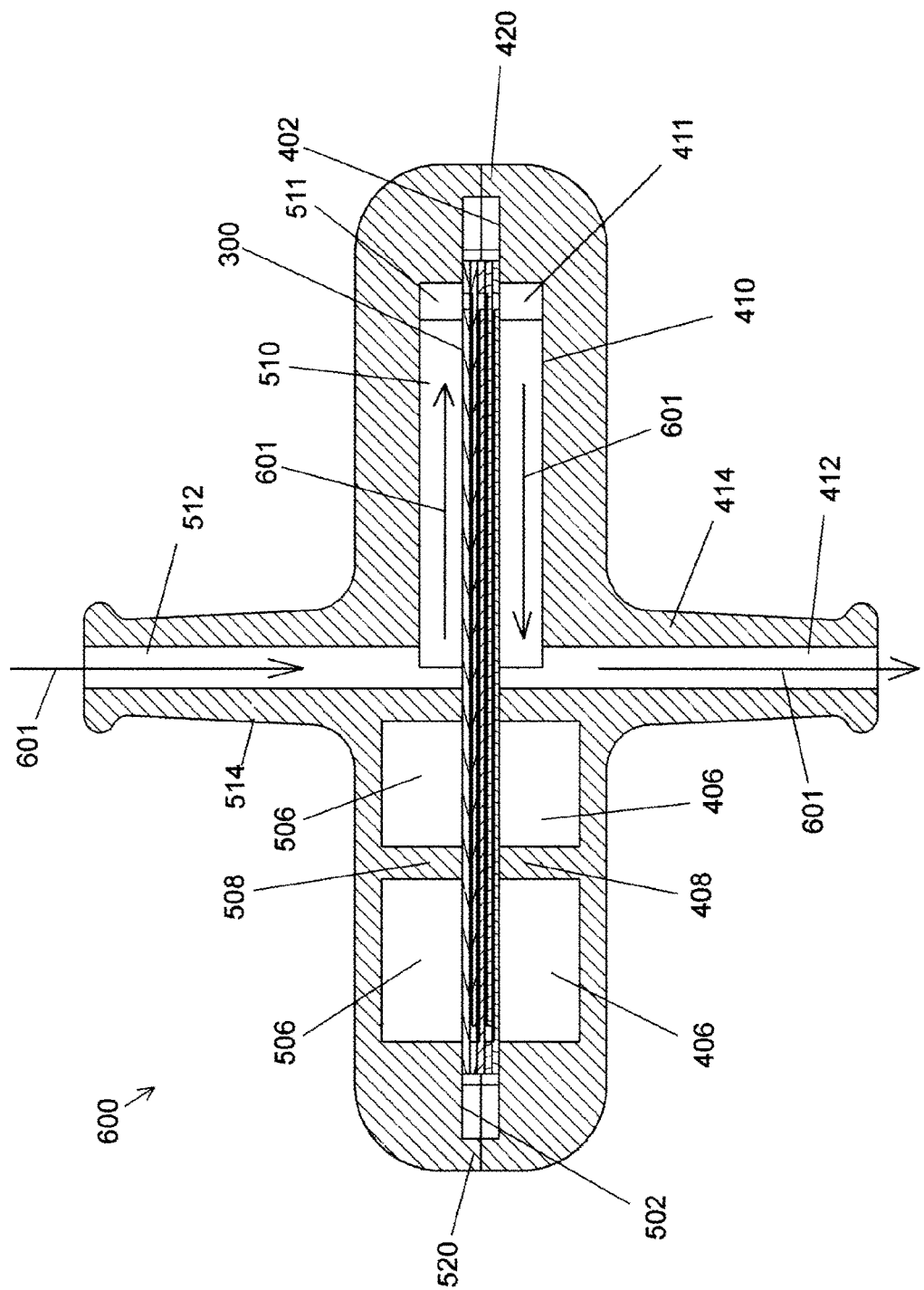

TUNABLE NANOFIBER FILTER MEDIA AND FILTER DEVICES

CROSS-REFERENCES TO RELATED APPLICATIONS

This application claims priority to U.S. Provisional Patent Application Ser. No. 62/217,550, entitled ULTRA SMALL FIBERS AS FILTER MATERIALS, filed Sep. 11, 2015, the entire disclosure of which is hereby incorporated herein by this reference.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

TECHNICAL FIELD

The present disclosure relates generally to filter media and filter devices, and more specifically to filter media and filter devices which combine user-defined arrays of nanofibers and layers of modular laminas to form flow passages having tuned nanoscale topographies specific to one or more preselected retentates.

BACKGROUND OF THE INVENTION

Fibrous filter media are used in various types of filter devices to trap large and small particles in liquid and gas streams. Such filter media are typically formed from multiple layers of coarse and fine fibers extending parallel to an upstream face surface of the filter media. An outer layer of coarse fibers forms a bulk filtration layer for filtering of larger particles, while an inner or underlying layer of fine fibers provides filtering of small particles. Fine fibers are often provided in a thin layer laid down on a supporting substrate or used with one or more protective layers to obtain a variety of benefits, including increased efficiency, reduced initial pressure drop, cleanability, reduced filter media thickness, and to provide an impermeable barrier to various liquids, such as water. However, prior approaches have several inherent disadvantages, including the need for a supporting substrate, a risk of delamination of the fine fiber layer from the substrate, more rapid loading of the filter by captured particles, and the alignment of fine fibers parallel to the media face surface.

On the molecular level, fibrous materials also trap contaminants with electrostatic forces, including ionic bonding, hydrogen bonding, and Van der Waals forces. These electrostatic interactions occur on the fiber surface. Because these interactions are known to increase non-linearly at sub-micron length scales, functional improvement in fibrous filter media is largely based on minimizing denier (linear mass density or fiber diameter). Although the production of filter media comprising very fine fibers having a high surface-to-volume ratio, such as microfibers and nanofibers, has recently been emphasized in the industry, processing limitations associated with traditional methods of producing such fibers limit the utility of these materials in filtration applications. For example, extruded microfibers require the use of solvents and, or alternatively, immiscible polymer blends to split fibers to submicron length scales, while production of nanofibers by the electrospinning method requires high-voltage (i.e., kilovolt) electric fields.

Accordingly, what is needed are improvements in filter media and filter devices.

BRIEF SUMMARY OF THE INVENTION

The presently disclosed subject matter overcomes some or all of the above-identified deficiencies of the prior art, as will become evident to those of ordinary skill in the art after a study of the information provided in this document.

Disclosed herein are filter media and devices for filtering or separating a contaminant from a fluid liquid or gas stream which incorporate flow passages formed by layered laminas comprising tunable topographies of user-defined arrays of nanofibers and, optionally, nanoholes. Also disclosed herein are tunable nanofiber diffusion filters for dialysis which have multiple flow paths for a first and second fluid such as blood and dialysate, in which the flow paths are separated by adjacent diffusion zones formed of one or more arrays of freestanding nanofibers through which the first fluid and the second fluid interface.

Accordingly, in one aspect, the disclosure provides a filter media comprising an assembly of filter laminas, each filter lamina including an upper surface, a lower surface, an array of nanofibers formed on a portion thereof, and an aperture extending from the upper surface to the lower surface, the filter laminas arranged in a stacked orientation such that the apertures define a portion of a flow passage extending through the assembly, the nanofibers extending into a portion of the flow passage to form a tuned nanoscale topography specific to a preselected retentate such that said retentate is filtered from a fluid containing the retentate when the fluid is flowed through the flow passage.

In another aspect, the disclosure provides a filter device, comprising a housing defining an interior space, the housing having defined therein an inlet and an outlet, the inlet and outlet each in fluid communication with the interior space; a plurality of filter laminas disposed within the interior space, each filter lamina including an upper surface, a lower surface, a first peripheral portion, a second peripheral portion opposite the first peripheral portion, a central region between the first and second peripheral portions, and an aperture defined through the first peripheral portion, the plurality of filter laminas arranged in a stack wherein: the aperture of the uppermost lamina is in fluid communication with the inlet, the aperture of the lowermost lamina is in fluid communication with the outlet, and the opposing surfaces of adjacent filter laminas define a portion of an interlaminar flow space extending between said opposing surfaces, the flow space in fluid communication with the apertures of the corresponding adjacent filter laminas to form a continuous flow passage extending through the lamina stack from the inlet to the outlet; and an array of nanofibers extending from a portion of each filter lamina into the flow passage such that a fluid flowed through the flow passage flows across a portion of said array.

In yet another aspect, the disclosure provides a diffusion filter for dialysis, comprising a housing defining an interior space, the housing having defined therein first and second inlets and first and second outlets, the inlets and outlets in fluid communication with the interior space; an assembly of laminas disposed within the interior space, the lamina assembly comprising a plurality of filter laminas, each filter lamina including a first and second slot defined therethrough, and a plurality of spacer laminas, each spacer lamina having a central aperture defined therethrough, the filter and spacer laminas arranged alternatingly in a stack wherein the central aperture of each spacer lamina defines an interlaminar space between opposing surfaces of corresponding adjacent filter laminas, the interlaminar space in fluid communication with the first and second slots of said adjacent filter laminas such that the first slots form a first flow path extending through the stack from the first inlet to the first outlet, and the second slots form a second flow path extending through the stack from the second inlet to the second outlet; a plurality of diffusion zones formed in the interlaminar space, each diffusion zone comprising an array of nanofibers extending into the interlaminar space from a portion of a corresponding adjacent filter lamina such that the array of nanofibers separates the first and second flow paths throughout the interlaminar flow space; wherein a first fluid flowed through the first flow path interfaces across said diffusion zones with a second fluid flowed through the second flow path.

Numerous other objects, advantages and features of the present disclosure will be readily apparent to those of skill in the art upon a review of the following drawings and description of a preferred embodiment.

BRIEF DESCRIPTION OF THE SEVERAL VIEWS OF THE DRAWINGS

FIG. 1 is a plan view of a filter lamina for an embodiment of a tunable nanofiber filter formed in accordance with the present disclosure.

FIG. 2 is a partial sectional view of the filter lamina of FIG. 1 at line C-C.

FIG. 3 is an enlarged view of the filter lamina of FIG. 1 at inset A.

FIG. 12A is a partial sectional view of the lamina stack of FIG. 10 at line C-C.

FIG. 12B is an enlarged view of the lamina stack of FIG. 12A at inset A.

FIG. 15 is a plan view of the housing portion of FIG. 13.

FIG. 16 is a side elevational view of the housing portion of FIG. 13.

FIG. 17 is a partial sectional view of the housing portion of FIG. 15 at line A-A.

FIG. 20 is a side elevational view of the housing portion of FIG. 18.

FIG. 21 is a bottom plan view of the housing portion of FIG. 18.

FIG. 22 is a partial sectional view of the housing portion of FIG. 21 at line A-A.

FIG. 31 is a sectional view of the filter of FIG. 30 along line B-B. Arrows indicate flow path.

DETAILED DESCRIPTION OF THE INVENTION

Figure 4:
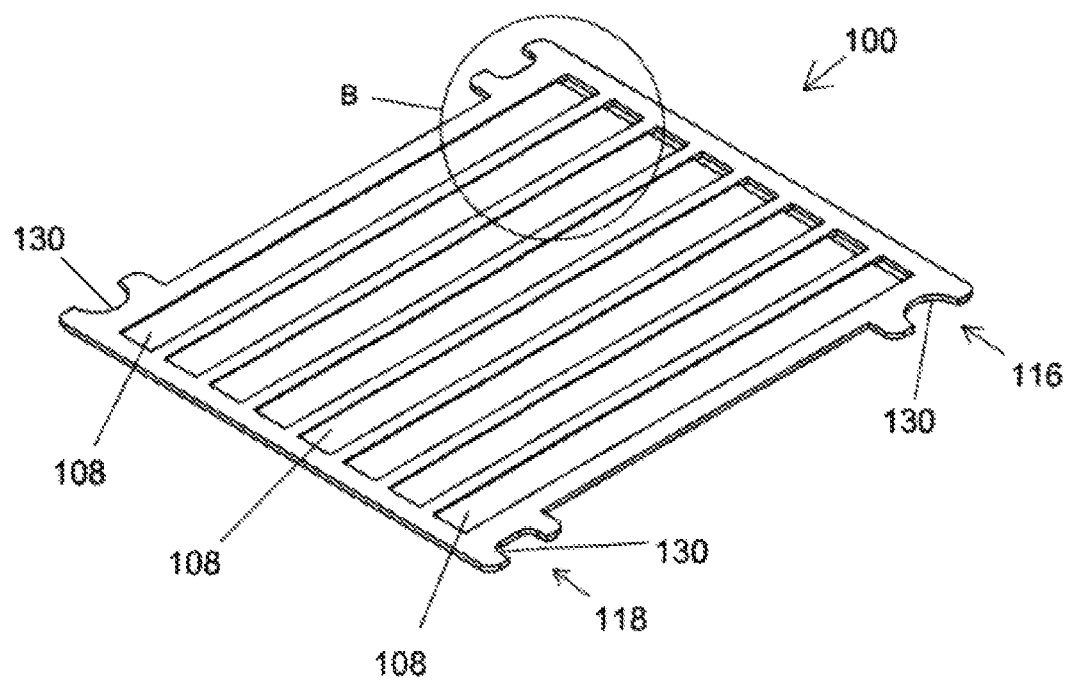
FIG. 4 is a perspective view of the filter lamina of FIG. 1.
Figure 5:
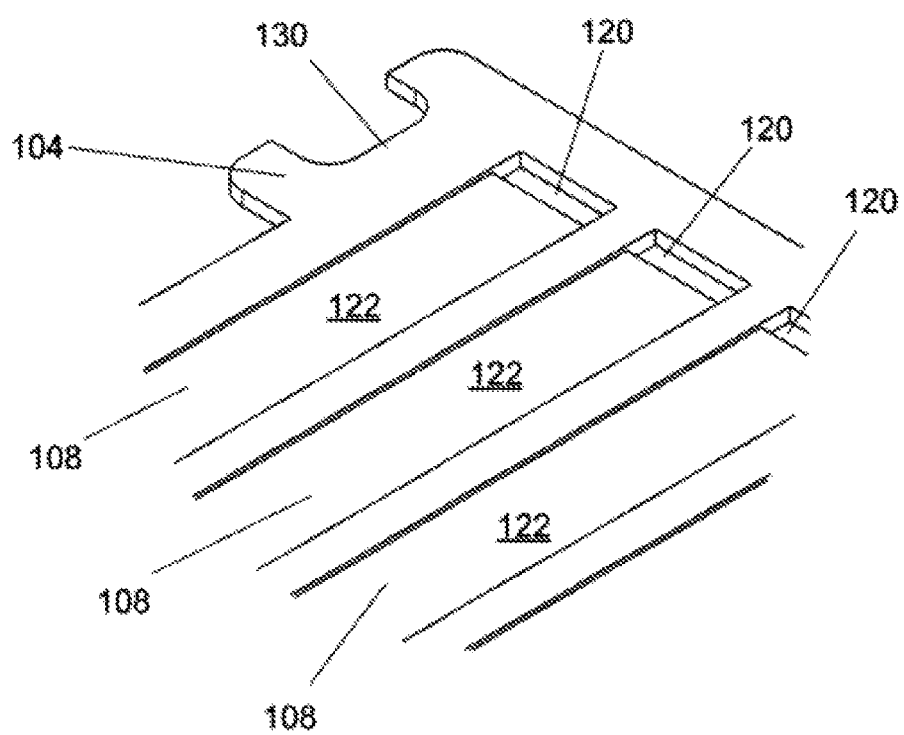
FIG. 5 is an enlarged view of the filter lamina of FIG. 4 at inset B.

The details of one or more embodiments of the presently disclosed subject matter are set forth in this document. Modifications to embodiments described in this document, and other embodiments, will be evident to those of ordinary skill in the art after a study of the information provided herein. The information provided in this document, and particularly the specific details of the described exemplary embodiments, is provided primarily for clearness of understanding and no unnecessary limitations are to be understood therefrom. In case of conflict, the specification of this document, including definitions, will control.

The present disclosure relates to filter devices for removing a contaminant from a fluid stream. In a general embodiment, the tunable nanofiber filters disclosed herein are designed to filter a preselected substance or contaminant from a fluid stream using one or more user-defined arrays of nanofibers, such as those described in U.S. 2013/0216779 which is incorporated herein by reference in its entirety.

While the terms used herein are believed to be well understood by one of ordinary skill in the art, definitions are set forth herein to facilitate explanation of the subject matter disclosed herein.

Unless define otherwise, all technical and scientific terms used herein have the same meaning as commonly understood by one of ordinary skill in the art to which the subject matter disclosed herein belongs. Although any methods, devices, and materials similar or equivalent to those described herein can be used in the practice or testing of the presently disclosed subject matter, representative methods, devices and materials are now described.

The terms "a", "an", and "the" refer to "one or more" when used in this application, including the claims. Thus, for example, reference to "a contaminant" includes a plurality of particles of the contaminant, and so forth. The use of the word "a" or "an" when used in conjunction with the term "comprising" in the claims and/or the specification may mean "one," but it is also consistent with the meaning of "one or more," "at least one," and "one or more than one."

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and devices of the present disclosure, including components thereof, can comprise, consist of, or consist essentially of the essential elements and limitations of the embodiments described herein, as well as any additional or optional components or limitations described herein or otherwise useful.

Unless otherwise indicated, all numbers expressing physical dimensions, quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, the term "about," when referring to a value or to an amount of mass, weight, time, volume, concentration, percentage or a physical dimension such as length, width, or diameter, is meant to encompass variations of in some embodiments ±20%, in some embodiments ±10%, in some embodiments ±5%, in some embodiments ±1%, in some embodiments ±0.5%, and in some embodiments ±0.1% from the specified value or amount, as such variations are appropriate to perform the disclosed methods.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "fluid" is defined as any liquid or gas which can be passed through the filter media and filter devices disclosed herein. Multiple fluids having different specific gravities and viscosities can be used as well as gas and vapor streams, depending on the application.

As used herein, the term "nanofiber" refers to a fiber structure having a diameter of less than 1000 nanometers for more than half the length of the structure. In some embodiments, the nanofibers disclosed herein can comprise a tapered base portion and a relatively longer fiber portion which extends from the base portion. In such embodiments, the fiber portion has a diameter of less than 1000 nm and a length greater than that of the base portion, and the base portion can have a diameter of from about 10 μm to less than 1.0 μm. Additionally, in some embodiments, the base portion can also have a length of from about 1.0 μm to about 10 μm, and the fiber portion can have a length of from about 10 to 100 times greater than the length of the base portion. Nanofibers having larger diameter base portions in the range of from about 2.0 μm to about 10 μm are best suited for applications wherein the bases must provide stiffness to the nanofiber in the fluid stream.

In some preferred embodiments, nanofibers suitable for use in the tunable nanofiber filter media and filter devices disclosed herein can have an overall length of from about 10 to about 100 μm. Accordingly, suitable nanofibers can also have a length to diameter ratio of from 10:1 to about 1000:1.

In one embodiment, the length to diameter ratio is from about 10:1 to about 100:1. By contrast, nanofibers known in the art, including electrospun nanofibers, melt-blown nanofibers and microfiber-derived nanofibers (i.e., microfibers split during processing to obtain sub-micron diameter structures), typically have much greater length to diameter ratios in the range of 1,000,000:1 to 100,000,000:1. As a result, the nanofibers used in tunable nanofiber filter media and filter devices disclosed herein can have from about 10 to about 100 times more tips per unit length than electrospun nanofibers, melt blown nanofibers and microfiber derived nanofibers.

The related terms "nanofiber array" and "array of nanofibers," which are used interchangeably herein, collectively refer to a plurality of freestanding nanofibers of user-defined physical dimensions and composition integrally formed on and extending from a backing member, such as a film, according to user-defined spatial parameters. In some embodiments, the nanofiber arrays disclosed herein include nanofibers which extend from a surface of the backing member at an angle substantially normal to a plane containing the surface of the backing member from which the nanofibers extend. By contrast, electrospun nanofibers, melt-blown nanofibers, and microfiber-derived nanofibers are neither integrally formed on nor do they extend from a backing member.

User-tunable physical characteristics of the nanofiber arrays disclosed herein include fiber spacing, diameter (also sometimes referred to herein as "width"), height (also sometimes referred to herein as "length"), number of fibers per unit of backing member surface area (also referred to herein as "fiber surface area density"), fiber composition, fiber surface texture, and fiber denier. For example, nanofiber arrays used in the filter media and filter devices disclosed herein can comprise millions of nanofibers per square centimeter of backing member, with fiber diameter, length, spacing, composition, and texture configured to perform a filtration function. In some embodiments, one or more of fiber surface area density, diameter, length, spacing, composition, and texture are controlled and optimized to perform a filtration function. In certain embodiments, the nanofiber arrays can be optimized or "tuned" to perform a specific filtration function or target a preselected substance or specific retentate. In further embodiments, an array of nanofibers disposed on a portion of a filter lamina forming a flow passage of a filter device disclosed herein is configured to filter a substance from a fluid containing the substance when the fluid is flowed through the flow passage.

The nanofiber arrays disclosed herein, when formed on a substantially planar surface of a backing member, can include nanofibers spaced along an X-axis and a Y-axis at the same or different intervals along either axis. In some embodiments, the nanofibers can be spaced from about 100 nm to 200 µm or more apart on the X-axis and, or alternatively, the Y-axis. In certain embodiments, the nanofibers can be spaced from about 1 µm to about 50 µm apart on one or both of the X-axis and the Y-axis. In a preferred embodiment, the nanofibers can be spaced from about 2 µm to about 7 µm apart on one or both of the X-axis and the Y-axis.

In some embodiments, an array of nanofibers can include nanofibers having an average length of at least 25 µm. In certain embodiments, the nanofibers can have a length of from about 10 µm to about 100 µm. In certain embodiments, the nanofibers can have a length of from about 15 µm to about 60 µm. In an exemplar embodiment, the nanofibers can have an average length of from about 20 µm to about 30 µm. In specific embodiments, the nanofibers can have a length of about 15.00 µm, 16.00 µm, 17.00 µm, 18.00 µm, 19.00 µm, 20.00 µm, 21.00 µm, 22.00 µm, 23.00 µm, 24.00 µm, 25.00 µm, 26.00 µm, 27.00 µm, 28.00 µm, 29.00 µm, 30.00 µm, 31.00 µm, 32.00 µm, 33.00 µm, 34.00 µm, 35.00 µm, 36.00 µm, 37.00 µm, 38.00 µm, 39.00 µm, 40.00 µm, 41.00 µm, 42.00 µm, 43.00 µm, 44.00 µm, 45.00 µm, 46.00 µm, 47.00 µm, 48.00 µm, 49.00 µm, 50.00 µm, 51.00 µm, 52.00 µm, 53.00 µm, 54.00 µm, 55.00 µm, 56.00 µm, 57.00 µm, 58.00 µm, 59.00 µm, or 60.00 µm.

In some embodiments, an array of nanofibers can include nanofibers having an average diameter of from about 10 nm to about 1000 nm. In an exemplar embodiment, the nanofibers can have an average diameter of 400 nm to 500 nm. In certain embodiments, the nanofibers can have an average diameter of about 10 nm, 25 nm, 50 nm, 100 nm, 150 nm, 200 nm, 250 nm, 300 nm, 350 nm, 400 nm, 410 nm, 420 nm, 430 nm, 440 nm, 450 nm, 460 nm, 470 nm, 480 nm, 490 nm, 500 nm, 550 nm, 600 nm, 650 nm, 700 nm, 750 nm, 800 nm, 850 nm, 900 nm, 950 nm, or 1000 nm.

The nanofiber backing member surface area density can range from about 25,000,000 to about 100,000 nanofibers per $cm^2$. In some embodiments, the nanofiber surface area density can range from about 25,000,000 to about 2,000,000 nanofibers per $cm^2$. In specific embodiments, the nanofiber surface density is about 6,000,000 nanofibers per $cm^2$. In an exemplar embodiment, the nanofiber surface area density is about 2,000,000 nanofibers per $cm^2$.

In some embodiments, an array of nanofibers can include nanofibers having an average denier of from about 0.001 denier to less than 1.0 denier. In an exemplar embodiment, the nanofibers forming a nanofiber array disclosed herein can be less than one denier and have a diameter ranging from about 50 nm to about 1000 nm.

Nanofiber arrays and methods for producing nanofiber arrays suitable for use in the filter media and filter devices disclosed herein are described by the present inventors in U.S. 2013/0216779, U.S. 2016/0222345, and White et al., *Single-pulse ultrafast-laser machining of high aspect nanoholes at the surface of SiO2*, Opt. Express. 16:14411-20 (2008), each of which is incorporated herein by reference in its entirety. Using the foregoing methods, nanofiber arrays with a variety of mechanical, electrical and chemical properties, Debye moments, tailored affinities, and functional binding sites can be produced from almost a wide variety of polymers without the use of solvents or high voltage electrical fields.

Nanofibers forming nanofiber arrays disclosed herein can be composed of virtually any thermoplastic polymer, polymer resin, or similar material. Non-limiting examples of suitable polymers include poly(ε-caprolactone) (PCL), polyethylene oxide (PEO), polyvinyl alcohol (PVA), polyvinyl chloride (PVC), polyvinyl formal (PVF), polyisoprene, trans (PI), polypropylene (PP), low-density polyethylene (LDPE), high-density polyethylene (HDPE), PIP castline (PiPc), PIP natural (PiPn), polyvinylidene fluoride (PVDF), poly-lactic acid (PLA), and poly-L-lactic acid (PLLA). It should be understood that a blend of two or more such polymers can also be used. It should also be understood that a blend or block co-polymer of two or more such polymers can also be used. For example, in one embodiment, a blend of block co-polymer comprising PCL-block-PEO can be used to alter the functionality of the backing member and nanofibers.

The term "lamina" refers to a thin modular structure having one or more substantially planar surfaces upon which can be formed an array of nanofibers. Laminas of the present disclosure can take virtually any geometric shape, including but not limited to circular, oval, rectangular, and square. In each case, the lamina will include a central portion bounded on all sides by a peripheral portion which extends between the central portion and the perimeter of the lamina. Laminas can be formed from any suitable material which is impermeable to a fluid in need of filtration, including the previously discussed plastics, and various metals and alloys, such as stainless steel.

The term "filter lamina" refers to a lamina on which is formed an array of nanofibers. Nanofiber arrays can be formed as an integral part of a filter lamina, or formed separately and later attached to a portion of a filter lamina by an adhesive or other means known in the art. An array of nanofibers can be disposed on any portion of a filter, including the upper and, or alternatively, the lower surface thereof, so that the nanofibers extend from the portion of the filter lamina. The term "spacer lamina" refers to a lamina which does not comprise an array of nanofibers or nanoholes. Instead, a spacer lamina comprises one or more apertures defined through a portion thereof for the purpose of forming an interlaminar space between opposing surfaces of adjacent laminas, which can be filter laminas. The terms "lamina stack" and "stack of laminas" refers to an assembly of laminas arranged in a stacked orientation. A stack of laminas includes a top (or uppermost) lamina and a bottom (or lowermost) lamina.

The term "interlaminar space" is used herein to refer to a cavity or space formed between opposing surfaces of adjacent laminas in a lamina stack. The term "flow space" refers to a portion of an interlaminar space through which a fluid is flowed. The term "flow passage" is used herein to refer to a continuous passage extending through an assembly of laminas which contains a fluid as the fluid is flowed through the assembly. For example, a flow passage is formed when an interlaminar flow space defined between two adjacent laminas is in fluid communication with an aperture extending through a portion of each lamina that defines the flow space. The term "flow path" refers to the path of fluid flow through an assembly of laminas disclosed herein.

FIGS. 1 through 5 depict a primary filter lamina 100 for a tunable nanofiber filter formed in accordance with the present disclosure, the filter lamina 100 having a lamina thickness 102, an upper surface 104 and a lower surface 106. Upper surface 104 has formed therein channels 108 having a channel depth 110, a channel width 112, and a channel length, spaced a channel distance 114 apart. Channels 108 have a bottom surface 122, a first end 116, and a second end 118. First end 116 has formed therein apertures 120 extending from the bottom surfaces 122 of the channels 108 to the lower surface 106 of the filter lamina 100. The use of filter laminas 100 having a plurality of parallel channels 108 defined therein reduces the likelihood of clogging. Filter lamina 100 can be configured with locating features 130 to aid in the assembly of multiple filter laminas 100 into a lamina stack to form a filter of the present disclosure. Locating features 130 can be configured so that all upper surfaces 104 of filter laminas 100 in a filter are oriented in a predetermined direction. In some embodiments, locating features 130 can have the same shape. In other embodiments, locating features 130 can comprise primary and secondary locating features having different shapes.

Figure 6:
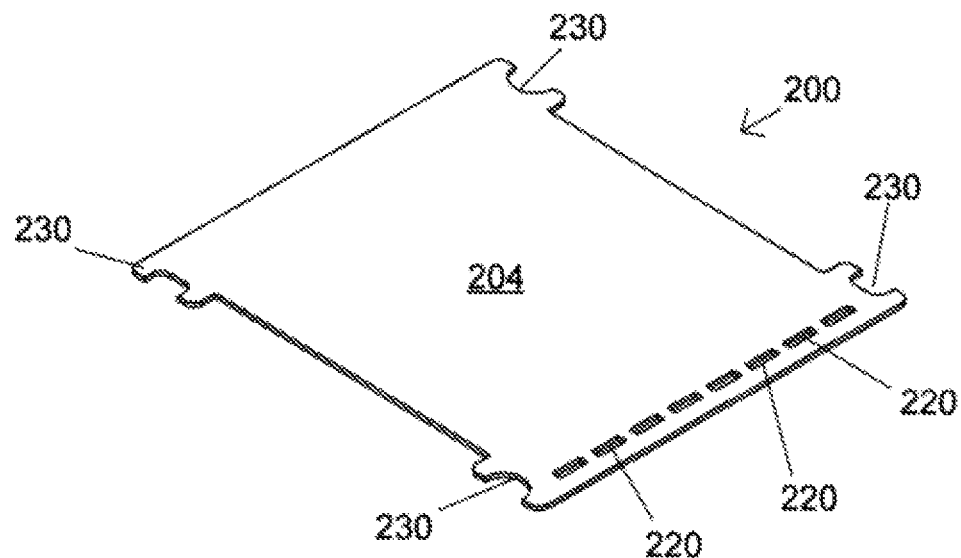
FIG. 6 is a perspective view of another filter lamina for an embodiment of a tunable nanofiber filter formed in accordance with the present disclosure.
Figure 7:
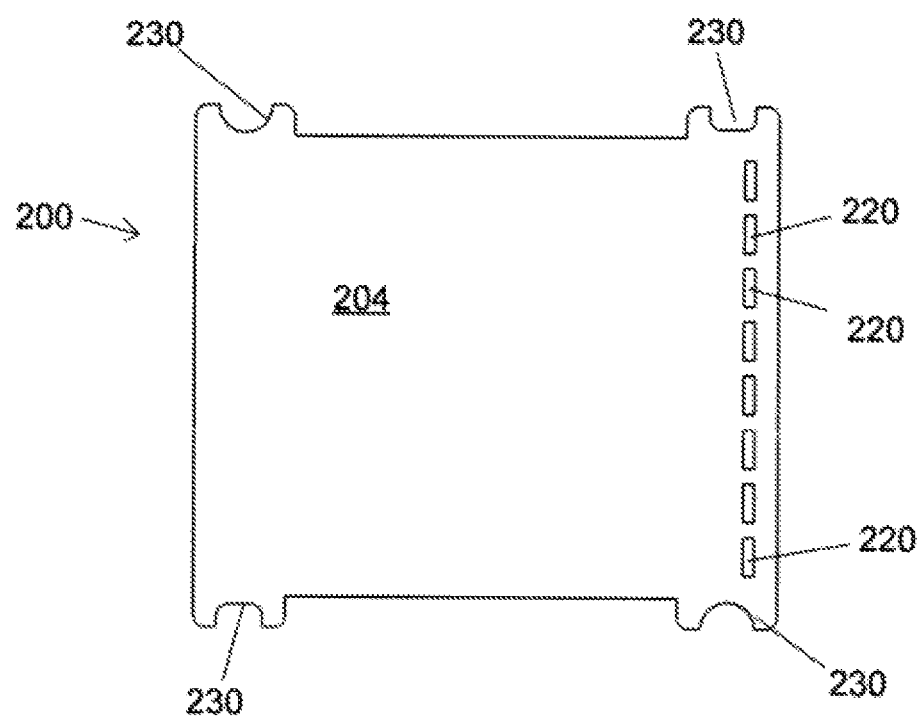
FIG. 7 is a plan view of the filter lamina of FIG. 6.

FIGS. 6 and 7 depict a secondary filter lamina 200 alike in all aspects to filter lamina 100 except as specifically hereafter described. Secondary filter lamina 200 does not have channels formed in upper surface 204.

Figure 8:
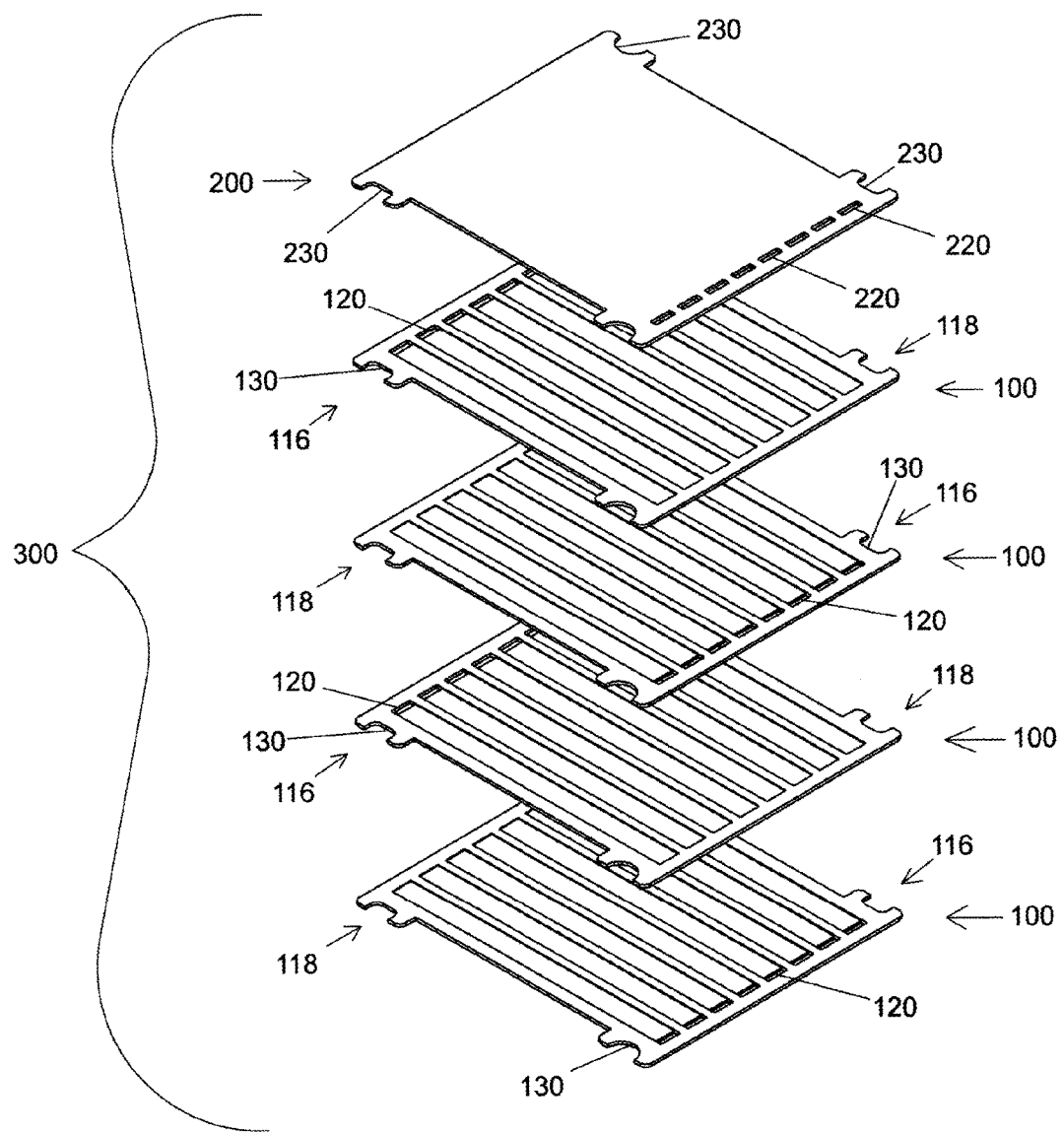
FIG. 8 is an exploded perspective view of a stack of the filter laminas of FIGS. 1 and 6 for an embodiment of a tunable nanofiber filter.
Figure 9:
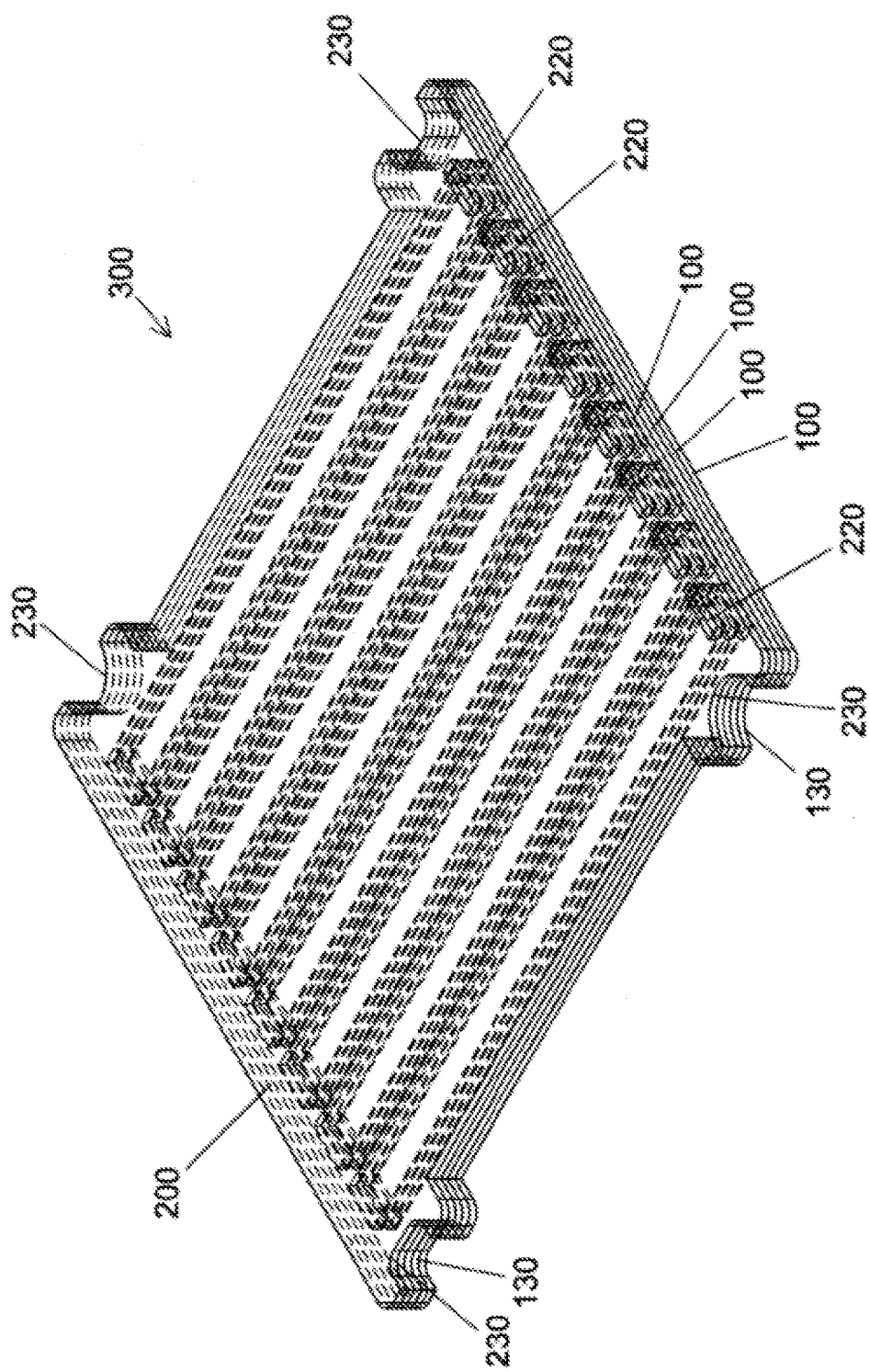
FIG. 9 is a perspective view of the assembled lamina stack of FIG. 8.

In use, at least one primary filter lamina 100 and a secondary filter lamina 200 are positioned for assembly into a lamina stack for use in a tunable nanofiber filter constructed in accordance with the present disclosure. For example, as shown in FIG. 8, four primary filter laminas 100 and one secondary filter lamina 200 can be positioned for assembly into a lamina stack. Adjacent primary filter laminas 100 can be rotated 180 degrees about a longitudinal axis extending through a plane containing the laminas so that first ends 116 of channels 108 in a given primary filter lamina 100 are aligned with the second ends 118 of the channels 108 in the adjacent primary filter laminas 100. In this way, the apertures 120 defined through the first ends 116 of the channels 108 are in fluid communication with the second ends 118 of the channels 108 of each subsequent primary filter lamina 100. Secondary filter lamina 200 can be oriented and positioned on top of a lamina stack 300 as shown in FIG. 8 so that apertures 220 of secondary filter lamina 200 are aligned with the second ends 118 of channels 108 defined in the adjacent primary filter lamina 100.

As shown in FIGS. 9 through 12, when assembled into a lamina stack 300 as depicted, primary filter laminas 100 and secondary filter lamina 200 of FIG. 8 form a plurality of continuous flow passages 304 extending from upper surface 204 of the secondary filter lamina 200 to lower surface 106 of the lowermost or bottom primary filter lamina 100 of the stack, the flow passages 304 being defined by apertures 120 and 220 (FIGS. 11A and 11B) and by channels 108. The flow passages 304 wind like tunnels extending in alternating directions between adjacent filter laminas through the lamina stack 300 and are bounded by the laterally opposed (side) walls of channels 108, by the bottom surface 122 of channels 108, and by the lower surface 106 or 206 of the corresponding overlying adjacent primary filter laminas 100 or secondary filter lamina 200. Arrows indicate the flow path of fluid through the flow passages 304 of the lamina stack 300.

FIGS. 13 through 17 depict a first (lower) portion 400 of a housing for a tunable nanofiber filter of the present disclosure. Lower housing portion 400 can have an upper planar surface 402 from which can protrude primary locating features 404 and secondary locating features 405 configured for cooperative engagement of locating features 130 and 230 of primary 100 and secondary filter laminas 200, respectively. Planar surface 402 can have formed therein recesses 406 which form ribs 408 therebetween. Ribs 408 bound trough 410 which can form a portion of a flow path in fluid communication with lumen 412 of tubular connector portion 414 which protrudes from (lower) outer surface 416. Trough 410 can have a laterally extending portion 411 configured such that when lamina stack 300 is properly positioned on the upper planar surface 402 of lower housing portion 400, apertures 120 of the bottom primary filter lamina 100 are aligned and in fluid communication with the laterally extending portion 411 of trough 410 to allow flow therebetween. Lower portion 400 can also have a circumferential rim 420 axially offset from planar surface 402.

FIGS. 18 through 22 depict a second (upper) portion 500 of a housing for a filter of the present disclosure. Upper portion 500 can have a lower planar surface 502 in which can be formed primary guide pin recesses 504 which provide clearance for primary locating features 404 when lower housing portion 400 is assembled to upper housing portion 500. Planar surface 502 can also have formed therein secondary guide pin recesses 505 which can have a slightly larger but complimentary shape to secondary locating features 405 so that when lower portion 400 is assembled to upper portion 500, cooperative engagement of secondary locating features 405 and guide pin recesses 505 provide alignment between the portions. Primary and secondary guide pin recesses 504 and 505 can be the same or different shapes, but should complement the shapes of locating features 130, 230 on primary and secondary laminas 100, 200, respectively. Planar surface 502 has formed therein recesses 506 which form ribs 508 therebetween. Ribs 508 bound trough 510 which forms a flow path in fluid communication with lumen 512 of tubular connector portion 514 which protrudes from (upper) outer surface 516. Trough 510 has a laterally extending portion 511 which can be configured such that when lamina stack 300 is properly positioned, apertures 220 of the secondary lamina 200 are aligned and in fluid communication with the laterally extending portion 511 of trough 510 to allow flow therebetween. Upper portion 500 can have a circumferential rim 520 axially offset from lower planar surface 502.

The first (lower) housing 400 and second (upper) housing 500 portions can be formed from one or more materials suitably impermeable to a fluid that is to be passed through the filter, including but not limited to metals such as aluminum and stainless steel, composites such as carbon fiber, and natural or synthetic polymeric materials such as acrylics or high density and low density polyethylene.

Figure 23:
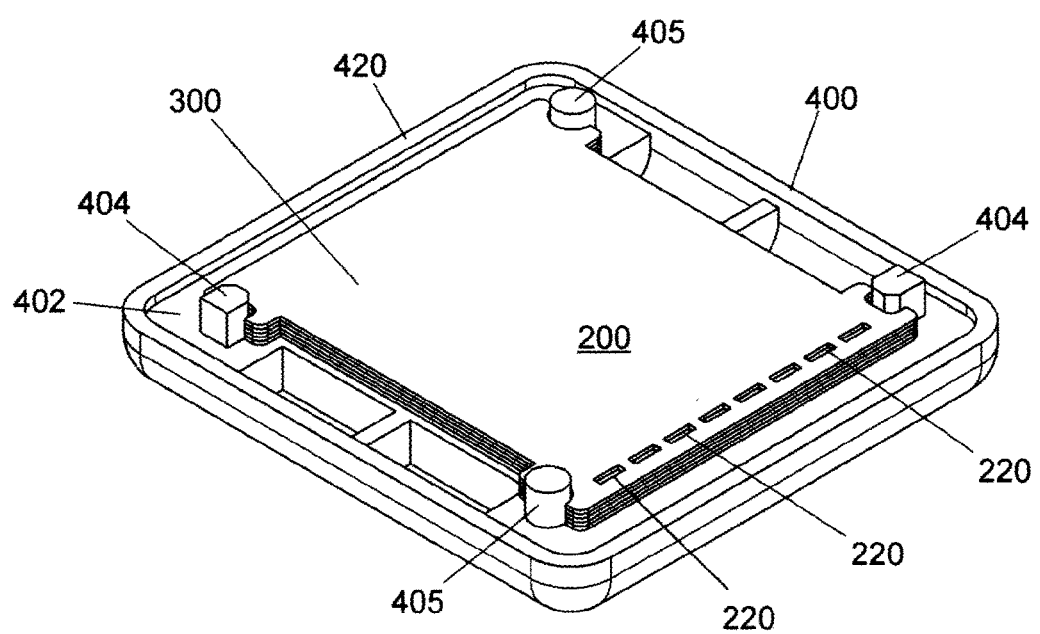
FIG. 23 is a perspective view of an embodiment of a partially assembled filter showing the first (lower) housing portion of FIG. 13 with the lamina stack of FIG. 9 positioned therein for assembly with the second (upper) housing portion of FIG. 18.
Figure 24:
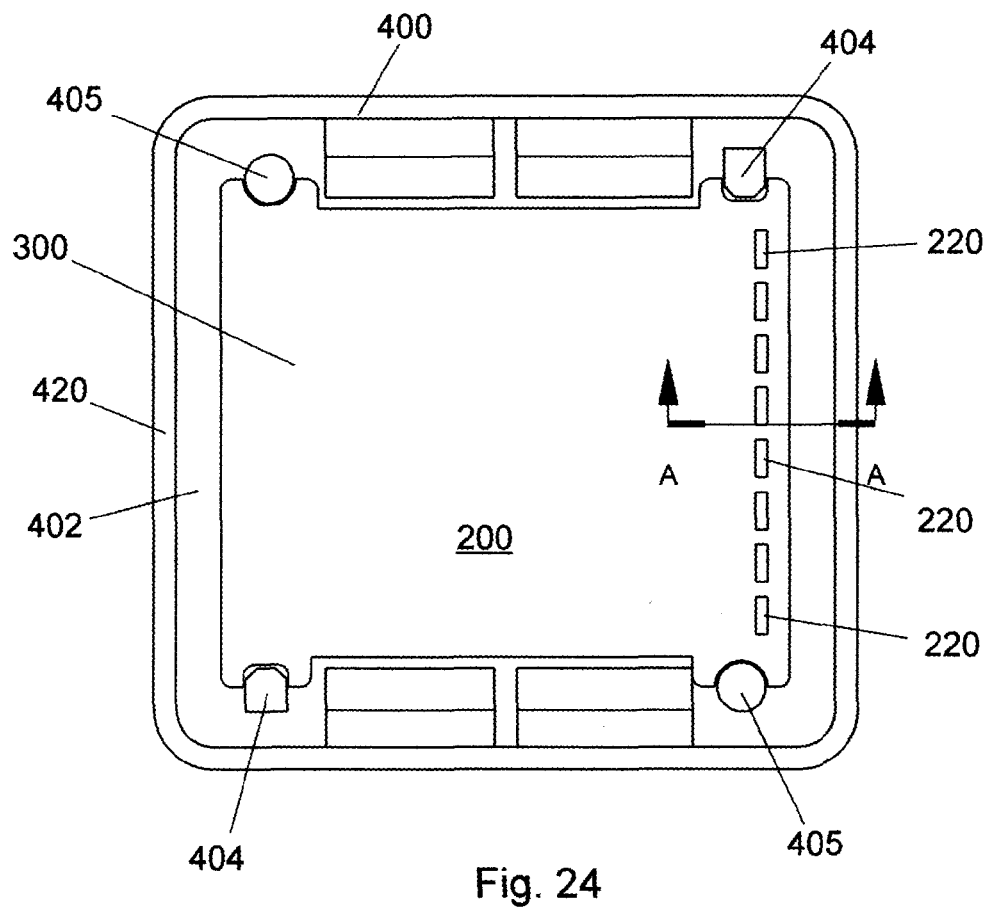
FIG. 24 is a plan view of the partially assembled filter of FIG. 23.
Figure 25:
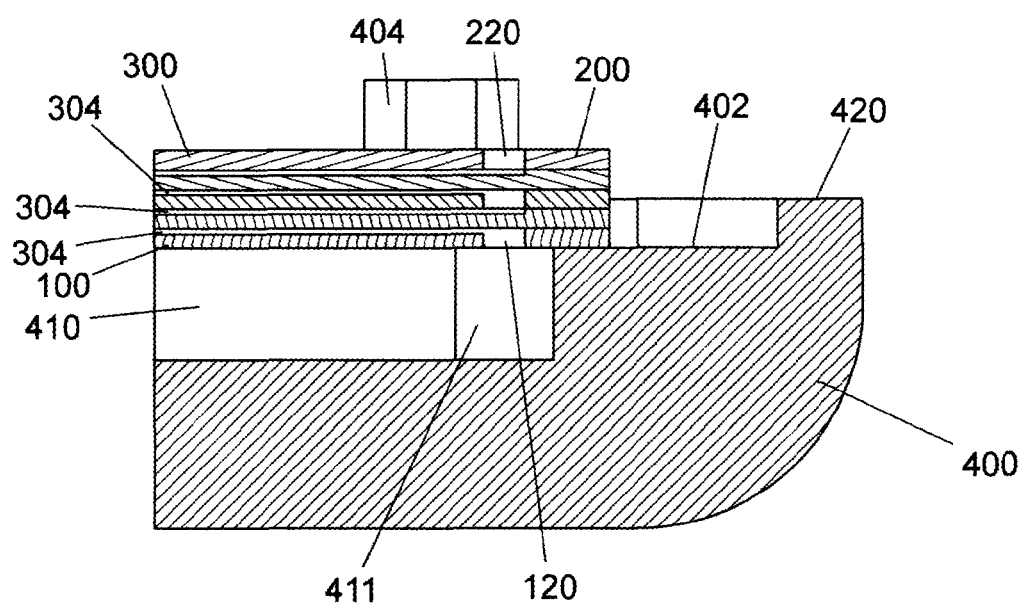
FIG. 25 is a partial sectional view of the partially assembled filter of FIG. 24 at line A-A.

In FIGS. 23 through 25, the lamina stack 300 (shown in FIGS. 9 through 12) is positioned on lower housing portion 400, with the lower surface 106 of the lowermost (i.e., bottom) primary filter lamina 100 resting on upper planar surface 402 of lower housing portion 400. The positioning of primary and secondary filter laminas 100 and 200 is established by cooperative action of locating features 130 and 230 of primary and secondary filter laminas 100 and 200 with primary and secondary locating features 404 and 405 of lower housing portion 400. As best seen in FIG. 25 and previously described, flow passages 304 extending back and forth between adjacent filter laminas from aperture to aperture down through the lamina stack 300 are in fluid communication with the laterally extending portion 411 of trough 410 and therethrough to lumen 412 of lower portion 400 (see FIG. 17).

Figure 27:
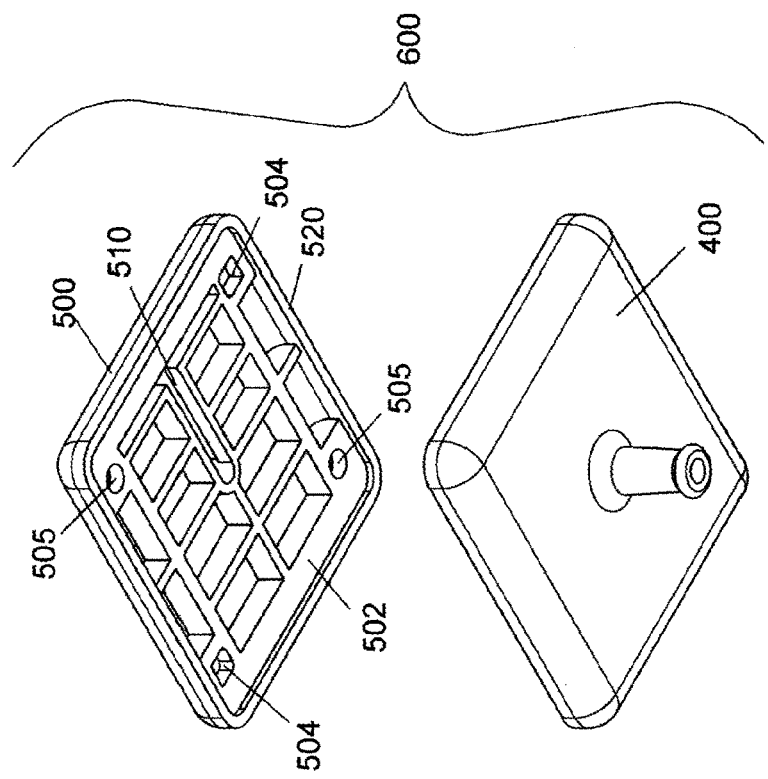
FIG. 27 is a partially exploded bottom perspective view of the filter of FIG. 26.
Figure 26:
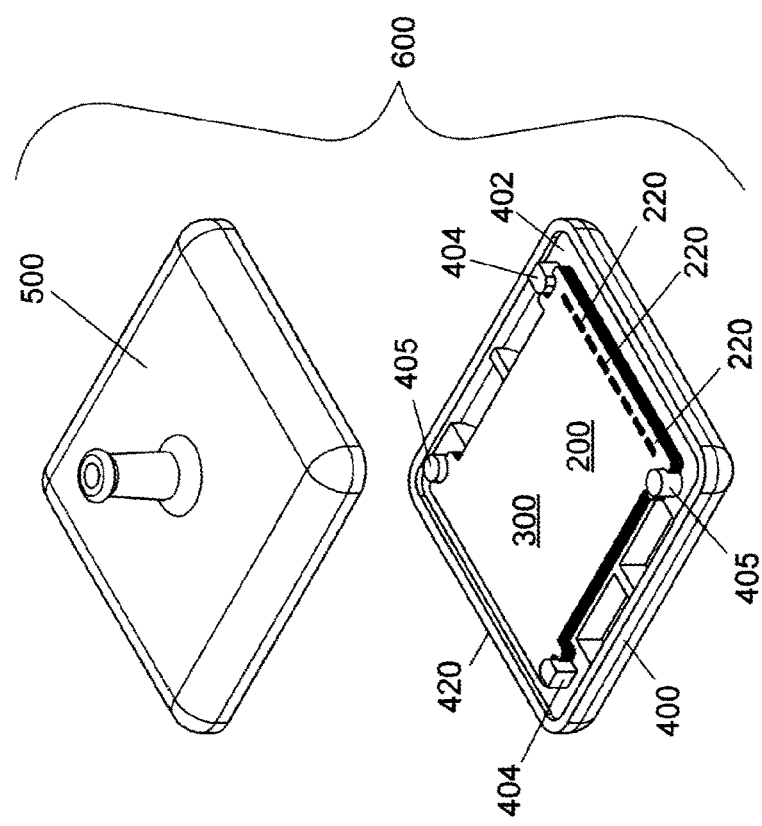
FIG. 26 is a partially exploded top perspective view of an embodiment of a tunable nanofiber filter disclosed herein showing the partially assembled filter of FIG. 23 with the upper housing portion of FIG. 18 positioned for assembly therewith.
Figure 28:
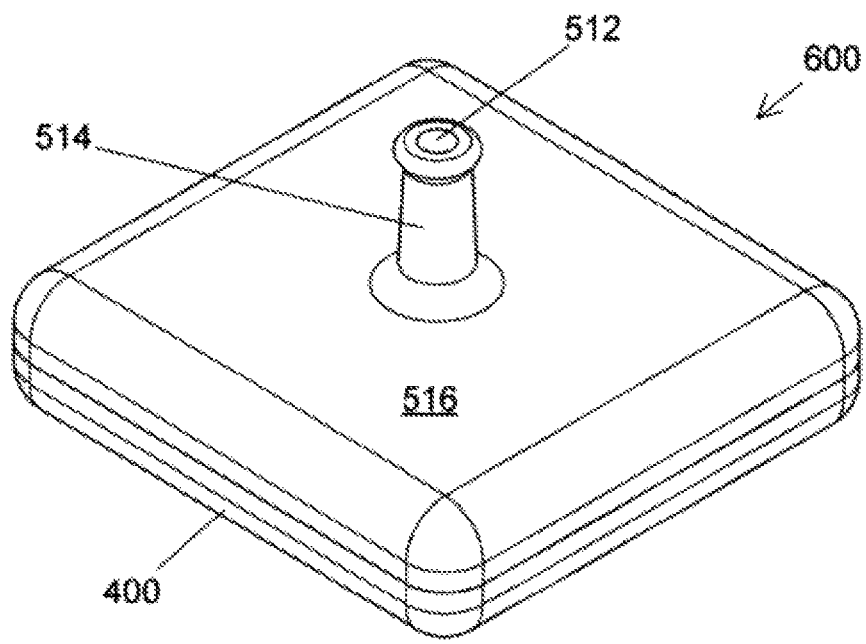
FIG. 28 is a perspective view of the assembled filter of FIG. 26.
Figure 29:
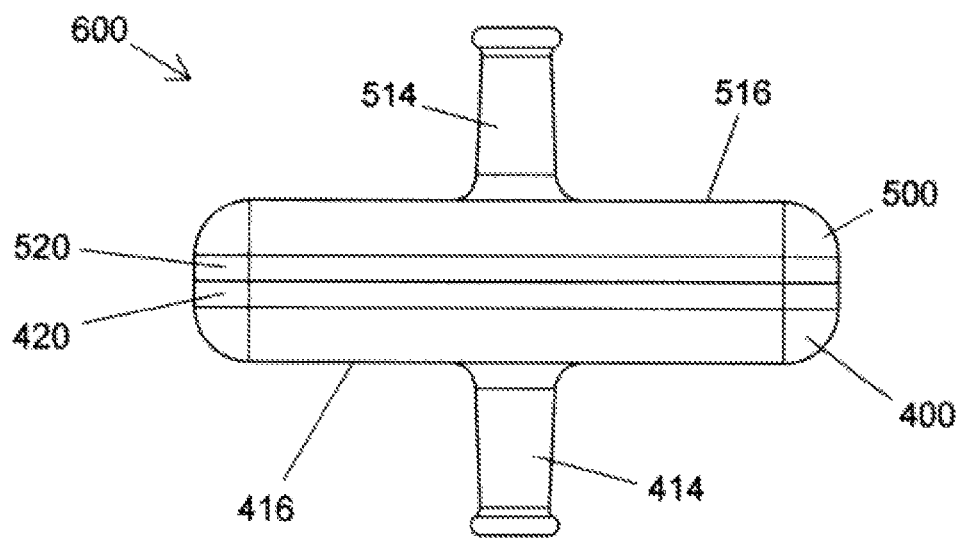
FIG. 29 is a side elevational view of the filter of FIG. 28.
Figure 30:
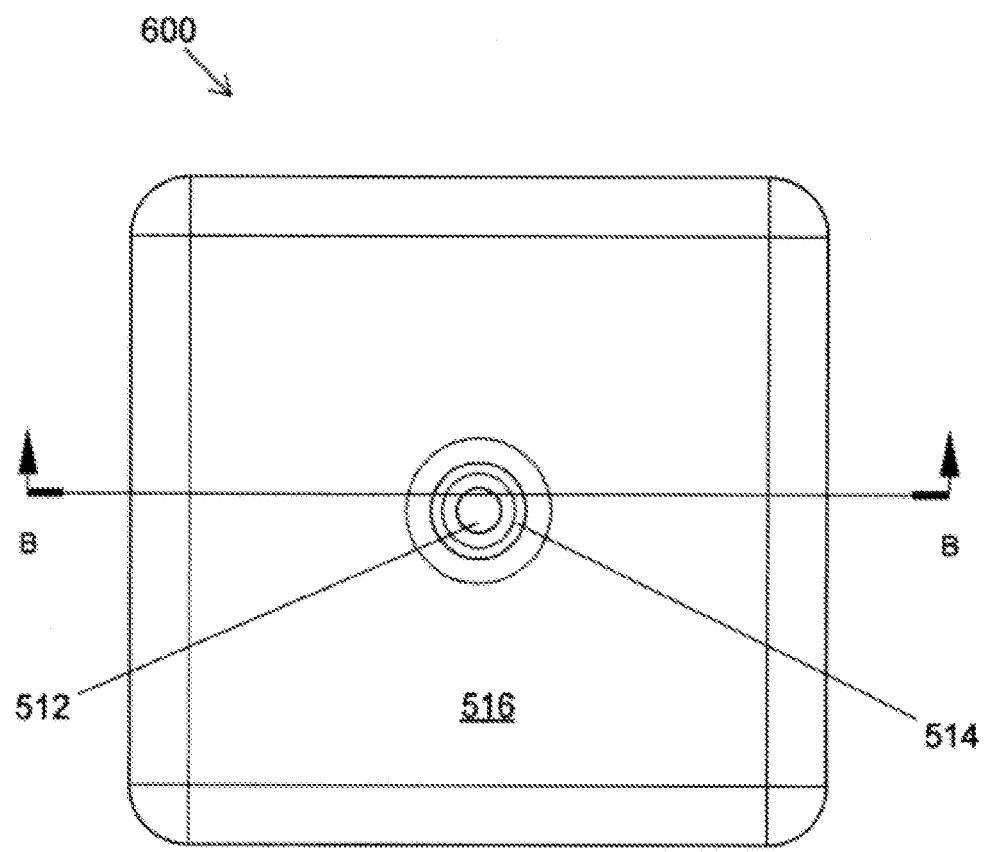
FIG. 30 is a plan view of the filter of FIG. 28.

FIGS. 26 and 27 depict upper housing portion 500 positioned for assembly to lower portion 400 and with the lamina stack 300 therein contained to form an assembled tunable nanofiber filter 600 of the present disclosure. Primary and secondary locating features 404 and 405 of lower housing portion 400 are in alignment with primary and secondary guide pin recesses 504 and 505 of upper housing portion 500. It should be understood, however, that in some embodiments, the position of locating features 404 and 405 and guide pin recesses 504 and 505 on the lower and upper housing portions 400 and 500, respectively, can be reversed such that locating features 404 and 405 protrude from the lower planar surface 502 of the second upper housing portion 500 and the guide pin recesses 504 and 505 are formed in the upper planar surface 402 of the first lower housing portion 400.

An embodiment of an assembled tunable nanofiber filter 600 of the present disclosure is depicted in FIGS. 28 through 31. Upper housing portion 500 can be affixed to lower housing portion 400 by the bonding of circumferential rim 420 of lower housing portion 400 to circumferential rim 520 of upper housing portion 500. In one embodiment, the housing portions 400, 500 are bonded by ultrasonic welding. In other embodiments, the housing portions 400, 500 are bonded by solvent bonding, mechanical fastening or other joining methods known in the art.

Figure 11A:
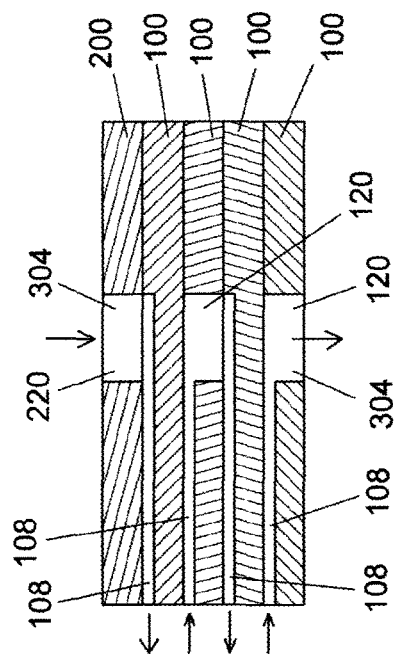
FIG. 11A is a partial sectional view of the lamina stack of FIG. 10 at line A-A. Arrows indicate flow path.
Figure 11B:
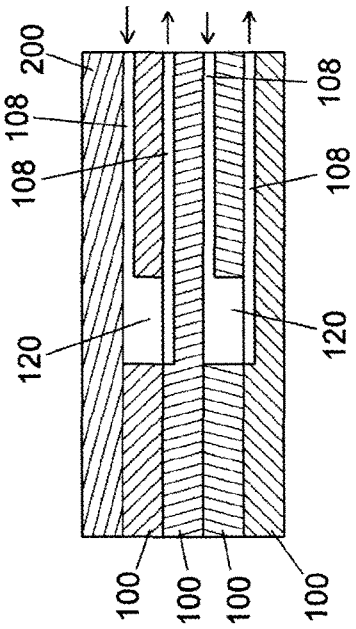
FIG. 11B is a partial sectional view of the lamina stack of FIG. 10 at line B-B. Arrows indicate flow path.
Figure 10:
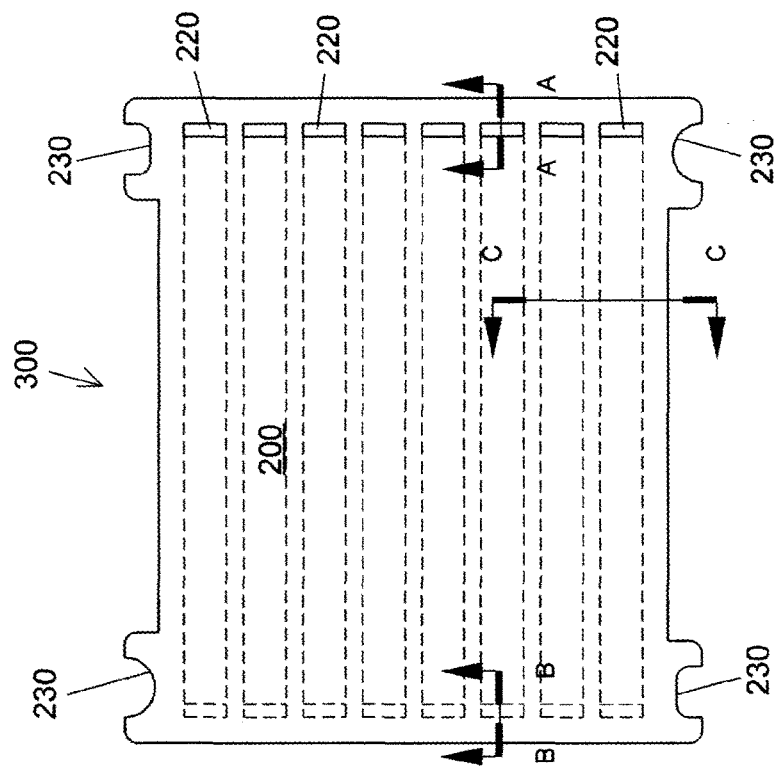
FIG. 10 is a plan view of the lamina stack of FIG. 9.
Figure 13:
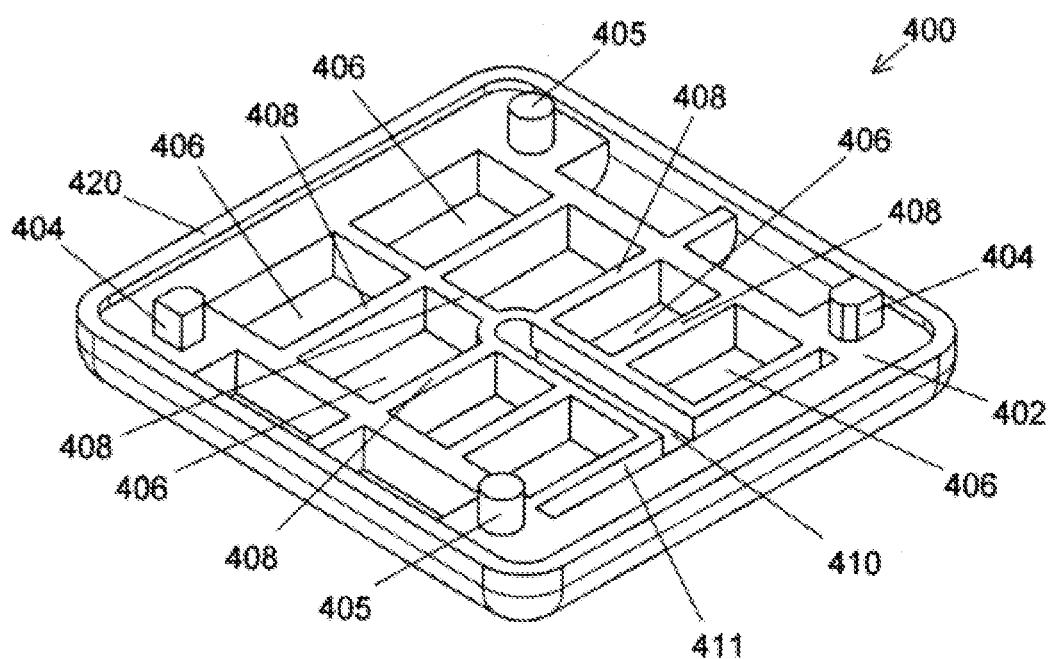
FIG. 13 is a top perspective view of a first (lower) housing portion for an embodiment of a tunable nanofiber filter.
Figure 14:
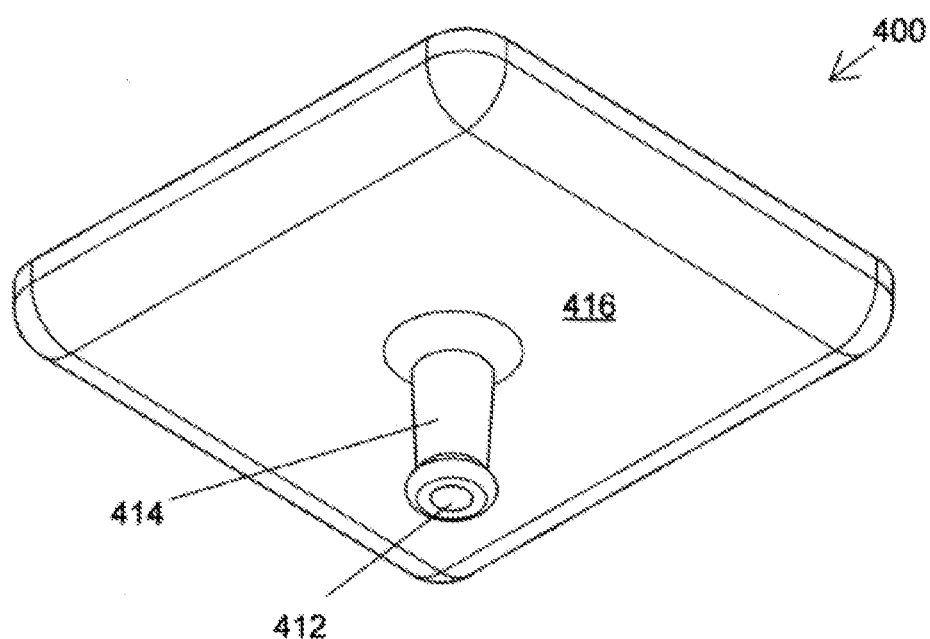
FIG. 14 is a bottom perspective view of the housing portion of FIG. 13.
Figure 18:
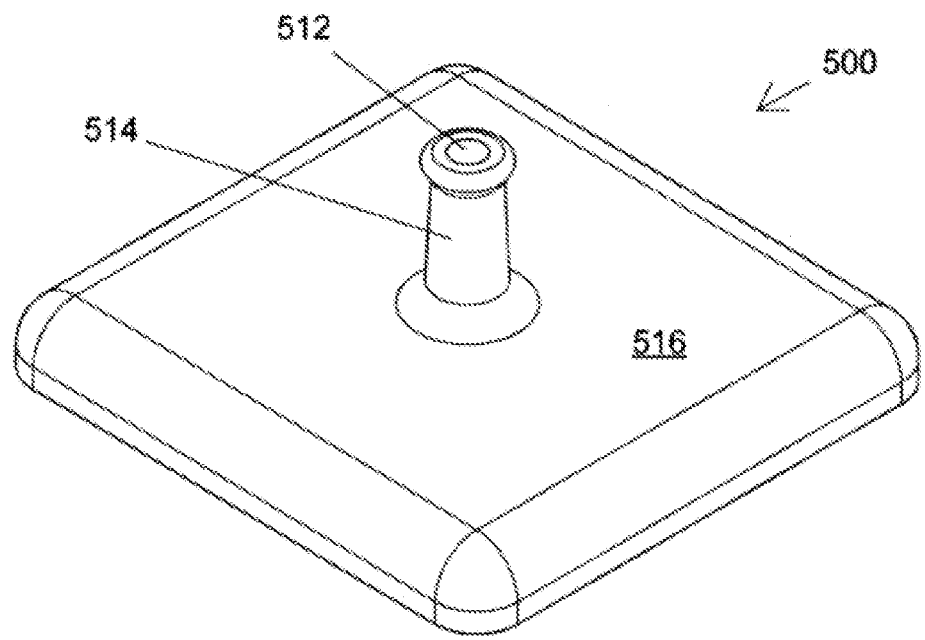
FIG. 18 is a top perspective view of a second (upper) housing portion for a tunable nanofiber filter.
Figure 19:
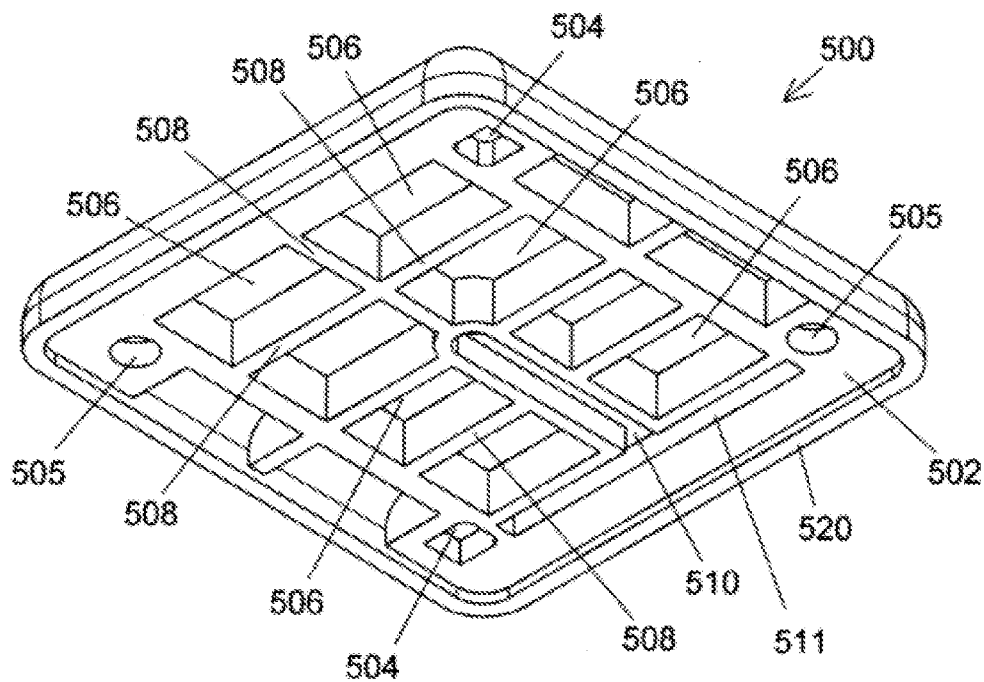
FIG. 19 is a bottom perspective view of the housing portion of FIG. 18.

As best shown in FIG. 31, lamina stack 300 is compressed between lower planar surface 502 of upper housing portion 500 and upper planar surface 402 of lower housing portion 400 by ribs 508 and ribs 408, respectively. A flow path 601 (indicated by arrows) can be formed from lumen 512 of tubular connector portion 514 of the upper housing portion 500, through trough 510 to the laterally extending portion 511 and therefrom into the lamina stack 300 via the apertures 220 of secondary filter lamina 200, through the flow passages 304 of stack 300 as shown in FIGS. 11A and 11B and previously described, out the apertures 120 of the lowermost primary filter lamina 100 into the laterally extending portion 411 of trough 410 of lower housing portion 400, and from trough 410 to the lumen 412 of tubular connector portion 414.

Figure 34:
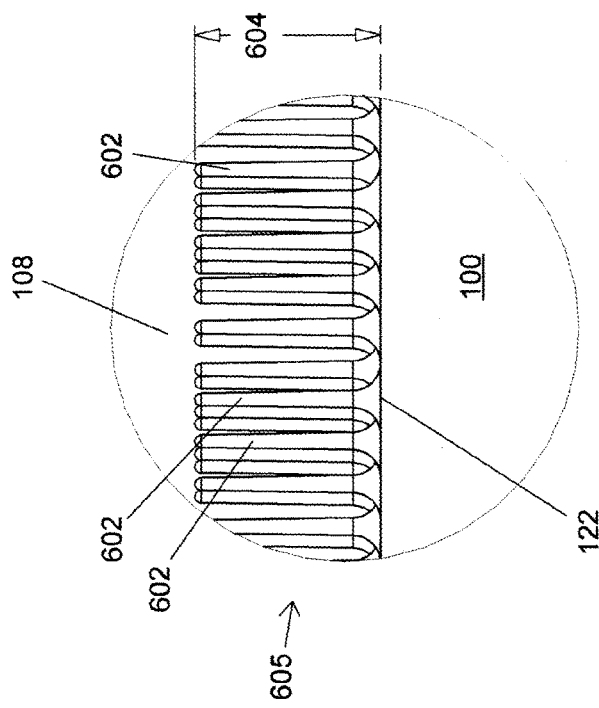
FIG. 34 is a side elevational view of the nanofiber array of FIG. 32.
Figure 32:
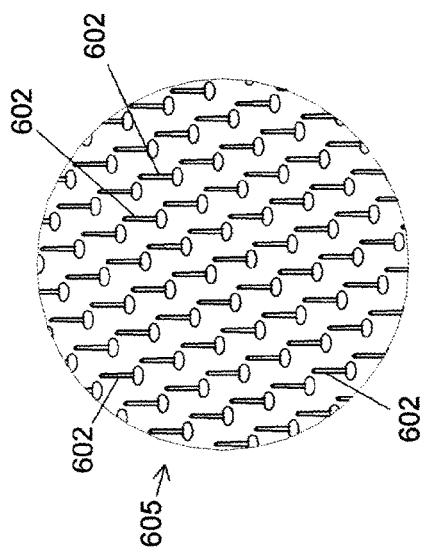
FIG. 32 is a perspective view of an array of nanofibers extending from a portion of a filter lamina for a tunable nanofiber filter disclosed herein.
Figure 33:
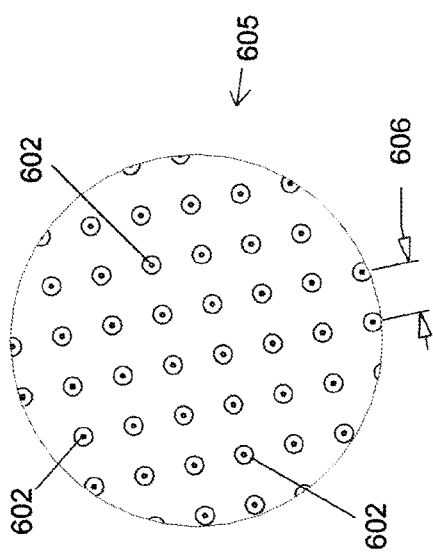
FIG. 33 is a plan view of the nanofiber array of FIG. 32.

Referring now to FIGS. 32 through 34, the bottom surfaces 122 of one or more channels 108 of the primary filter laminas 100 contained within the filter 600 are at least partially covered with one or more arrays of nanofibers 605. As used herein, the terms "nanofiber array" and "array of nanofibers" refer to a plurality of freestanding nanofibers 602 extending from a backing member, the nanofibers having a predetermined nanofiber diameter 603 and nanofiber height 604 spaced at predetermined nanofiber distance 606 apart, as shown in FIGS. 32 through 34. A nanofiber array having a predetermined nanofiber diameter, height, and spacing forms a topography. Nanofiber arrays, and thus topographies, can be tuned to suit a specific application by modulating nanofiber diameter, height, and spacing. In some embodiments, a nanofiber array can be attached to a portion of a filter lamina applying an adhesive between the backing member of the nanofiber array and the filter lamina portion. In other embodiments, a nanofiber array can be attached to a portion of a filter lamina by using the filter lamina portion as the backing member upon which the nanofiber array is integrally formed.

Figure 35:
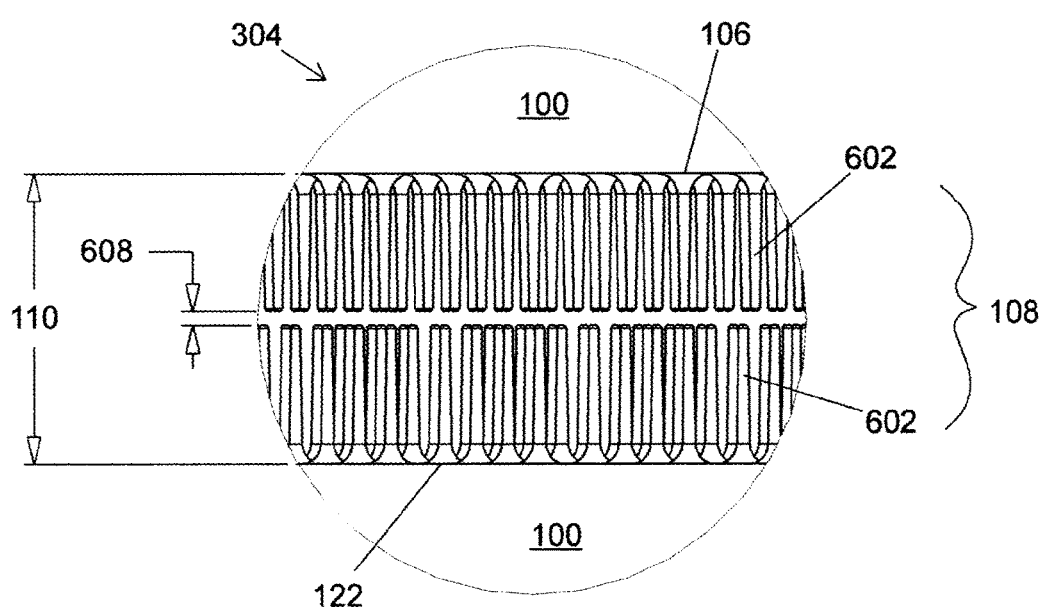
FIG. 35 is a side elevational view of a portion of a flow passage defined through a lamina stack of a tunable nanofiber filter disclosed herein.
Figure 38:
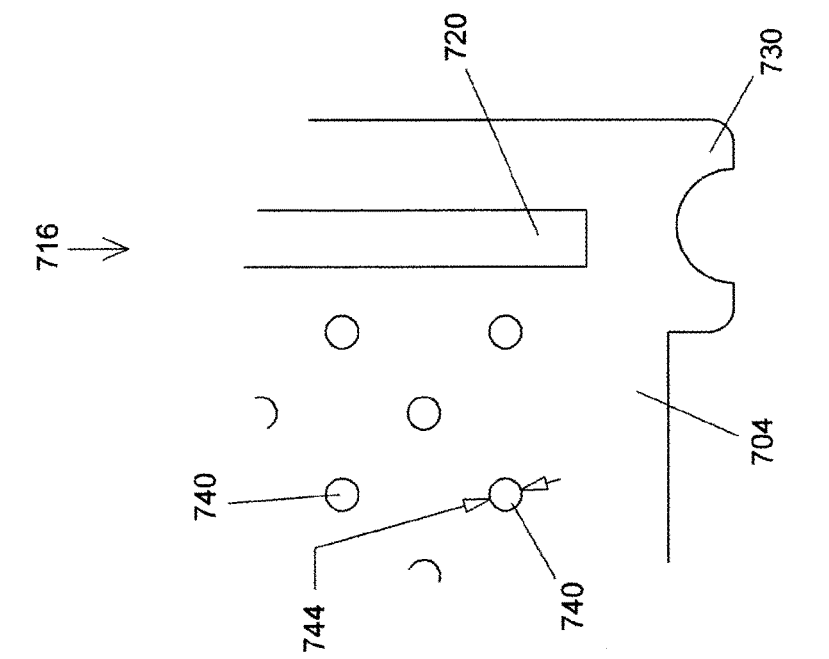
FIG. 38 is an enlarged view of the filter lamina of FIG. 36 at inset A.
Figure 36:
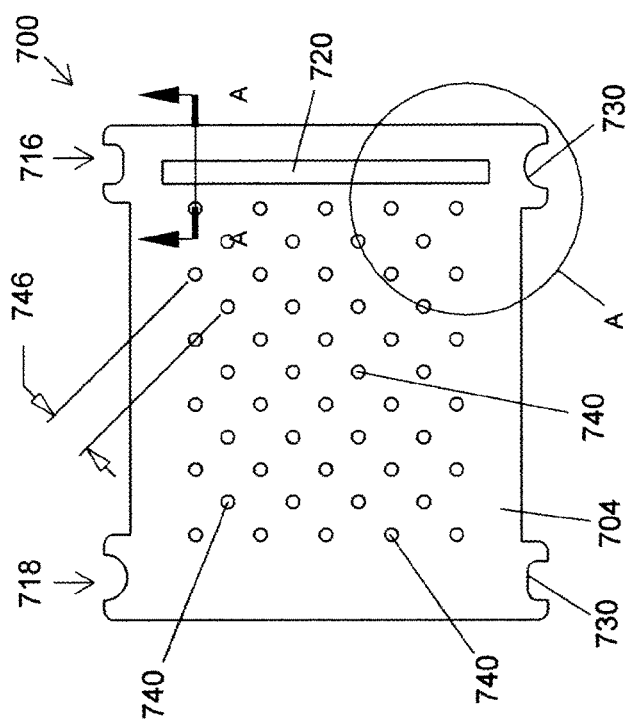
FIG. 36 is a plan view of another filter lamina for an alternate embodiment of a tunable nanofiber filter.
Figure 37:
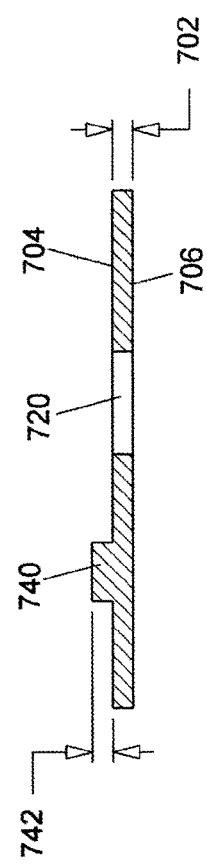
FIG. 37 is a partial sectional view of the filter lamina of FIG. 36 at line A-A.
Figure 39:
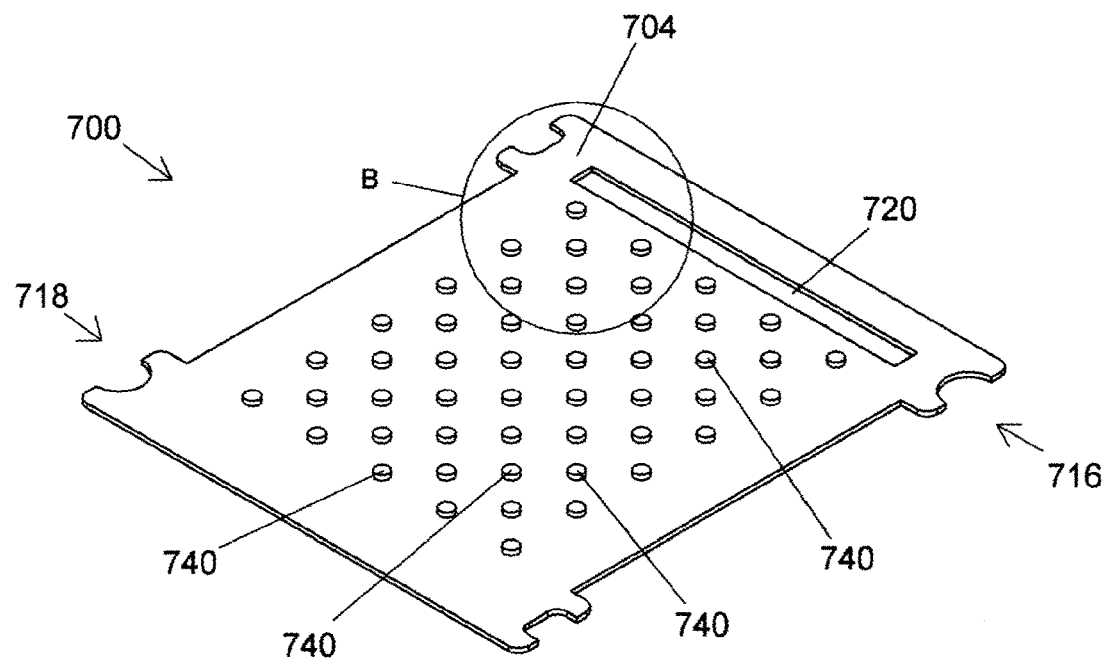
FIG. 39 is a perspective view of the filter lamina of FIG. 36.
Figure 40:
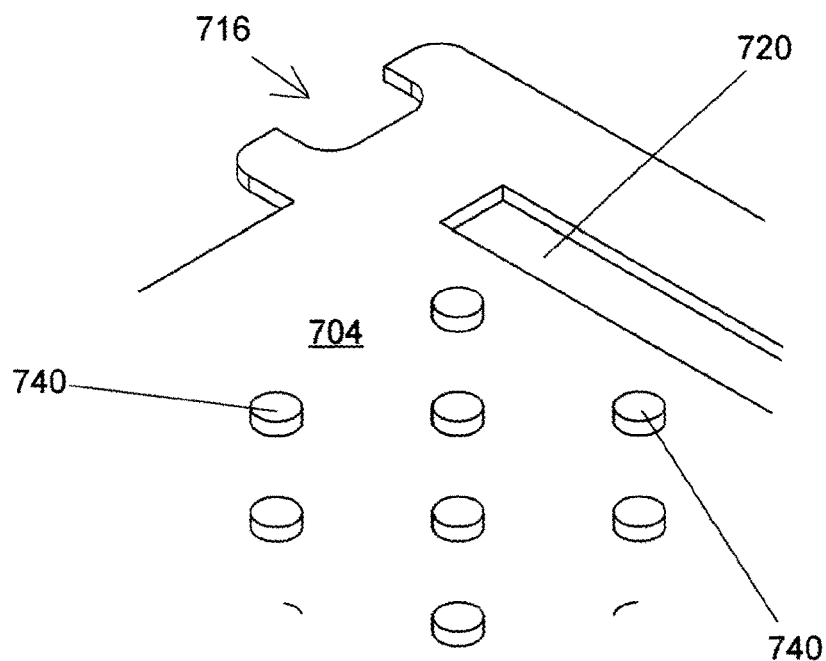
FIG. 40 is an enlarged view of the filter lamina of FIG. 39 at inset B.

In addition, or alternatively in some embodiments, as shown in FIG. 35, a portion of the lower surfaces 106 and 206 of each primary and secondary filter lamina 100 and 200 can be at least partially covered with one or more arrays of nanofibers 605. In some embodiments, the portion of the lower surfaces 106 and 206 of each primary and secondary filter lamina 100 and 200 overlapping a channel 108 of an adjacent underlying primary filter lamina 100 can be include one or more arrays of nanofibers 605. For example, referring now to FIG. 35 as well as FIGS. 1 through 5, 11A, and 11B, there is depicted a portion of a flow passage 304 of a lamina stack 300 contained in filter 600 having nanofibers 602 formed on bottom surface 122 of channel 108 of a primary filter lamina 100, and on the bottom surface 106 of an adjacent primary filter lamina 100 overlapping the channel 108 of the underlying filter lamina 100. Opposing nanofibers 602 are separated by a nanofiber gap 608 that is less than the depth 110 of channel 108. In other embodiments, the entire lower surfaces 106 and 206 of each primary and secondary lamina 100 and 200 in a lamina stack 300 can be covered with nanofibers 602.

Removal of one or more contaminants from a fluid to be filtered can be accomplished using the tunable nanofiber filter 600 by flowing the fluid into the filter 600 via the lumen 512 in the tubular connector portion 514 of the upper housing 500, through the trough 510 and the laterally extending portion 511 thereof into the nanofiber 602 lined flow passages 304 defined by the channels 108 and bottom surfaces 106, 206 of adjacent filter laminas 100, 200 in the lamina stack 300, out of the flow passages 304 into the laterally extending portion 411 and trough 410 of the lower housing portion 400, and out of the filter 600 via the lumen 412 in the tubular connector portion 414 of the lower housing 400.

Once the fluid has been flowed through the flow path 601 the retentate can be left in the filter or flushed from the filter depending on the configuration of nanofibers and nanoholes. The tunable nanofiber filters can extract certain retentates from a fluid flow at different positions along the flow path 601 through the filter, thereby enabling extracted retentates to be used in diagnostic analyses to determine various characteristics of the retentates. For example, the filter may be disassembled and the retentate analyzed by colorimetric or other methods to determine the composition of the retentate.

Nanofiber filters constructed in accordance with the present disclosure can be tuned to remove specific contaminants such as pathogens, chemical contaminates, biological agents, and toxic or reactive compounds from a fluid to be filtered by selecting one or more of nanofiber diameter 603, height 604, distance 606, gap 608, and composition to control specificity of filtration. For example, the height 604 of nanofibers 602 and depth 110 of channels 108 can be selected to control the gap 608 between opposing fibers 602 in a flow passage 304 and thus modulate the flow rate of filtrate and size of particles that can pass unhindered through the gap 608.

Retentate can be retained on nanofibers by operation of local Van Der Waals forces which can be enhanced by tuning the fiber material. In some applications, it is not necessary for the retentate to pass through the nanofibers, rather, what is necessary is merely that the retentate contact a portion of the fibers in order to be retained. The large ratio of length of the fluid path in channels 108 to gap 608 ensures that particles of retentate will collide with the nanofibers 602 due to diffusion, and thus have many chances to attach to nanofibers. Electrostatic field strength is also higher at the tips of fibers since the tip radius curvature is always sharper than the fiber body. Attachment affinity is enhanced at the fiber tip. The gap 608 eliminates clogging of the filter pores. Inert particles can move freely through the gap 608 without clogging the filter. For example, if filtering a pathogen from blood, large red corpuscles could move unhindered with a gap 608 of 10 microns while the nanofibers 602 capture retentate. In this way, filter laminas comprising arrays of freestanding nanofibers 602, such as those depicted in FIGS. 32 through 34, provide a filter media with tunable topography that can be optimized to interact with and/or retain certain substances in unique manners in which the substance being affected and the character of the Debye moment and Van Der Waals interaction can be determined by the height, diameter, spacing, and constituent material of the nanofibers, as well as the relative charges of a given substance and the nanofibers.

The arrangement of nanofibers in an array can impact filtration specificity and efficiency by modulating the strong gradients in the electrical and chemical potential fields of normally highly reactive sub-micron length scale structures. Control of these gradients at process length scales can enhance efficiency of transport or flow. However, if two nanofibers are in close proximity and the potential fields overlap, then the gradient of the potential field is reduced and the advantages of the nanoscale topography are reduced. The arrangement of nanofibers in a nanofiber array of the proper scale and spacing will preserve the separation of nanofibers thus optimizing the potential field gradient.

The non-random placement of nanofiber tips in a nanofiber array represents a significant enhancement over nanofiber structures produced by other methods, such as electrospinning, because each fiber forming an array of nanofibers described herein has an independent "end" or "tip." The "ends" or "tips" of the nanofibers have stronger field gradients than the body of the fibers because gradients are enhanced with curvature and the curvature is highest at the tip. Thus, the use in filter devices of nanofiber arrays having millions of tips per square centimeter of lamina surface preserves and enhances the local fiber field gradient far better traditional fibrous filter media and devices which rely on layered mats (woven and unwoven) of fibers laid down on a substrate.

Accordingly, in one embodiment, the nanofiber gap 608 between ends of opposing fibers on the bottom surface 122 of channels 108 and lower surfaces 106, 206 of overlying filter laminas 100, 200 can be less than about 75% of channel depth 110. In some embodiments, the gap 608 can be less than about 50%, or less than about 30%, or even less than about 20% of channel depth 110. In certain embodiments, the gap 608 between ends of nanofibers of opposing nanofiber arrays is about 20%, 19%, 18%, 17%, 16%, 15%, 14%, 13%, 12%, 11%, 10%, 9%, 8%, 7%, 6%, 5%, 4%, 3%, 2%, or 1% of channel depth 110. Opposing nanofibers 602 within a flow passage 304 need not be of the same height 604, however, use of nanofiber arrays 605 comprising nanofibers 602 having the same average height 604 provide more thorough, reliable, and consistent filtration by maintaining substantially uniform flexibility and fiber surface area. For example, the use of opposing arrays of nanofibers having a substantially uniform height can maintain consistent filtration by both arrays, whereas the use of opposing arrays having different average nanofiber heights can alter the filtration characteristics of the arrays in such a way that one array filters one or more different contaminants from a fluid flowed between the arrays that does the other opposing array of a different height. Additionally, depending on the relevant characteristics of the contaminant(s) contained in the fluid to be filtered and the relative heights of the opposing nanofibers, one nanofiber array can become full of a contaminant and cease contributing to filtration of the fluid before the other opposing nanofiber array.

Figure 44:
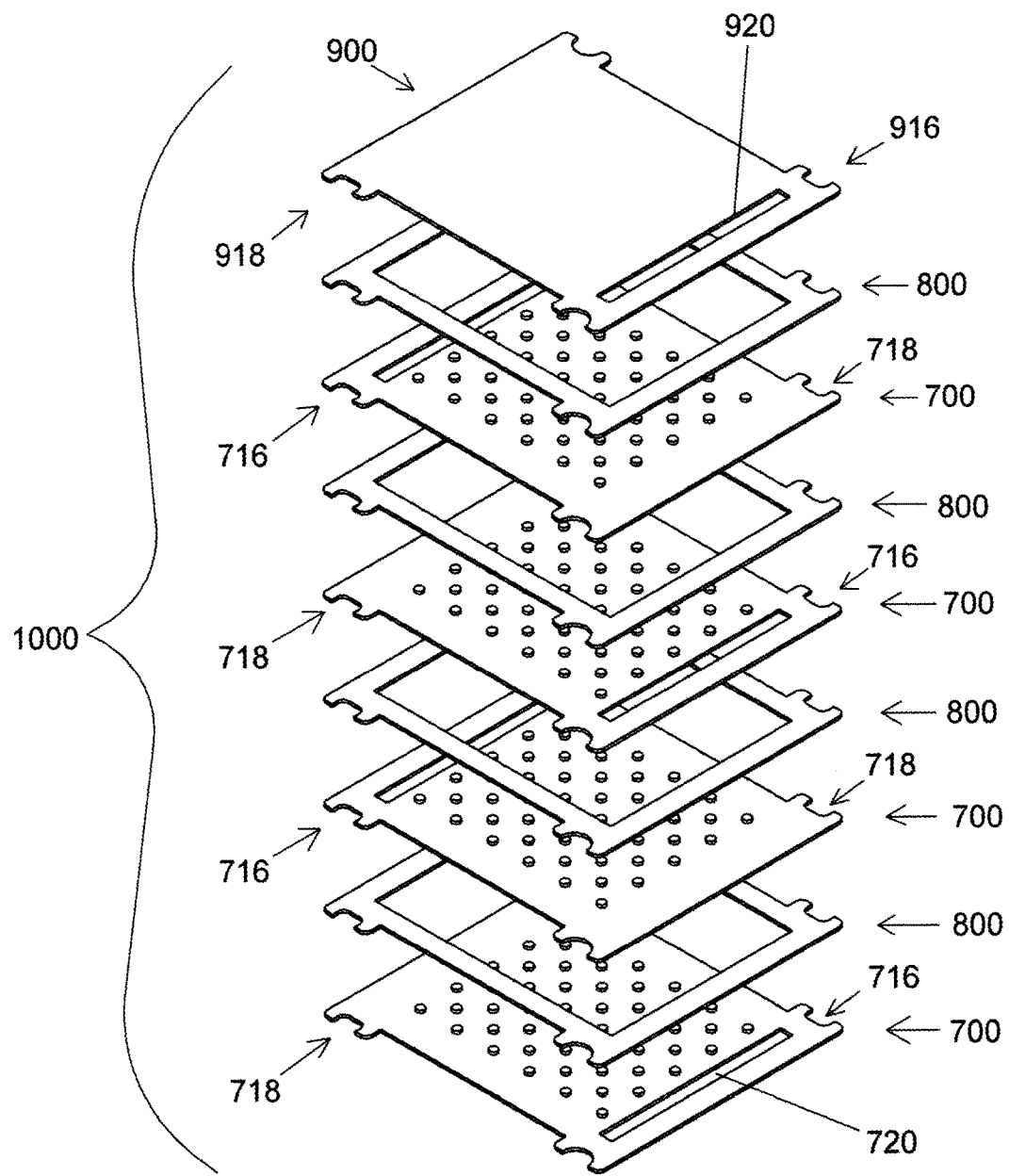
FIG. 44 is an exploded perspective view of a lamina stack for an alternate embodiment of a tunable nanofiber filter formed from a plurality of filter laminas of FIG. 36 and the spacer laminas of FIG. 41.

Other factors which can affect the filtration characteristics of tunable nanofiber filters disclosed herein include the dimensions of channels 108 formed in filter laminas. Channel dimensions can be varied to accommodate the technical demands of any given fluid application based on, for example, such considerations as mass and volume flow rates, viscosity, and other aspects of a given fluid which affect its flow. Although a range of exemplar channel dimensions believed to be practically applicable to a wide variety of applications are provided herein, it should be understood that no upper limit on any such dimensions exists or is hereby implied. For example, channel width 112 and channel length can be 1.0 meter or more. However, as channel width 112 increases, the rigidity of the constituent material of the laminas can begin to affect the uniformity of channel depth by permitting a portion of an adjacent overlying lamina to sag into the channel 108. In such cases, support structures can be positioned on the bottom surface 122 of the channels 108 (for example, as shown in FIG. 44) as needed to maintain a uniform channel depth.

Accordingly, in some embodiments, filter lamina channels 108 can have a channel depth 110 of from about 20 μm to about 1.0 cm, a channel width 112 of from about 20 μm to about 2.0 mm, a channel length of from about 1.0 mm to about 10 cm, and a channel distance 114 of about 10 μm to about 500 μm. In other embodiments, filter lamina channels 108 can have a channel depth 110 of from about 20 μm to about 500 μm, a channel width 112 of from about 20 μm to about 2.0 mm, a channel length of from about 1.0 mm to about 10 cm, and a channel distance 114 of about 50 µm to about 200 µm. In one embodiment, the filter lamina channels 108 can have a channel depth 110 of about 100 µm, a channel width 112 of about 200 µm, a channel length of about 10 mm, and a channel distance 114 of about 100 µm.

It should be noted that channel depth 110 can impact the efficiency of filtration in some embodiments of the tunable nanofiber filters disclosed herein. For example, increasing channel depth 110 can increase the Reynolds Number to the point that inertial forces create turbulence and enhance mixing. The resulting increase in flow vorticity correspondingly increases the probability that a particle of retentate will contact a nanofiber disposed in the channel and thus the frequency of surface adsorption of such particles by the nanofibers. In this way, the efficiency of filtration can be increased as a function of channel depth 110 up to a channel depth 110 of about 5.0 cm.

In some embodiments of the tunable nanofiber filters disclosed herein, increases in efficiency of filtration can be realized based on placement and arrangement of nanofiber arrays within channels 108. For example, opposing arrays of nanofibers individually attached to the bottom surface 122 of channels 108 and lower surfaces 106, 206 of overlying filter laminas 100, 200 are in the fluid boundary layer. The arrangement, stiffness, spacing and height of the nanofibers therefore effect the properties of the boundary layer in the longitudinal and transverse directions, and alter the flow profile in a complex manner. The use of nanofiber arrays to form asymmetric, opposing boundary layer profiles can create shear stress in the channel, disrupt laminar flow, and enhance vorticity and mixing as discussed above to provide increases in filtration efficiency. By contrast, mixing can be inhibited by narrow or shallow channels at low Reynolds Numbers where flow becomes laminar with established boundary layers.

The primary advantage to a system in which a fluid to be filtered flows over one or more arrays of nanofibers versus a system in which the fluid flows through the nanofibers is that "flowover" system can be designed to prevent clogging. In an engineering sense, "flowthrough" systems apply pressure across a membrane to force fluid through the membrane. When the membrane clogs the resistance increases, requiring more work for diminishing flow. The work required to move fluid in the present flowover design is simply the force required to overcome viscous drag in a microchannel. This drag and thus the pressure/flow relationship will not change over the life of the filter. Rententate or contaminates stick to nanofibers and cannot block the gap 608.

FIGS. 36 through 40 depict another primary filter lamina 700 for an alternate embodiment of a tunable nanofiber filter of the present disclosure. Primary filter lamina 700 is identical to primary filter lamina 100 in all aspects of form and function except as subsequently specifically described.

For example, filter lamina 700 has a lamina thickness 702, a first (upper) planar surface 704, a second (lower) planar surface 706, a first end 716, and a second end 718. Filter lamina 700 also has locating features 730 which are alike in form and function to locating features 130 of filter lamina 100. However, upper planar surface 704 of filter lamina 700 does not contain the channels 108 present in upper surface 104 of filter lamina 100. Rather, primary filter lamina 700 has formed on upper planar surface 704 a plurality of protrusions 740 of protrusion height 742 and protrusion diameter 744 which can be regularly geometrically spaced a protrusion distance 746 from each other to cover a central region of upper planar surface 704. Primary filter lamina 700 has a single aperture 720 defined in first end 716 rather than the multiple apertures 120 of filter lamina 100. In some embodiments, the single aperture 720 of filter lamina 700 can be a slot.

Figure 41:
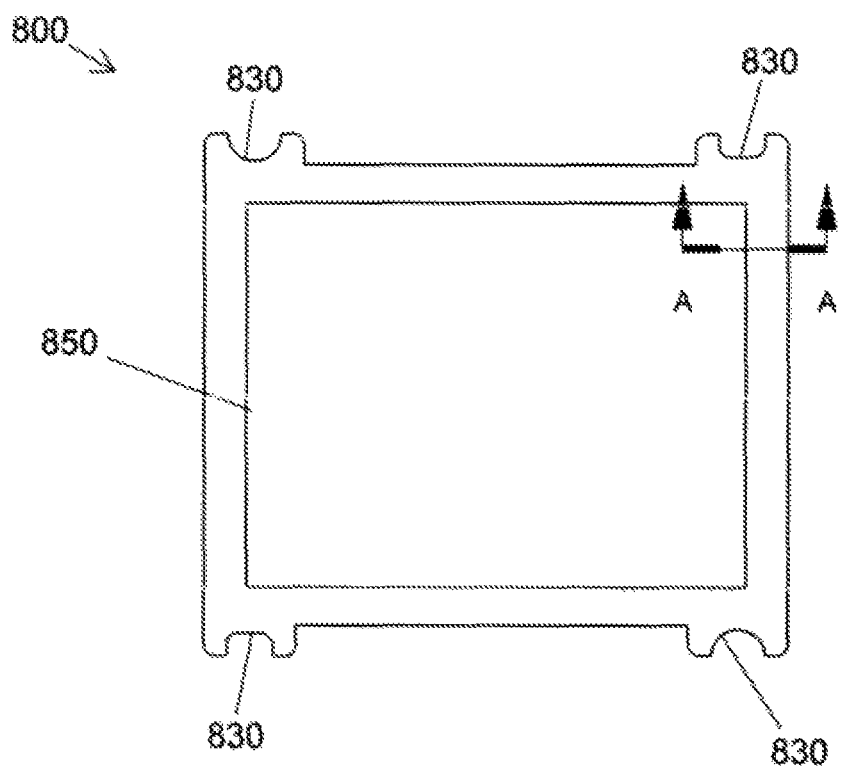
FIG. 41 is a plan view of another spacer lamina for an alternate embodiment of a tunable nanofiber filter.
Figure 42:
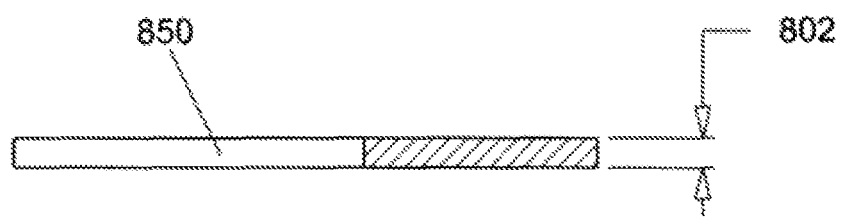
FIG. 42 is a partial sectional view of the spacer lamina of FIG. 41 at line A-A.

A spacer lamina 800 which functions as a spacer and sealer layer for an alternate embodiment of a tunable nanofiber filter is depicted in FIGS. 41 and 42. Spacer lamina 800 of spacer lamina thickness 802 equal to protrusion height 742 of protrusions 740 of filter lamina 700 can be formed from a variety of materials, including any suitable low-melt polymeric material. Locating features 830 are alike in form and function to locating features 130 of filter lamina 100. Spacer lamina 800 also includes a large central aperture 850 configured such that when spacer lamina 800 and primary filter primary 700 are aligned in a stack, aperture 720 and protrusions 740 of primary lamina 700 are circumscribed by large central aperture 850 of spacer lamina 800.

Figure 43:
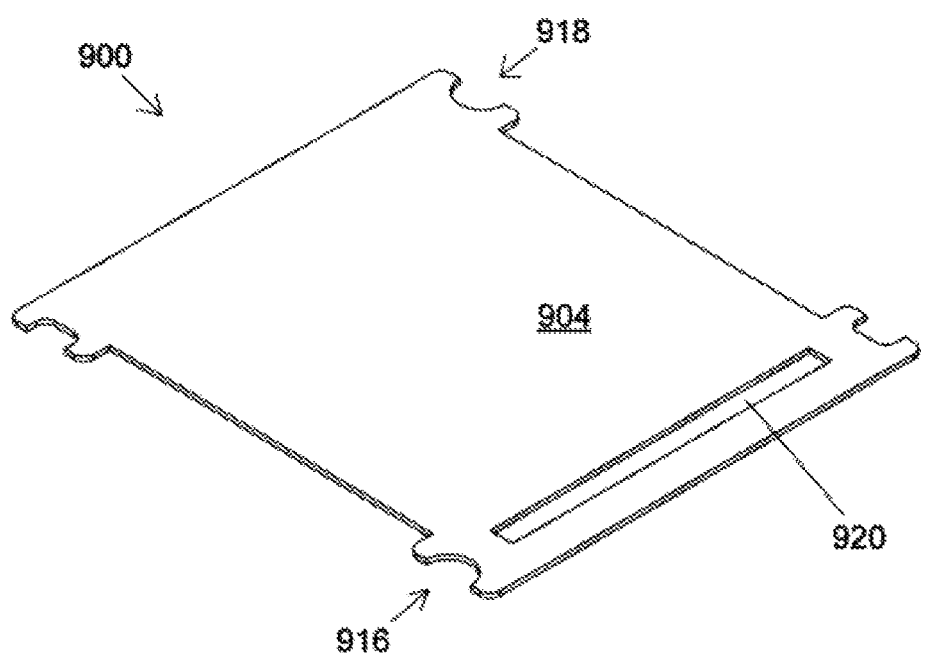
FIG. 43 is a perspective view of a top spacer lamina for an alternate embodiment of a tunable nanofiber filter.

FIG. 43 depicts a secondary filter lamina 900 for an alternate embodiment of a tunable nanofiber filter, secondary filter lamina 900 being identical in all aspects to primary filer lamina 700 except that upper planar surface 904 of secondary filter lamina 900 does not include the protrusions 740 present on upper planar surface 704 of primary filter lamina 700. Secondary filter lamina 900 has a lower planar surface 906 (not shown) opposite upper planar surface 904.

Laminas 700, 800 and 900 can be assembled into a stack 1000 as depicted in FIG. 44. Spacer laminas 800 are positioned between adjacent primary filter laminas 700, and between the uppermost primary filter lamina 700 and the secondary filter lamina 900 positioned on top of the stack 1000. Adjacent primary filter laminas 700 (separated only by spacer laminas) can be rotated 180 degrees about a vertical axis extending through the stack 1000 such that the first end 716 of a given primary filter lamina is aligned with and proximal to the second end 718 of any adjacent primary filter lamina 700. Secondary filter lamina 900 can be similarly positioned such that second end 918 of filter lamina 900 overlaps and is proximal to the first end 716 of the adjacent underlying primary filter lamina 700.

Figure 45:
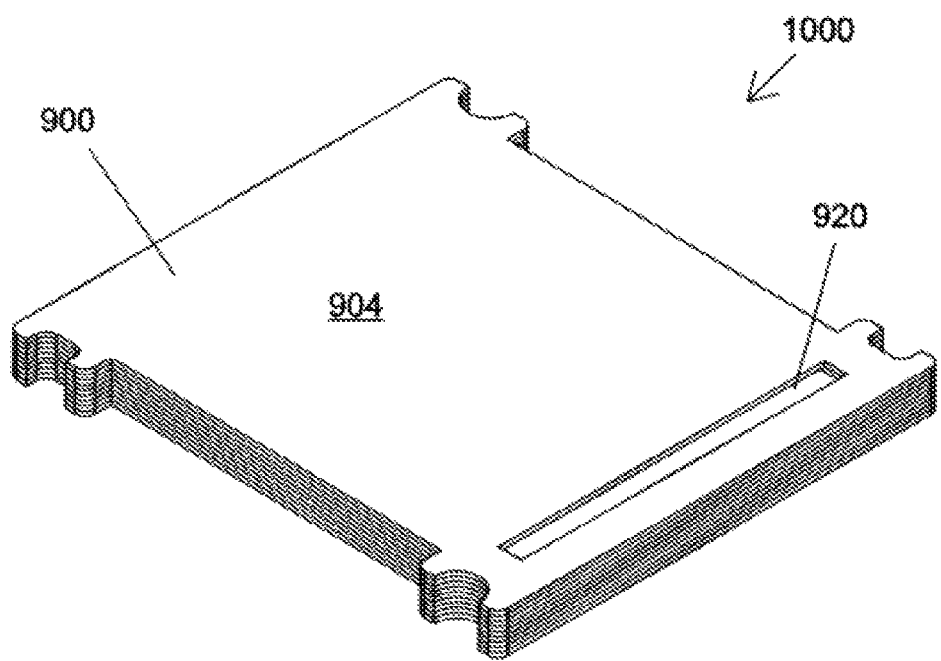
FIG. 45 is a perspective view of the assembled lamina stack of FIG. 44.
Figure 46:
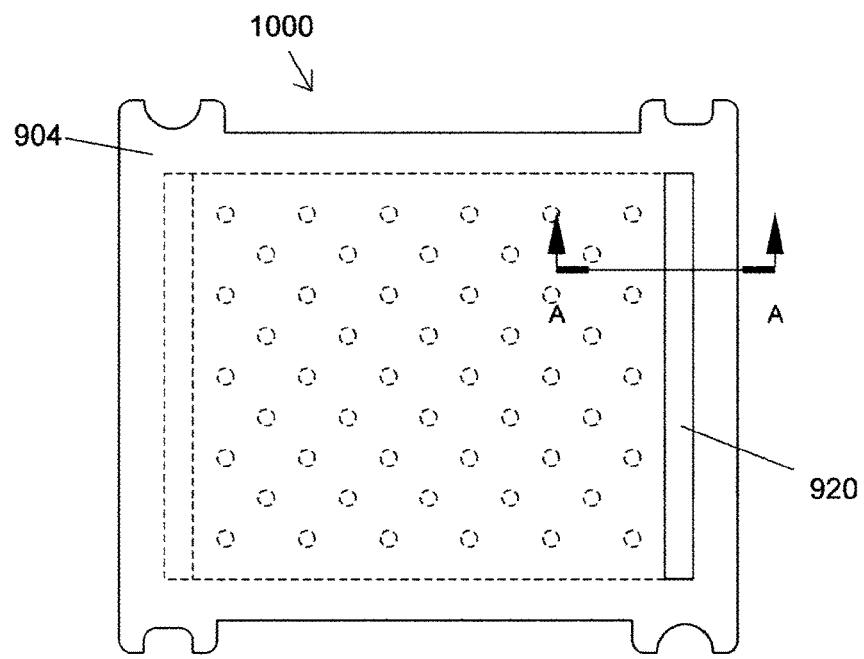
FIG. 46 is a plan view of the lamina stack of FIG. 45.
Figure 47:
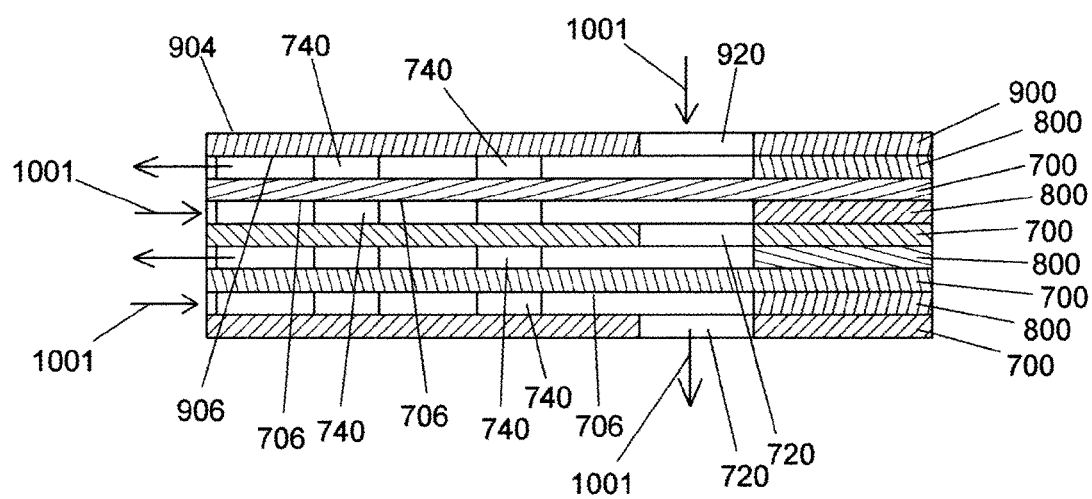
FIG. 47 is a partial sectional view of the lamina stack of FIG. 46 at line A-A. Arrows indicate flow path.

Referring now to FIGS. 45 through 47, there is depicted an assembled stack 1000 of the laminas shown in FIG. 44. As best seen in FIG. 47, aperture 920 of secondary filter lamina 900, apertures 720 of primary filter laminas 700, and apertures 850 of spacer laminas 800 together form a continuous flow passage 1001 winding in alternating directions back and forth through the stack 1000 from the aperture 920 of the secondary filter lamina 900 to the aperture 720 of the lowermost (bottom) primary filter lamina 700 as indicated by the arrows. The protrusions 740 of primary filter laminas 700 extend through the central aperture 850 of each spacer lamina to maintain substantially uniform spacing between upper planar surfaces 704 of underlying primary filter laminas 700 and adjacent lower planar surfaces 706, 906 of overlying primary filter laminas 700 and the secondary filter lamina 900, respectively, so as to permit flow of fluid through a flow space defined therebetween and around protrusions 740 extending through aperture 850 of each secondary lamina 800. The laminas of stack 1000 can be bonded together in a suitable fixture prior to assembly in a housing as previously herein described.

Upper 704 and lower 706 planar surfaces of primary filter laminas 700 can have formed thereon arrays of nanofibers as previously herein described and depicted in FIGS. 32 through 34. The height 742 of protrusions 740 of primary filter laminas 700, and the thickness 802 of spacer laminas 800 together with the height and spacing of the nanofibers, can be chosen or "tuned" to selectively determine the filtering characteristics of the assembled stack 1000.

The filtering characteristics of a tunable nanofiber filter device of the present disclosure can be configured to suit a specific intended use by changing various characteristics of the nanofibers forming a given nanofiber array, such as length, pattern or density, or by applying a reactant material onto the nanofibers using printing, sputtering, chemical vapor deposition, or by the choice of the fiber composition itself. The ability to tailor the nanofibers in these ways allows for the creation of customized arrays of nanofibers having specifically tuned topographies which can provide multiple functions based on the different diffusion and reactant rates of a fluid or fluids to be filtered when the fluid or multiple fluids to be filtered are exposed to the nanofiber arrays. For example, whole blood is a complex fluid containing many chemokines, signaling molecules, leucocytes, lipoproteins, immunoglobulins. Some constituents can be filtered by size, some by chemistry. There are a considerable number of antibodies designed to bind to specific proteins, which, incorporated in the fibers in specific areas, channels or layers could separate many constituents in one device. The specificity of filtration can be further affected by modulating the spacing between primary filter laminas in the flow path through a stack of lamina (i.e., the distance between the upper and lower planar surfaces of two laminas forming the bottom and top walls of a flow path through a lamina stack). Nonetheless, some types of fluids can be more readily filtered using the tunable nanofiber filters of the present disclosure than other fluids. For example, fluids of relatively low viscosity can be more easily filtered than fluids having relatively high viscosity because with higher viscosity fluids, the nanofibers can function as a boundary layer which effectively decreases filtration of fluid passing through and over the nanofibers.

In the exemplar embodiments of tunable nanofibers filters previously described, the nanofibers on each filter lamina have a substantially uniform spacing and height. In other embodiments the nanofibers on a filter lamina may be formed in discreet regions in which the height, spacing, or height and spacing the fibers within each region are configured (i.e., tuned) to accomplish one or more specific tasks. For instance, it may be desirable in certain regions to form a flow passage with nanofibers configured to allow fluids to move therethrough with decreased velocity so as to allow for the occurrence of out-gassing from a chemical reaction. In another instance, a different specific configuration of nanofibers may be required to better induce a fluid to mix in a specific manner so as to control not only a chemical reaction but also the evolution of heat during the process.

Figure 48:
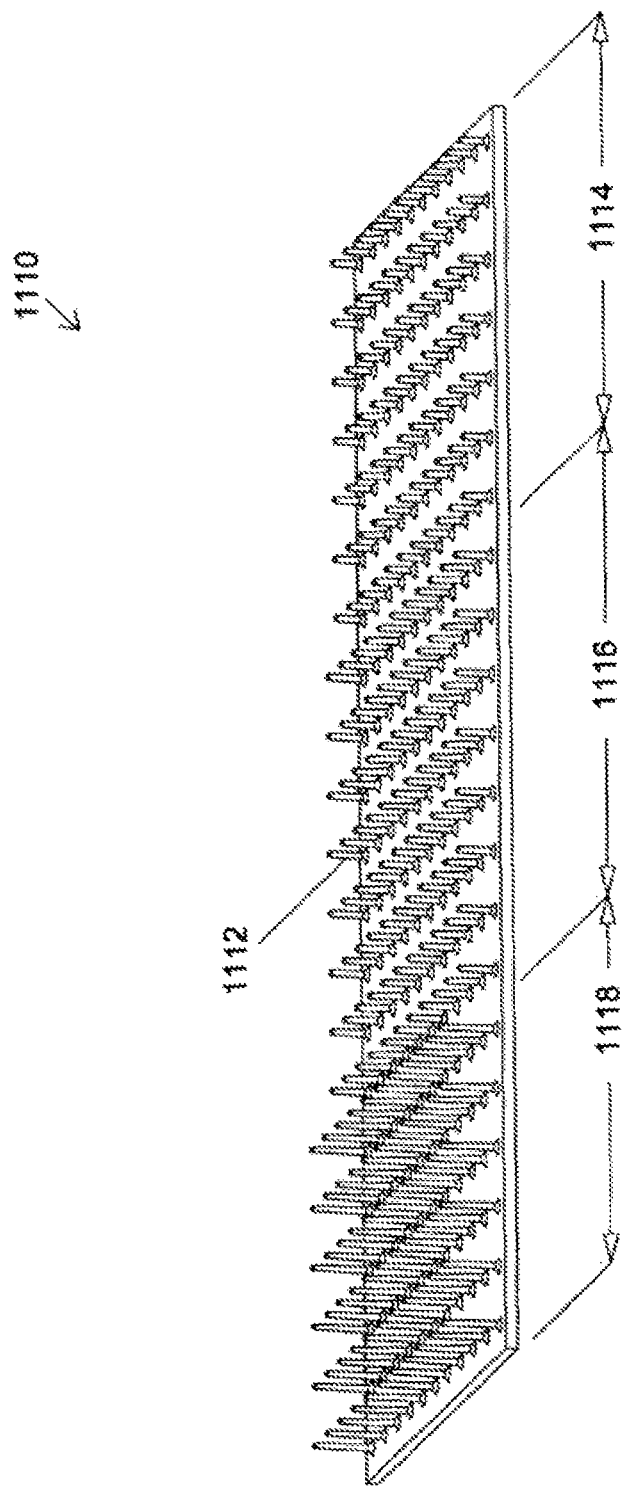
FIG. 48 is a perspective view of an embodiment of a filter lamina having discrete regions of tuned topography.

Accordingly, FIG. 48 depicts a filter lamina 1110 having a top planar surface with three discreet regions of nanofibers, each having its own unique tuned topography configured for a specific function. First region 1114 has nanofibers of a first height, region 1116 has nanofibers of a second height, and region 1118 has nanofibers of a third height. While the spacing between the nanofibers of the three regions is constant on filter lamina 1110, in other configurations the spacing between the fibers may be varied by region. In still other configurations, the height of nanofibers within a region is not constant but rather is varied in a predetermined manner to allow tuning of the region for a specific task. While nanofibers are shown on the top surface of filter lamina 1110 only, it will be understood that nanofibers may be formed on the bottom surface as well so that the tuning of a specific portion of the flow passage is determined by the nanofibers on the top and bottom surfaces of adjacent filter laminas, and by the spacing between the filter laminas.

Figure 49:
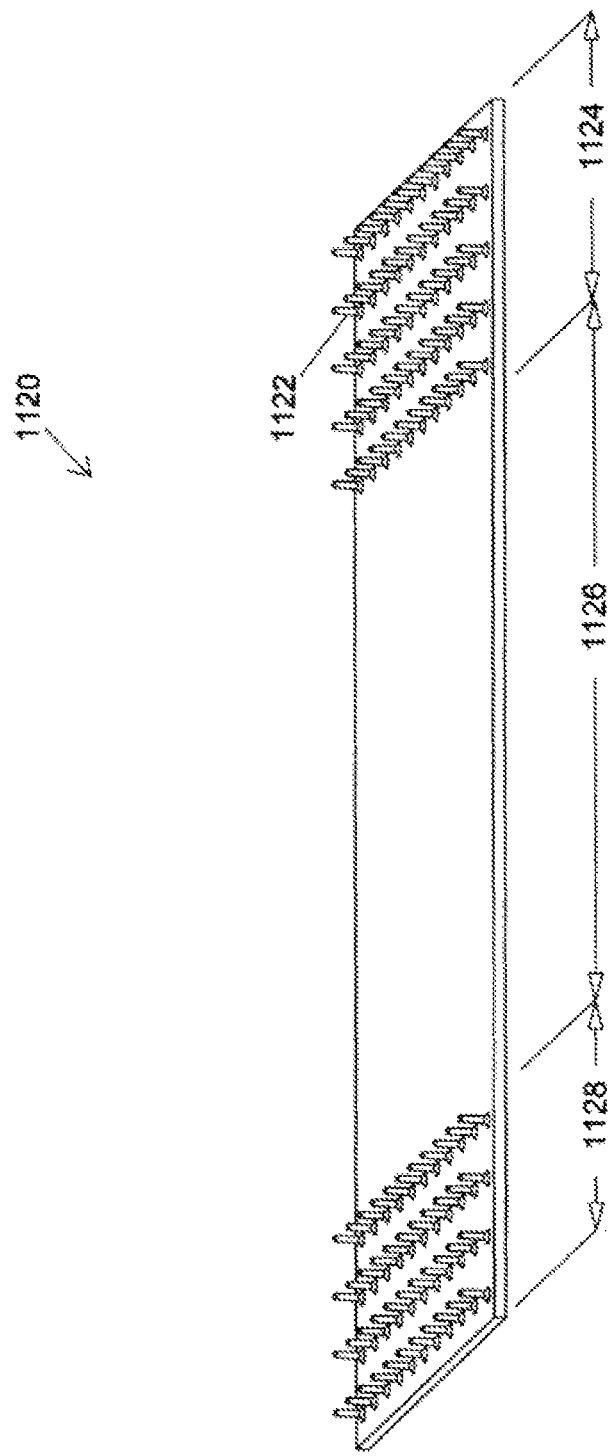
FIG. 49 is a perspective view of another embodiment of a filter lamina having discrete regions of tuned topography.

FIG. 49 depicts another filter lamina 1120 having three regions of topology. First region 1124 has an array of nanofibers 1122 of a predetermined height, second region 1126 has no nanofibers, and third region 1128 has an array of nanofibers of predetermined height. Although the nanofibers of the first and third regions 1124, 1128 are depicted as having the same predetermined height, it will be understood that the nanofibers 1122 of the first region 1124 may having a different height than the nanofibers of the third region 1128.

Figure 50:
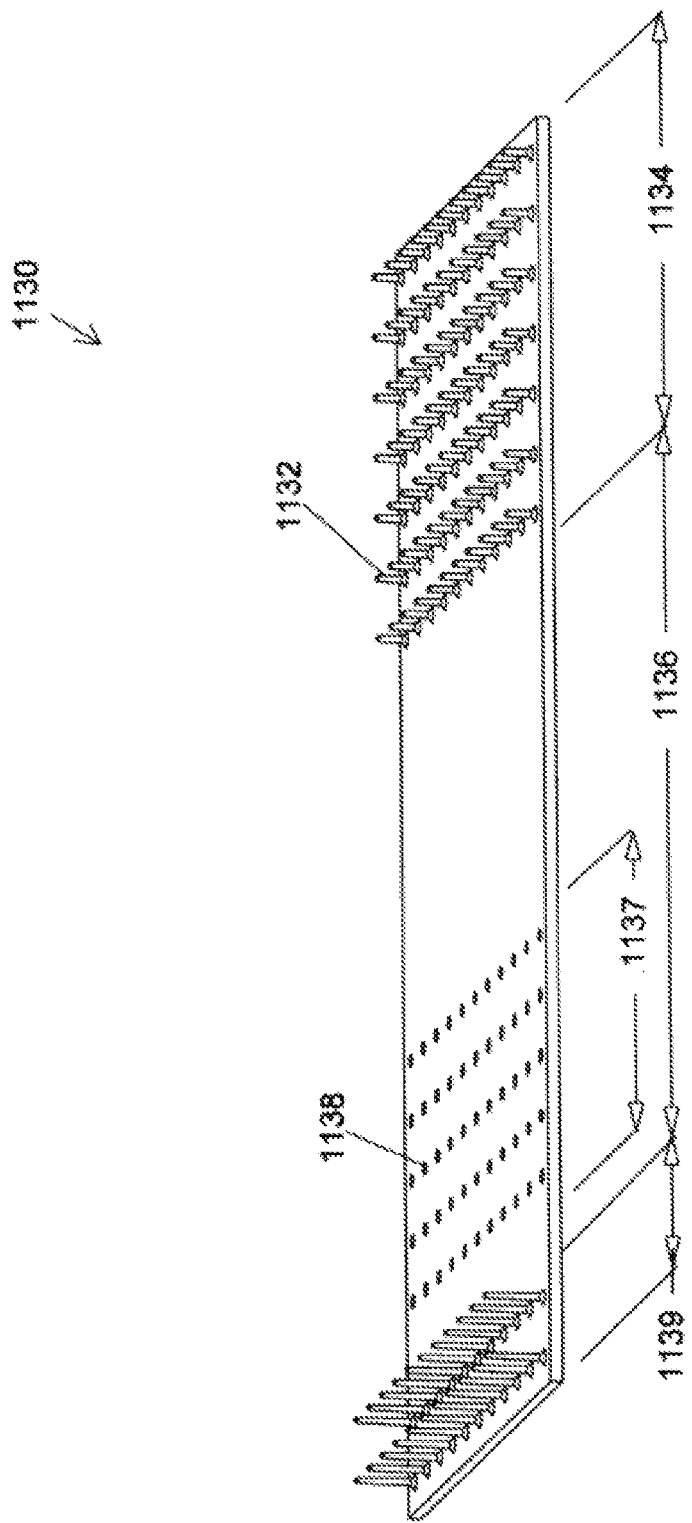
FIG. 50 is a perspective view of yet another embodiment of a filter lamina having discrete regions of tuned topography.

In yet another filter lamina 1130 depicted in FIG. 50, regions 1134 and 1139 each comprise an array of nanofibers having a different tuned configuration, and are separated by region 1136 which has no nanofibers. Instead, region 1136 comprises region 1137 in which is formed an array of nanoholes 1138. These nanoholes 1138 may allow certain fluids, such as a gas, to pass vertically through layers of lamina in the assembled stack, acting as a molecular sieve. The incorporation of arrays of nanoholes 1137 into laminas for a filter disclosed herein provides a secondary filtration path for the removal of target molecules or particles (such as harmful gases or other undesired material) from the primary flow passage 1001. The configuration of nanofiber arrays 1134 and 1139 adjacent to the region 1137 of nanoholes (upstream and downstream) and the configuration of the nanofiber arrays on the flow passage wall opposite to (i.e., above) region 1137 may be optimized (i.e., tuned) to separate a specific component or contaminant from fluid following the primary flow path through the primary flow passage.

Figure 51:
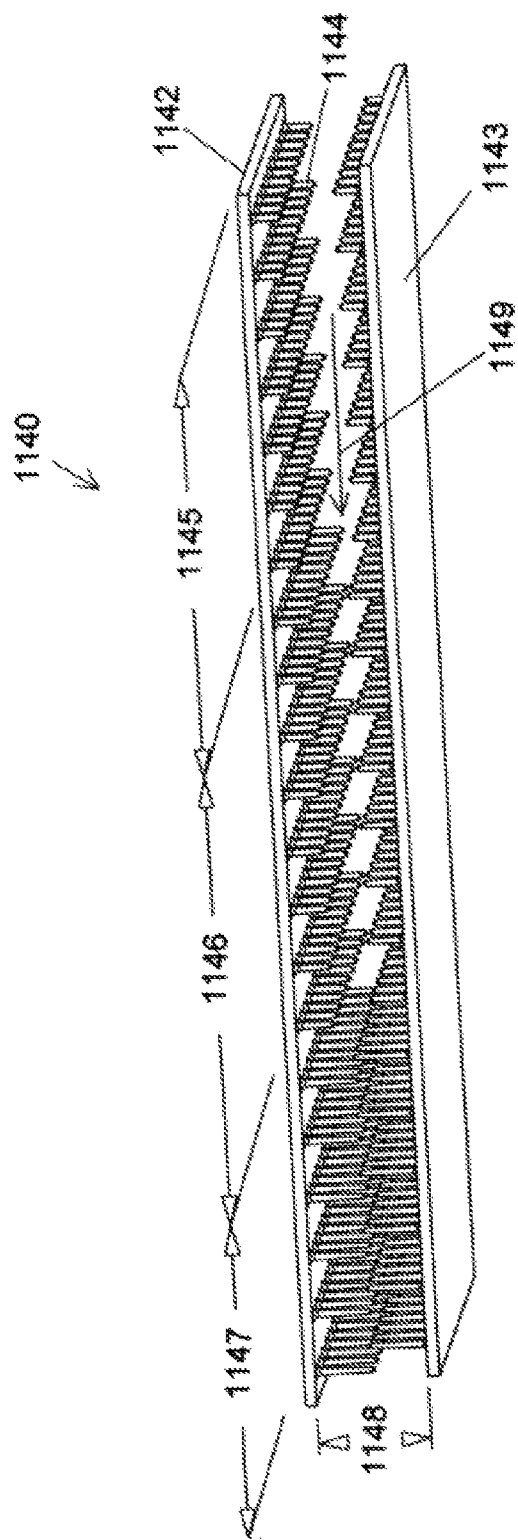
FIG. 51 is a perspective view of a pair of opposing filter laminas having discrete regions of tuned topography.
Figure 52:
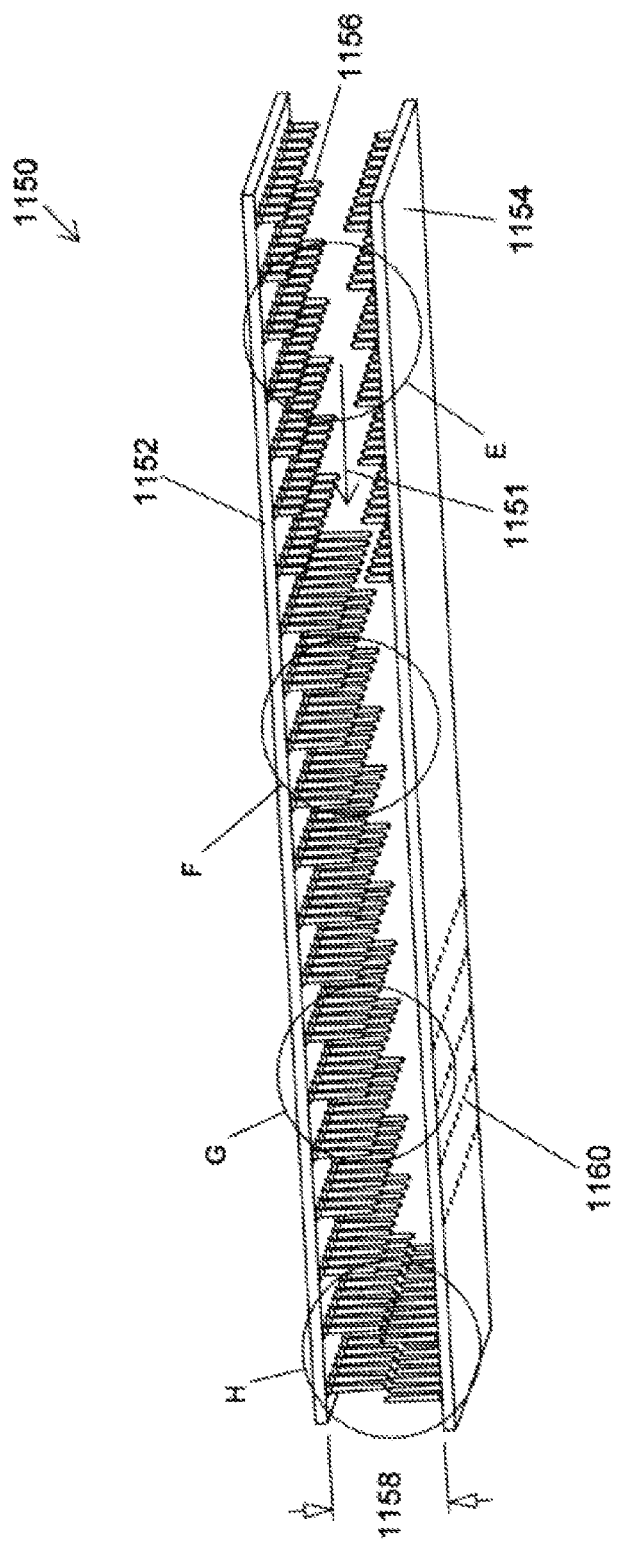
FIG. 52 is a perspective view of a second pair of opposing filter laminas having discrete regions of tuned topography
Figure 53:
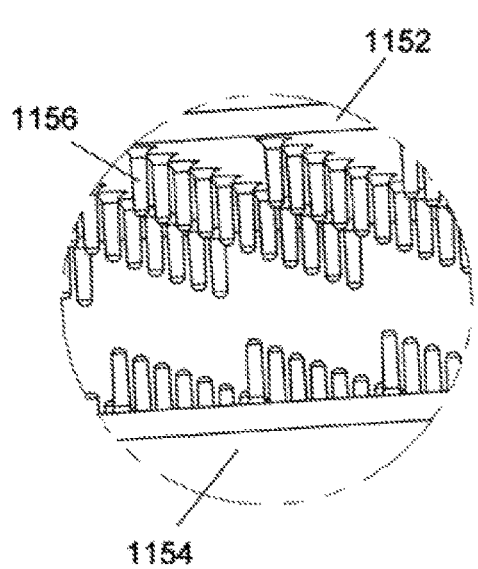
FIG. 53 is an enlarged view of the opposing filter laminas of FIG. 52 at inset E.
Figure 54:
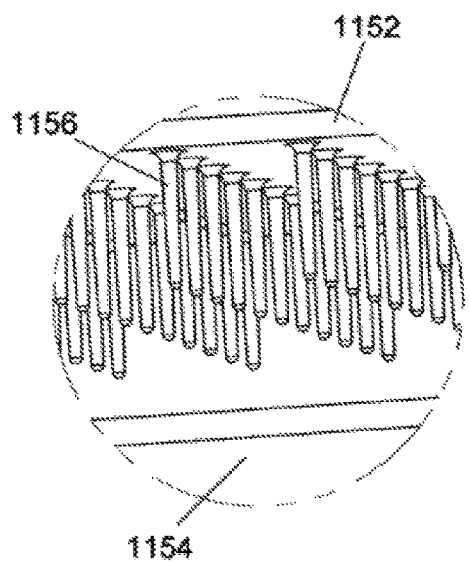
FIG. 54 is an enlarged view of the opposing filter laminas of FIG. 52 at inset F.
Figure 55:
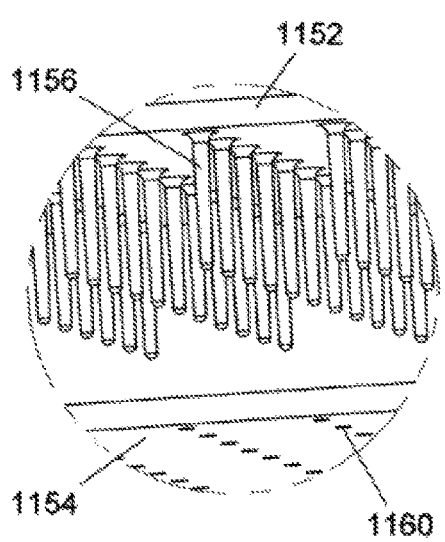
FIG. 55 is an enlarged view of the opposing filter laminas of FIG. 52 at inset G.

FIG. 51 depicts a portion 1140 of a primary flow passage formed between adjacent filter laminas 1142 and 1143. Upper filter lamina 1142 and lower filter lamina 1143 are depicted with arrays of nanofibers 1144 on only a single side of each, however this is for illustration of the flow passage only. It will be understood that filter laminas 1142 and 1143 can each have nanofibers 1144 on their opposed second surface, the nanofibers either symmetrically matching those protruding from their first surface, or having different configurations. The distance 1148 between adjacent surfaces of the upper and lower filter laminas 1142, 1143 is constant and together with the height of nanofibers 1144 in a given region determines the tuning and the resulting function (i.e., filtration specificity) of that region. Flow passage portion 1140 has first and second regions, 1145 and 1146 respectively, in which the different heights of the nanofibers 1144 in each region creates a gap of first and second widths between the opposing ends of the fibers in the flow path 1149, and a third region 1147 in which the height of nanofibers on either lamina is equal to about half the space between adjacent surfaces of filter laminas 1142, 1143 such that no space exists between opposing nanofibers extending from either filter lamina 1142 or 1143. In this embodiment shown, the nanofibers 1144 extending downward from the lower surface of filter lamina 1142 and upward from the upper surface of filter lamina 1143 are symmetrically opposed. In other instances the nanofibers are asymmetrically opposed on the filter lamina surfaces.

Figure 56:
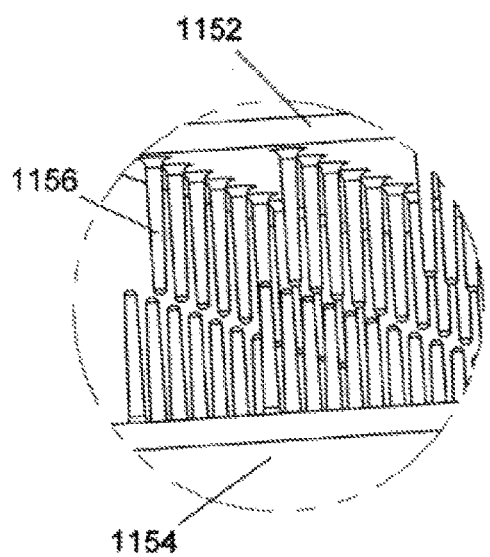
FIG. 56 is an enlarged view of the opposing filter laminas of FIG. 52 at inset H.

Another example of a partial flow passage 1150 formed by the bottom surface of filter lamina 1152 and top surface of filter lamina 1154 is depicted in FIGS. 52 through 56. Nanofibers 1156 of various heights cover specific regions of the opposed surfaces of filter laminas 1152 and 1154 which are separated by distance 1158. Filter lamina 1154 has formed therein a region with an array of nanoholes 1160. In a first portion of flow passage 1150 depicted in FIG. 53, nanofibers 1156 are symmetrically opposed between the top and bottom surfaces of filter laminas 1154 and 1152, respectively. The tips of nanofibers 1156 on each filter lamina are spaced evenly from the tips of opposing nanofibers on the other filter lamina. In a second portion of flow passage 1150 shown in FIG. 54, nanofibers 1156 extend from the bottom surface of filter lamina 1152, while the opposed upper surface region of filter lamina 1152 has an absence of fibers. In a third portion of flow passage 1150 shown in FIG. 55, the top surface of the flow passage has formed thereon an array of nanofibers 1156 and the bottom surface of the flow passage (i.e., the upper surface of the bottom lamina) has formed therein an array of nanoholes 1160 configured to remove a predetermined component from a fluid to be filtered passing through the primary flow path and to outflow such predetermined component from the filter via a secondary flow path through segregated passages therein. FIG. 56 depicts a fourth portion of the flow passage 1150 in which symmetrically opposed regions of nanofibers 1156 are arranged with no space between the ends of the opposed fibers.

The arrangement and configurations of nanofibers, nanoholes and flow passages in the exemplar filter laminas depicted in FIGS. 48 through 56 are illustrative of variations possible within the scope of the present invention and are by no means the only configurations possible or anticipated. A tunable nanofiber filter formed from filter laminas comprising nanofibers and, optionally, nanoholes as disclosed herein can incorporate additional or varied features and topographies not herein depicted and still fall within the scope of this invention. Any device for filtering or separating one or more substances from another liquid or gaseous substance, and which incorporates flow passages formed by layered laminas comprising tunable topographies of nanofibers, nanoholes, or both, falls within the scope of this invention.

In the exemplar filter laminas depicted in FIGS. 48 through 56, discreet regions within a given lamina are specifically configured to filter or separate certain substances such that a filter formed of these laminas may perform multiple filtration and separation functions simultaneously. In other embodiments a filter can be formed having laminas of two or more configurations combined in a lamina stack so that the filter many selectively remove two or more components from a liquid to be filtered that is passed through the flow passages. The laminas may each be configured for a single function (e.g., with a single uniform array of nanofibers tuned to selectively filter a predetermined component from a liquid to be filtered) or may have other or additional features, such as those filter laminas depicted in FIGS. 48 through 56.

Figure 57:
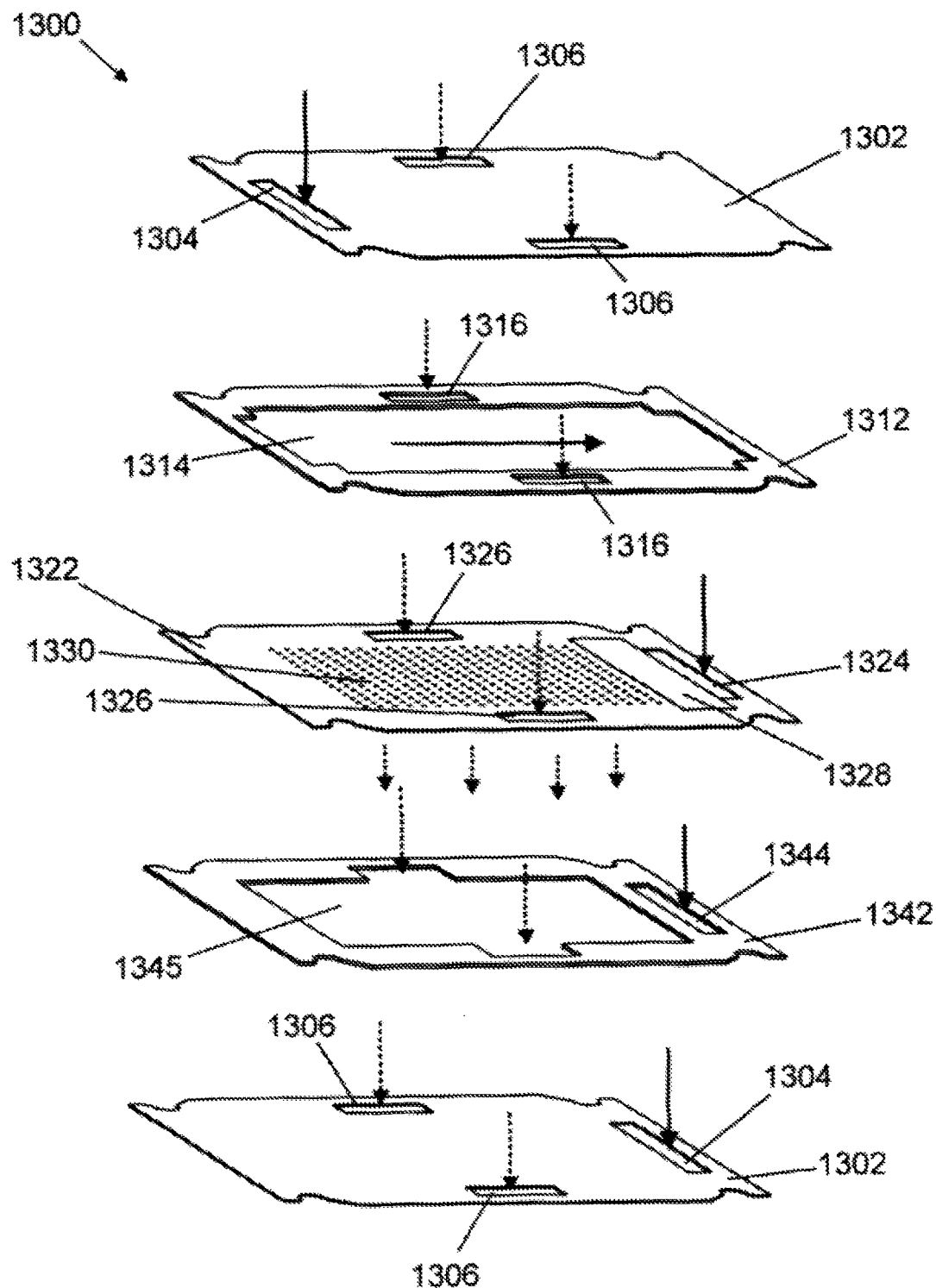
FIG. 57 is an exploded perspective view of a subassembly of filter laminas for an alternate embodiment of a tunable nanofiber filter having dual flow paths. Solid arrows indicate primary flow path. Dashed arrows indicate secondary flow path.

FIG. 57 depicts a subassembly 1300 of laminas comprising tertiary and quaternary filter laminas 1302, 1322, respectively, and secondary and tertiary spacer laminas 1312, 1342, respectively, any of which can include surfaces on and in which are formed a tuned topography of nanofibers and nanoholes. When combined together into an assembled subassembly 1300, these laminas form a primary flow path (indicated with solid arrows) and a secondary flow path (indicated with dashed arrows). The primary flow path selectively filters a fluid to be filtered by passing the fluid through one or more regions of nanofibers having a predetermined topology as previously herein described. The secondary flow path removes components from the fluid that are small enough to pass out of the primary flow path via one or more regions of nanoholes 1330 in one or more laminas.

The uppermost lamina in the subassembly 1300 is tertiary filter lamina 1302, which can have formed on its lower surface an array of nanofibers of predetermined length, diameter, and spacing as previously disclosed herein. Near one end of tertiary filter lamina 1302 can be an aperture 1304 that forms a portion of the primary flow path. The tertiary filter lamina 1302 can also have one or more laterally opposed apertures 1306 which can form a portion of the secondary flow path. Secondary spacer lamina 1312 can have a large central aperture 1314 that can form a portion of the primary flow path, and laterally opposed apertures 1316 that can form a portion of the secondary flow path. Quaternary filter lamina 1322 can have a first aperture 1324 that can form a portion of the primary flow path, and laterally opposed apertures 1326 that can form a portion of the secondary flow path. quaternary filter lamina 1322 can have formed on its top surface adjacent to aperture 1324 a region 1328 covered with an array of nanofibers of a predetermined topology. An array of nanoholes 1330 can be formed in a central portion of quaternary filter lamina 1322 bounded at one end by aperture 1324 and on either side by lateral apertures 1326.

The portion of the primary flow path defined by the nanofiber array on the lower surface of uppermost tertiary filter lamina 1302, the central aperture 1314 of secondary spacer lamina 1312, and the top surface of quaternary filter lamina 1322 (including its region of nanofibers 1328 and central region of nanoholes 1330) forms a flow space with tuned topography which selectively separates a secondary flow of predetermined materials and, or alternatively, fluids, from the primary flow path via the nanoholes 1330 in quaternary filter lamina 1322.

Tertiary spacer lamina 1342 has a first aperture 1344 which forms a portion of the primary flow path, and a large central aperture 1345 which intersects the secondary flow path so as to allow components and fluids which pass through the nanoholes 1330 of quaternary filter lamina 1322 to enter the secondary flow path. The lowermost lamina in the subassembly 1300 is another tertiary filter lamina 1302 rotated 180 degrees relative to and in the same plane as the uppermost primary tertiary lamina 1302 positioned at the top of the subassembly 1300 such that opposite ends of the uppermost tertiary filter lamina 1302 and the lowermost tertiary filter lamina 1302 overlap. The lowermost tertiary filter lamina 1302 forms portions of both the primary and secondary flow paths as previously described.

Figure 58:
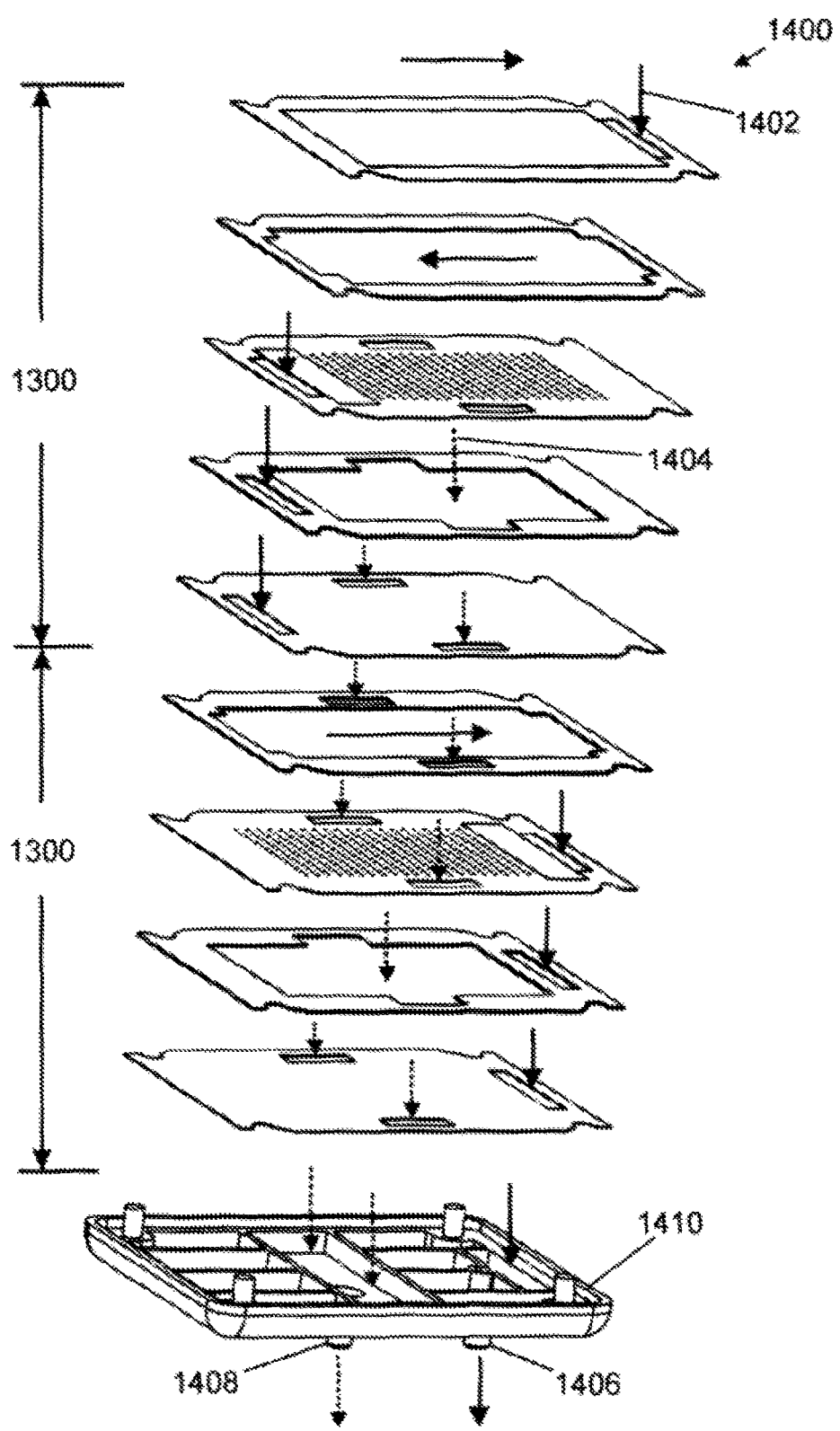
FIG. 58 is an exploded perspective view of a lower portion of a lamina stack for an embodiment of a tunable nanofiber filter comprising two of the subassemblies of FIG. 57. Solid arrows indicate primary flow path. Dashed arrows indicate secondary flow path.

In some embodiments, such as that shown in FIG. 58, the lowermost tertiary filter lamina 1302 may be the top or uppermost tertiary filter lamina 1302 of another contiguous subassembly 1300. In such embodiments, the subsequent lower laminas of the contiguous subassembly 1300 can be rotated 180 degrees (in the plane of the laminas) about a longitudinal axis extending through the stack relative to the subassembly shown in FIG. 57 so that the primary flow path 1402 and secondary flow path 1402 may extend through the adjoining contiguous subassembly 1300. Each successive contiguous subassembly descending through the stack would similarly be rotated 180 degrees from the prior adjoining subassembly. In other embodiments, the lowermost tertiary filter lamina 1302 of subassembly 1300 is the last tertiary filter lamina 1302 in the stack and not the top or uppermost tertiary lamina 1302 of another contiguous subassembly 1300. In such embodiments, the bottom surface of the bottom tertiary filter lamina 1302 of the subassembly 1300 can be formed with or without an array of nanofibers thereon.

FIG. 58 depicts a lower portion 1400 of a filter stack for a tunable nanofiber filter of the present disclosure. The lower portion 1400 of the filter stack is composed of two contiguous subassemblies 1300 and the bottom half 1410 of a filter housing. Solid arrows 1402 indicate the primary flow path. Dashed arrows 1404 indicate the secondary flow path. The primary flow path 1402 exits the bottom housing half 1410 via a first outflow connector 1406. The secondary flow path 1404 exits via a second outflow connector 1408.

Figure 59:
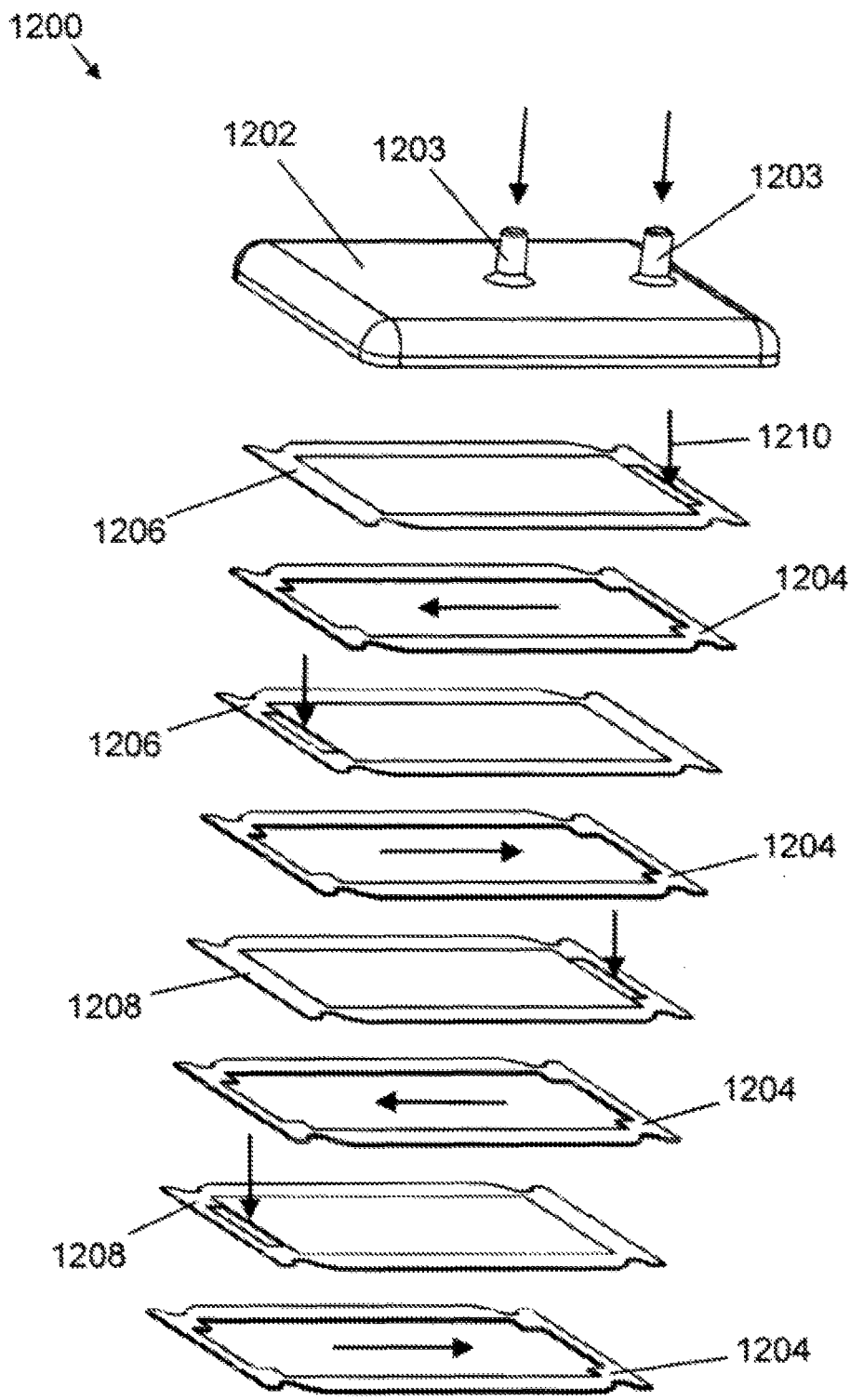
FIG. 59 is an exploded perspective view of an upper portion of a lamina stack for an alternate embodiment of a tunable nanofiber filter. Solid arrows indicate the primary flow path.

FIG. 59 depicts the upper portion 1200 of a filter stack for a tunable nanofiber filter of the present disclosure. The upper portion 1200 of a filter stack is composed of top housing half 1202 with inlet connectors 1203, primary spacer laminas 1204 which have a large central aperture, primary filter laminas 1206, and secondary filter laminas 1208. Primary and secondary filter laminas 1206 and 1208 have top and bottom surfaces on which can be formed arrays of nanofibers, and an aperture at one end through which the primary flow path passes. Primary filter laminas 1206 can have a first nanofiber array of predetermined configuration optimized for the selective removal of a first component from a fluid to be filtered. Secondary filter laminas 1208 can have a second nanofiber array of predetermined configuration optimized for the selective removal of a second component from a fluid to be filtered.

It will be understood that the surface of a particular primary or secondary filter lamina may comprise different regions of nanofibers having different heights, spacing, and density as previously described herein and depicted in FIGS. 48 through 52. Solid arrows 1210 indicate the flow path through the upper stack portion 1200. Although upper stack portion 1200 is depicted as having a series of primary and secondary laminas configured to selectively remove components from a fluid to be filtered, additional laminas with different nanofiber configurations can be added to upper stack portion 1200 to selectively remove additional components (such as successively smaller molecules or compounds) from the fluid to be filtered. Upper portion 1200 of filter stack functions in the same manner as lamina stack 900 depicted in FIG. 44.

Figure 60:
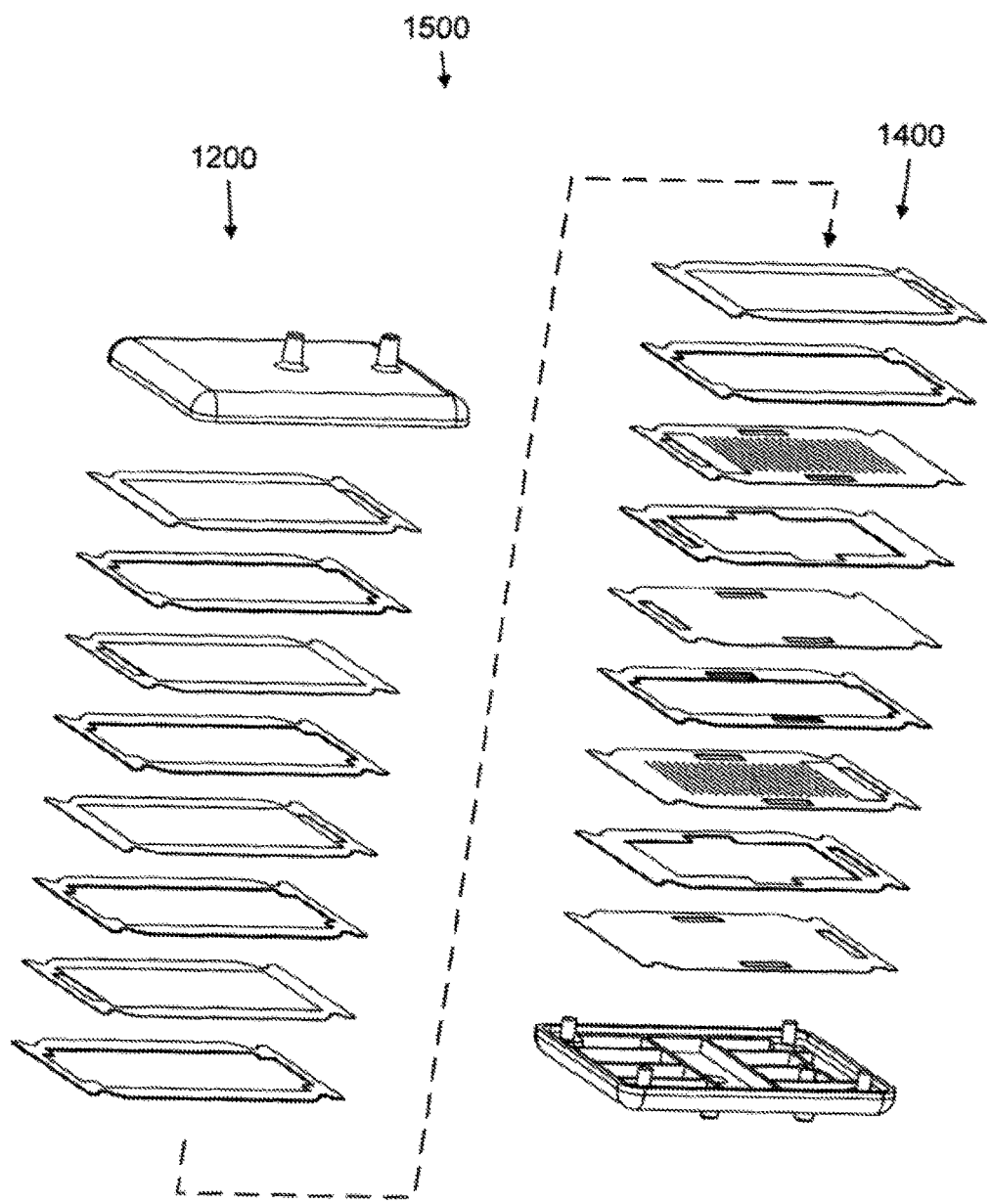
FIG. 60 is an exploded perspective view of an alternate embodiment of a tunable nanofiber filter having dual flow paths formed from the lower lamina stack portion of FIG. 58 and the upper lamina stack portion of FIG. 59.

FIG. 60 depicts an exploded view of the components of one embodiment of a tunable nanofiber filter 1500 of the present disclosure. The filter 1500 is formed of upper stack portion 1200 and lower stack portion 1400 so as to combine the different filtering characteristics of the upper and lower stack portions to provide selective removal of multiple components using a single device with one filtration step.

Figure 62:
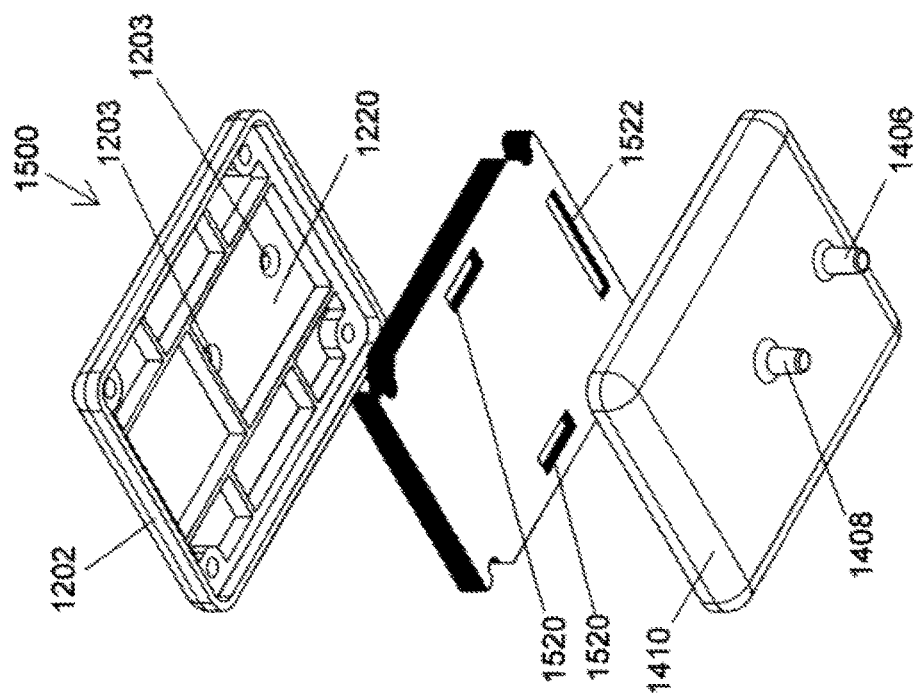
FIG. 62 is a bottom perspective view of the tunable nanofiber filter of FIG. 61.
Figure 61:
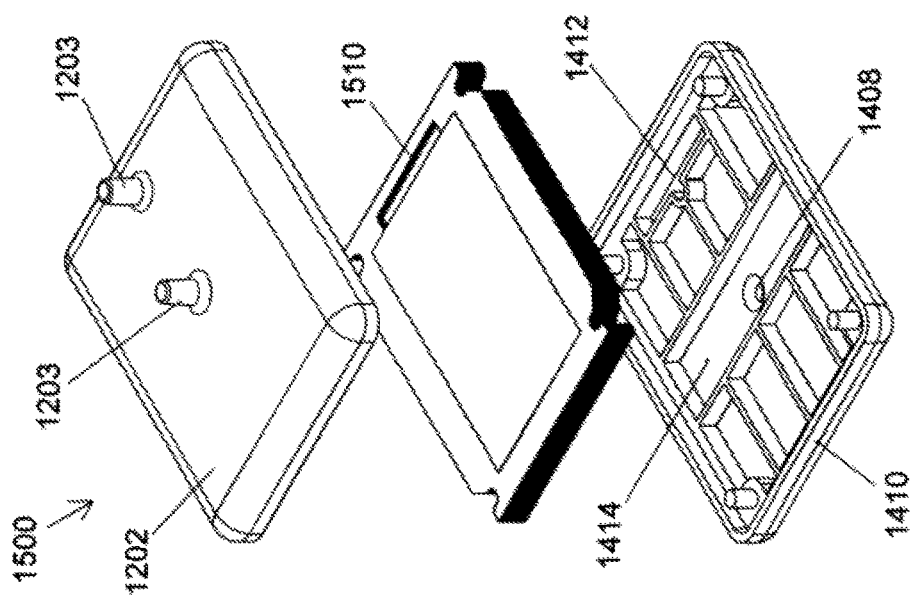
FIG. 61 is a top perspective view of the tunable nanofiber filter of FIG. 60 showing the assembled lamina stack positioned for assembly into upper and lower halves of a filter housing.

FIGS. 61 and 62 depict the assembled lamina stack positioned for assembly into upper housing half 1202 and lower housing half 1410. Inflow connectors 1203, recess 1220 in upper housing half 1202, the assembled lamina stack with inflow aperture 1510 and outflow aperture 1522, primary recess 1412 in lower housing half 1410, and outflow connector 1406 together define a primary flow path. Lateral apertures 1520 in the bottom of the assembled lamina stack, secondary recess 1414 in bottom housing half 1410, and outflow connector 1408 define a secondary flow path for fluids and materials separated from the primary flow path by the nanoholes 1330 in quaternary filter lamina laminas 1322 (see FIG. 57).

Figure 63:
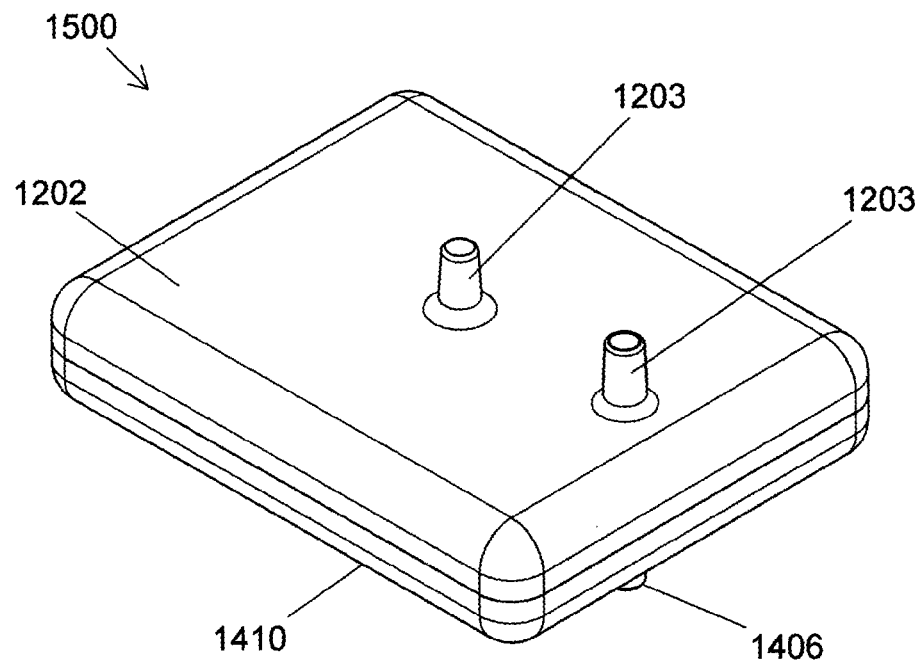
FIG. 63 is a perspective view of the assembled tunable nanofiber filter of FIG. 60.
Figure 64:
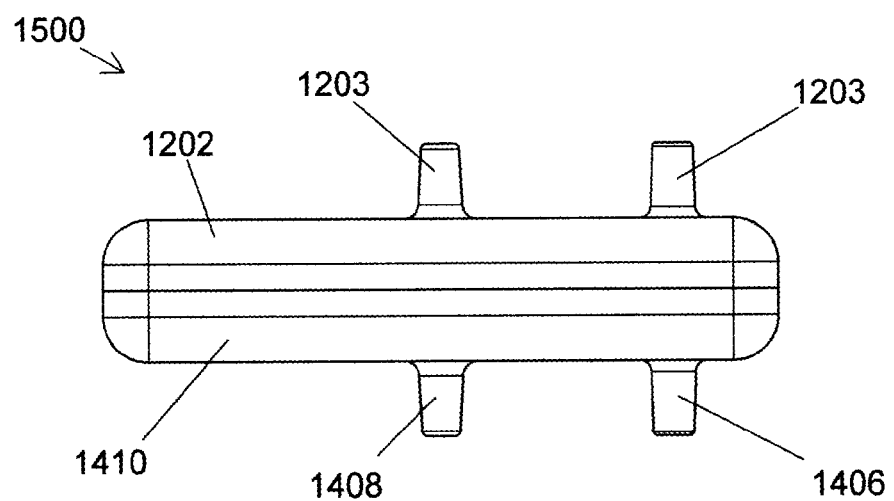
FIG. 64 is a side elevational view of the tunable nanofiber filter of FIG. 63.

FIGS. 63 and 64 depict filter 1500 fully assembled. Upper housing half 1202 and lower housing half 1410 can be bonded by methods known in the art, such as ultrasonic welding or another suitable bonding method.

In traditional dialysis filters, blood and dialysate are made to interface across a membrane. However, the present inventors have determined that tunable topography nanofiber filters of the present disclosure are much more effective at forming this interface. Additionally, in certain embodiments, the arrays of nanofibers formed on filter laminas disclosed herein may be further functionalized with one or more coatings or other treatments so as to overcome some of the deficiencies associated with traditional membrane exchange. Such functionalization may include, but is not limited to, coating the nanofibers with one or more elements or compounds that work to clean the blood (for example, by removing sodium from the blood) prior to the interface with the dialysate, thereby effectively increasing the efficiency of the filtration portion of the dialysis process over that possible using traditional dialysis systems. Accordingly, in some embodiments, a tunable nanofiber filter of the present disclosure can be a diffusion filter.

When constructing a tunable nanofiber diffusion filter as disclosed herein, it is important that a flow path be provided through the nanofiber array(s) that allows a substantial portion of the fluids to flow down stream to the lower levels of the filter so as to promote a refreshing of fluids in the portion of the filter where the fluids interface. This is because egress of fluid into the nanofibers is unavoidable due to the lack of chemical or pressure drivers causing the fluid(s) to exchange or refresh. Although some fluid exchange will occur naturally, it will occur at relatively low efficiency. Accordingly, diffusion filters of the present invention have formed therein flow paths that allow the "exposed" fluids at the interface to exchange with new fluid constantly. Diffusion filters so constructed prevent saturation of the filter materials (for example, the nanofibers) and the resulting eventual stalling of fluids at each level or layer.

Tunable nanofiber diffusion filter of the present disclosure can have multiple parallel blood and dialysate passages with flow normal to the plane of the laminas. The flow paths can be arranged with dialysate flow paths positioned between blood flow paths and separated therefrom by nanofiber arrays. The cross-sectional area of the dialysate paths can be decreased over the length of the stack of laminas forming the filter such that the velocity of the dialysate increases at a predetermined rate in relation to the blood flow rate so as to achieve a desired exposure of the blood to the dialysate.

For example, the exchange of urea per unit area is greater at the top of the lamina stack than the bottom. As a result, loading of the dialysate increases as it makes its way through the stack. The communication or exchange occurs by diffusion of urea from the blood to the dialysate through the nanofibers. In this way, the laminas and nanofiber arrays thereon can be configured to control the interfaces. For example, in one embodiment, a tunable nanofiber diffusion filter of the present invention can include a series of blood flow paths separated from adjacent dialysate flow paths by a series of nanofiber arrays according to the following pattern: blood|nanofiber array|dialysate|nanofiber array|blood|nanofiber array|dialysate|nanofiber array|blood, and so on. The rate of diffusion is a limitation relevant to the velocity of the fluids so that the average velocity of the two fluids does not outrun the diffusion rate when divided by ½ the distance between the blood and dialysate flow paths. Construction of the filter in this manner prevents recontamination of the blood at the lower (i.e., down stream) portion of the filter.

Figure 65:
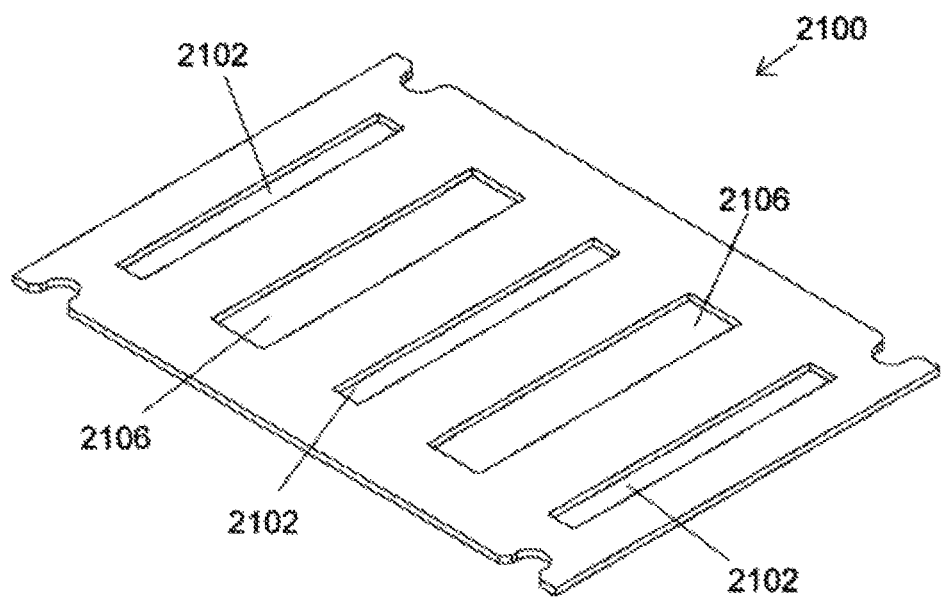
FIG. 65 is a perspective view of a filter lamina for an embodiment of a tunable nanofiber diffusion filter formed in accordance with the present disclosure.
Figure 66:
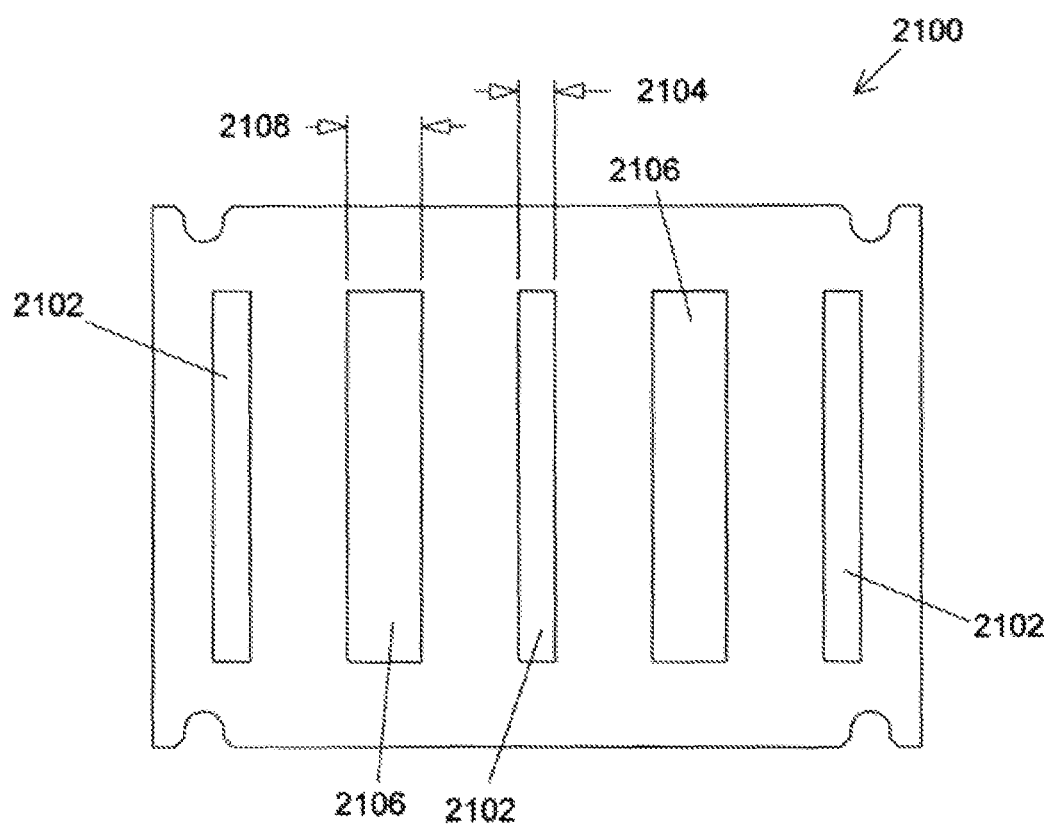
FIG. 66 is a plan view of the filter lamina of FIG. 65.

FIGS. 65 and 66 depict a primary filter lamina 2100 for an embodiment of a tunable nanofiber diffusion filter constructed in accordance with the principles of this disclosure. Primary filter lamina 2100 can have an array of nanofibers formed on at least a portion of one or both of its planar upper and lower surfaces. In some embodiments, the entire upper and lower planar surfaces of the primary filter lamina 2100 are covered in nanofibers. Defined in primary filter lamina 2100 is an array of slots comprising a plurality of first slots 2102 having a first slot width 2104, and second slots 2106 having a second slot width 2108 spaced apart from the first slots. In some embodiments, the second slot width 2108 can be greater than the first slot width 2104. In other embodiments, the second slot width 2108 can be equal to or less than the first slot width 2104. The second slots 2106 can be centrally positioned between first slots 2102. First and second slots 2102, 2106 can be of substantially equal length. In some embodiments, the slots are rectangular. In other embodiments, the slots can have non-linear shapes including semi-circular, circular, curvilinear or any combination of these. In still other embodiments, each slot may comprise a series of closely packed smaller slot or apertures of different shapes and sizes.

Figure 67:
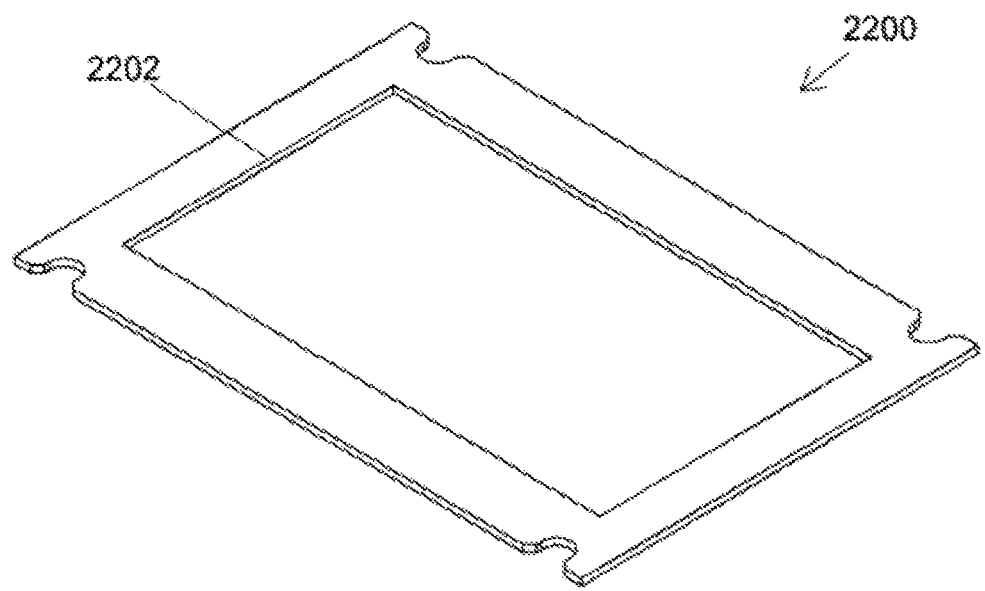
FIG. 67 is a perspective view of a spacer lamina for an embodiment of a tunable nanofiber diffusion filter formed in accordance with the present disclosure.
Figure 68:
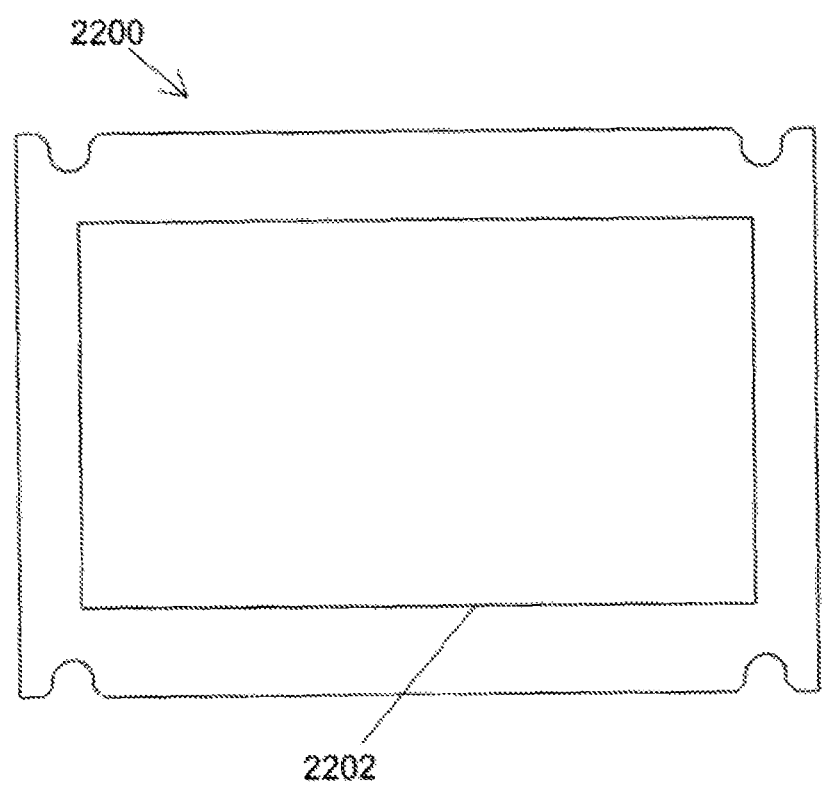
FIG. 68 is a plan view of the spacer lamina of FIG. 67.

FIGS. 67 and 68 depict a spacer lamina 2200 for a tunable nanofiber diffusion filter of the present disclosure. Spacer lamina 2200 has a large central aperture 2202 which conforms closely to the outer perimeter of the array of slots formed by first slots 2102 and second slots 2106 of filter lamina 2100.

Figure 69:
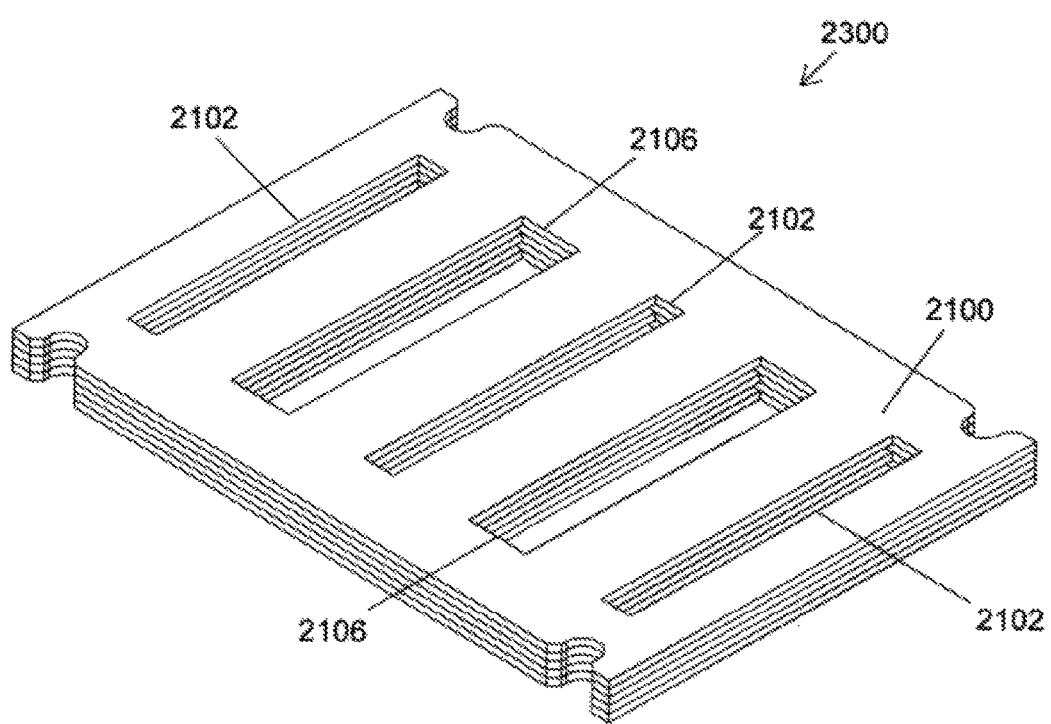
FIG. 69 is a perspective view of a lamina assembly for an embodiment of a tunable nanofiber dialysis filter formed from a plurality of the filter laminas of FIG. 65 and the spacer laminas of FIG. 67.
Figure 70:
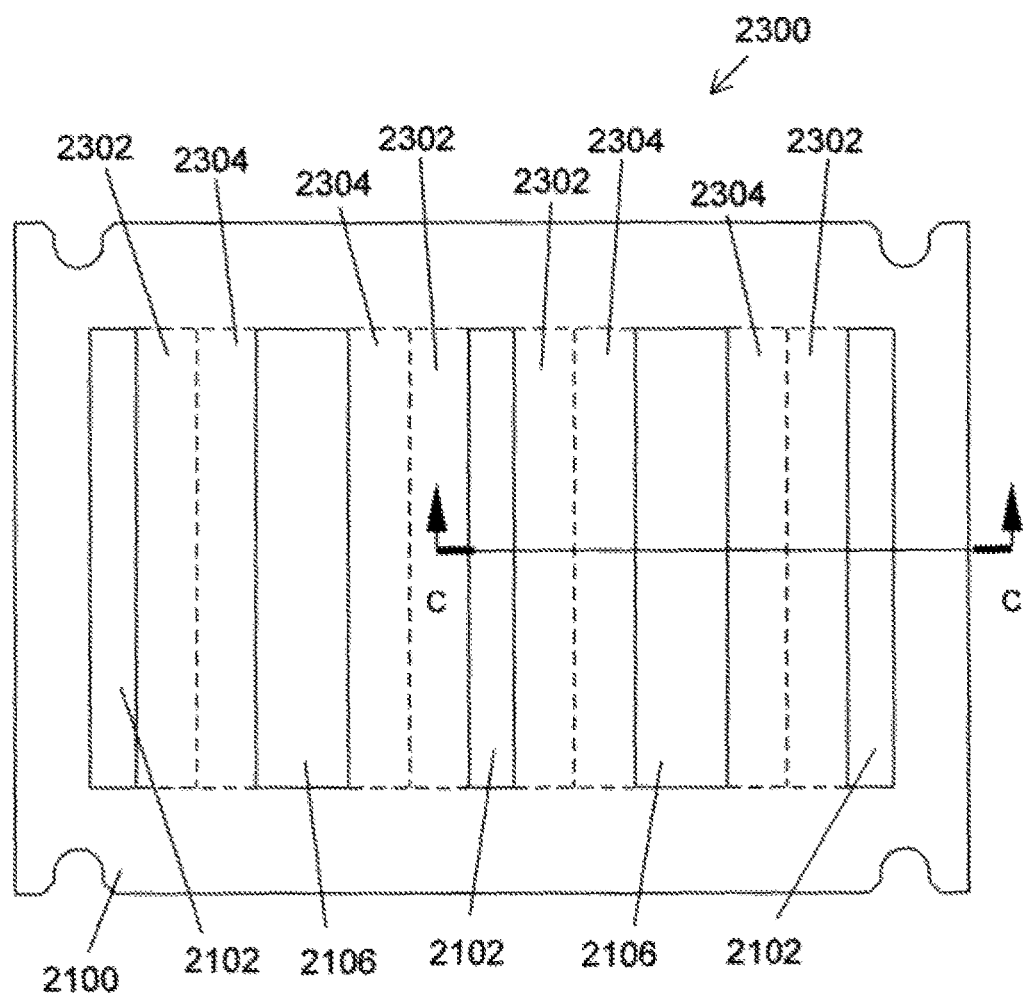
FIG. 70 is a plan view of the lamina assembly of FIG. 69.
Figure 71:
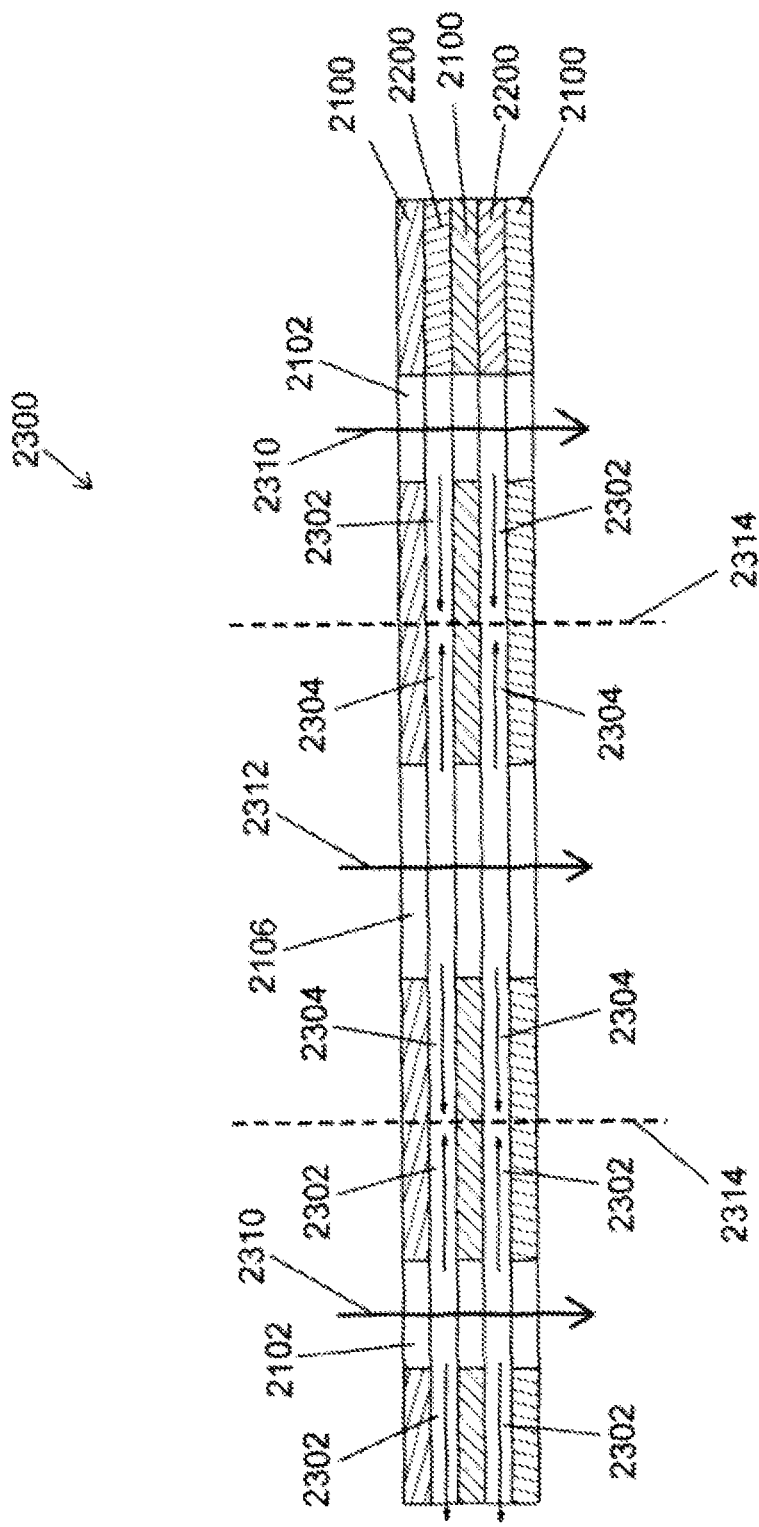
FIG. 71 is a partial sectional view of the lamina assembly of FIG. 70 at line C-C.

A first lamina assembly 2300 formed of primary filter laminas 2100 and spacer laminas 2200 is depicted in FIGS. 69 through 71. First lamina assembly 2300 can be a first portion of a larger assembly of laminas forming an embodiment of a tunable nanofiber dialysis filter of the present disclosure. First apertures 2102 form passages for blood flow 2310. Second apertures 2106 form passages for dialysate flow 2312. As best seen in FIG. 71, the interlaminar space between primary filter laminas 2100 can form diffusion zones between the blood flow passages 2310 formed of first apertures 2102 and the dialysate flow passages 2312 formed of second apertures 2106. These diffusion zones can have first blood diffusion portions 2302 adjacent to the blood flow passages 2310 formed of apertures 2102, and first dialysate diffusion portions 2304 adjacent to the dialysate flow passages 2312 formed of apertures 2106. As best seen in FIGS. 70 and 71, the blood and dialysate diffusion zones 2302 and 2304 can be approximately equal in size and the boundary 2314 formed therebetween can be centered between first and second apertures 2102 and 2106. In some embodiments, the velocity of dialysate flow 2312 can be greater than the velocity of blood flow 2310.

Figure 72:
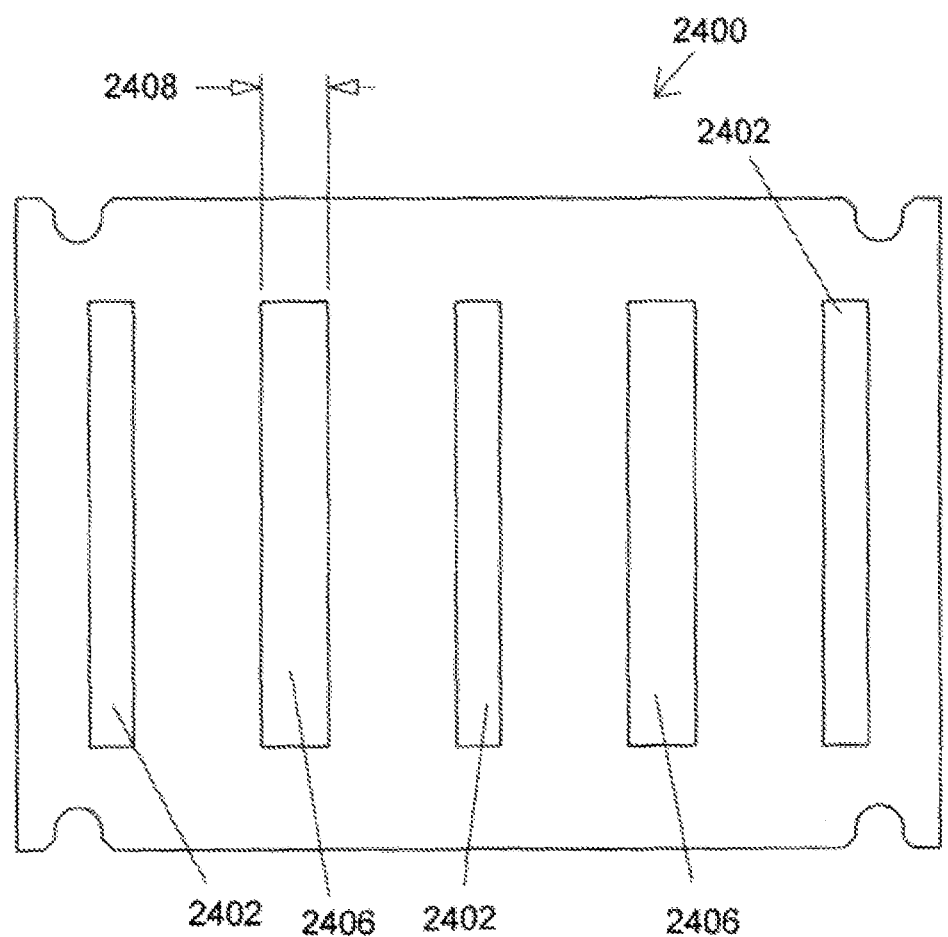
FIG. 72 is a plan view of another filter lamina for an embodiment of a tunable nanofiber diffusion filter.

Referring now to FIG. 72, there is depicted another filter lamina 2400 for a tunable nanofiber diffusion filter of the present disclosure, the filter lamina 2400, which can be a secondary filter lamina, being identical in all aspects to filter lamina 2100 (see FIGS. 65 and 66) except as specifically specified hereafter. Defined in secondary filter lamina 2400 can be an array of slots which can comprise a plurality of first slots 2402 and second slots 2106. The width of first slots 2402 of secondary filter lamina 2400 can be substantially the same as the width 2104 of first slots of primary filter lamina 2100. However, the width 2408 of second slots 2406 of secondary filter lamina 2400 is less than the width 2108 of the second slots 2106 of primary filter lamina 2100.

Figure 73:
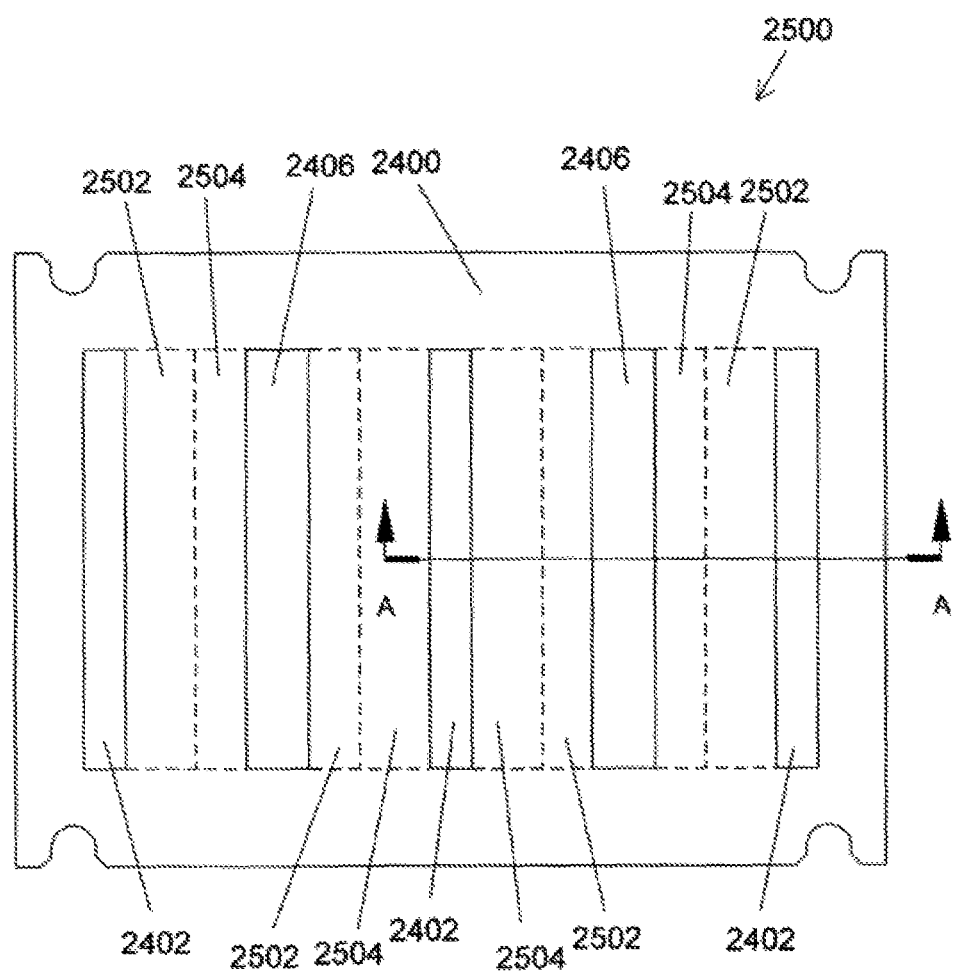
FIG. 73 is a plan view of another lamina assembly for an embodiment of a tunable nanofiber dialysis filter formed from a plurality of the filter laminas of FIG. 72 and the spacer laminas of FIG. 67.
Figure 74:
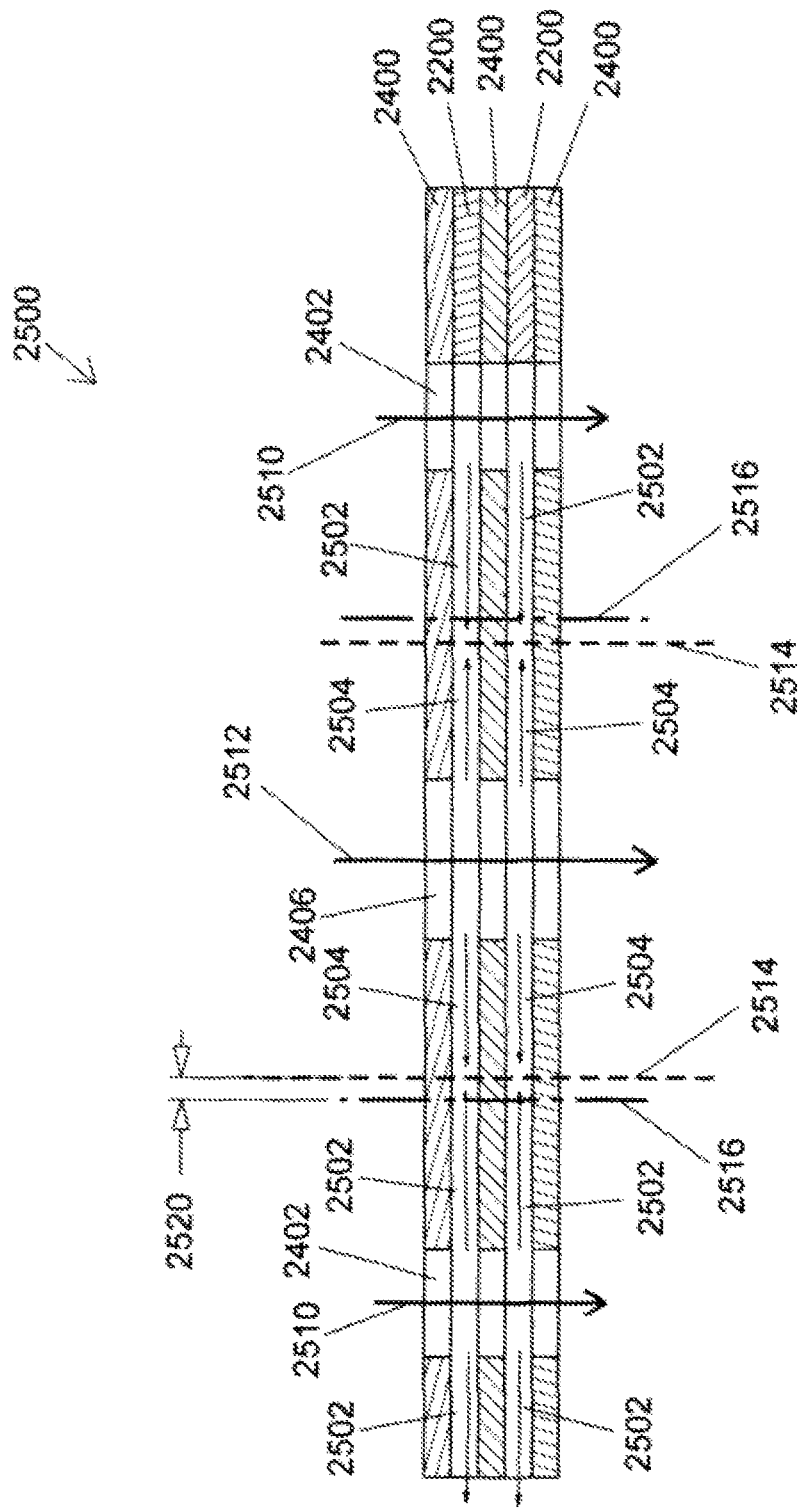
FIG. 74 is a partial sectional view of the lamina assembly of FIG. 73 at line A-A.

FIGS. 73 and 74 depict a second lamina assembly 2500 formed of secondary filter laminas 2400 and spacer laminas 2200. Second lamina assembly 2500 is identical in all aspects to first lamina assembly 2300 (see FIGS. 69 through 71) except that secondary filter laminas 2400 replace primary filter laminas 2100 of first lamina assembly 2300. Because the cross-sectional area of second slots 2406 of secondary filter lamina 2400 is less than the area of second slots 2106 of the filter lamina 2100, the velocity of the dialysate through the passage formed therefrom is inversely proportionately increased. This increase in velocity decreases the distance which dialysate can diffuse into the second blood diffusion portions 2502 and second dialysate diffusion portions 2504 formed between secondary filter laminas 2400.

Accordingly, as seen in the plan view of FIG. 73 and the sectional view of FIG. 74, the second lamina assembly 2500 has second dialysate diffusion portions 2504 adjacent to the dialysate flow passages 2512 that are formed of second slots 2406 of secondary lamina 2400. The second dialysate diffusion portions 2504 are decreased in size relative to the first dialysate diffusion portions 2304 of first lamina assembly 2300 (FIGS. 70 and 71). As a result, the boundary 2514 between portions 2502 and 2504 of the blood and dialysate diffusion zones is shifted a distance 2520 toward the dialysate flow passage 2512 from the center 2516 of the region between first and second slots 2402 and 2406. Thus, the diffusion zone boundary 2514 of second lamina assembly 2500 is closer to the dialysate flow passage 2512 and further from the blood flow passage 2510 than is the diffusion zone boundary 2314 of first lamina assembly 2300.

Figure 75:
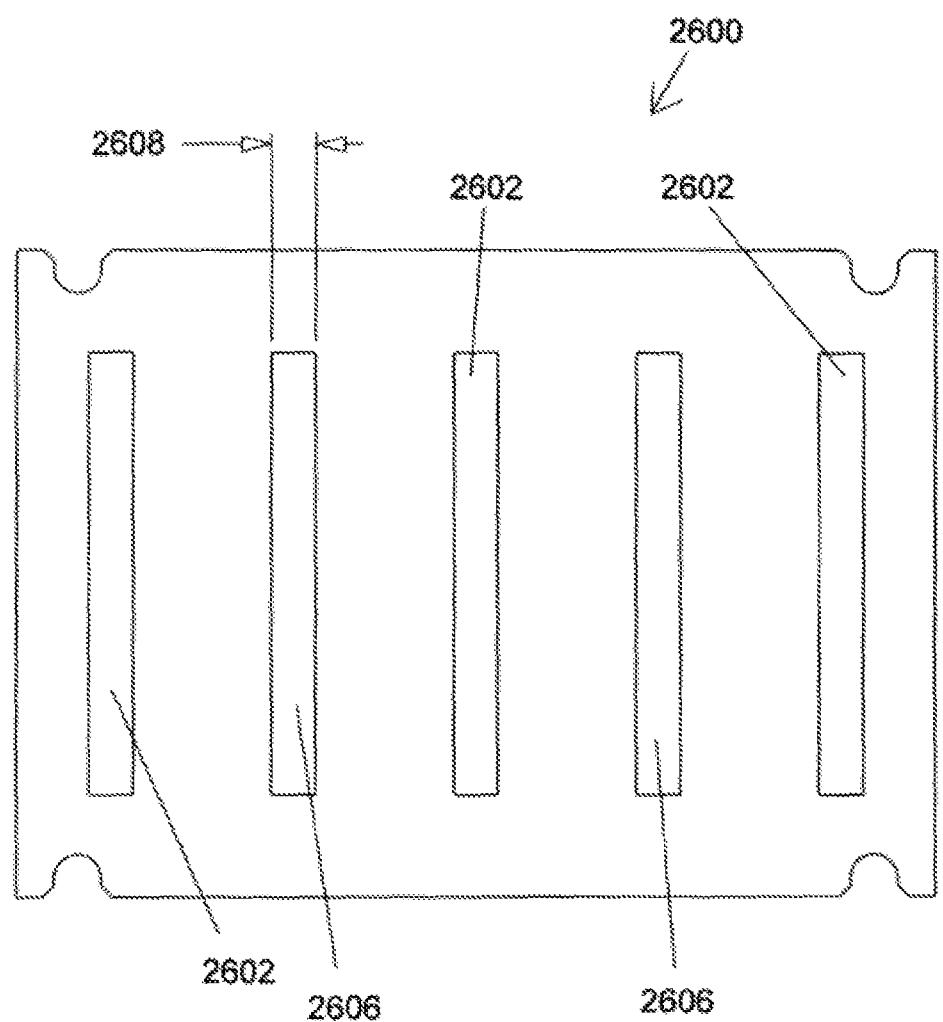
FIG. 75 is a plan view of yet another filter lamina for an embodiment of a tunable nanofiber diffusion filter.

FIG. 75 depicts a yet another filter lamina 2600, which can be a tertiary filter lamina, for a tunable nanofiber diffusion filter of the present disclosure, the tertiary filter lamina 2600 being identical in all aspects to secondary lamina 2400 except as specifically specified hereafter. Defined in tertiary lamina 2600 is an array of slots comprised of a plurality of first slots 2602 and second slots 2606. The width of first slots 2602 of tertiary lamina 2600 is substantially the same as the width of first slots of secondary lamina 2400. However, the width 2608 of second slots 2606 of tertiary lamina 2600 is less than the width 2408 of the second slots 2406 (see FIG. 72) of secondary lamina 2400.

Figure 76:
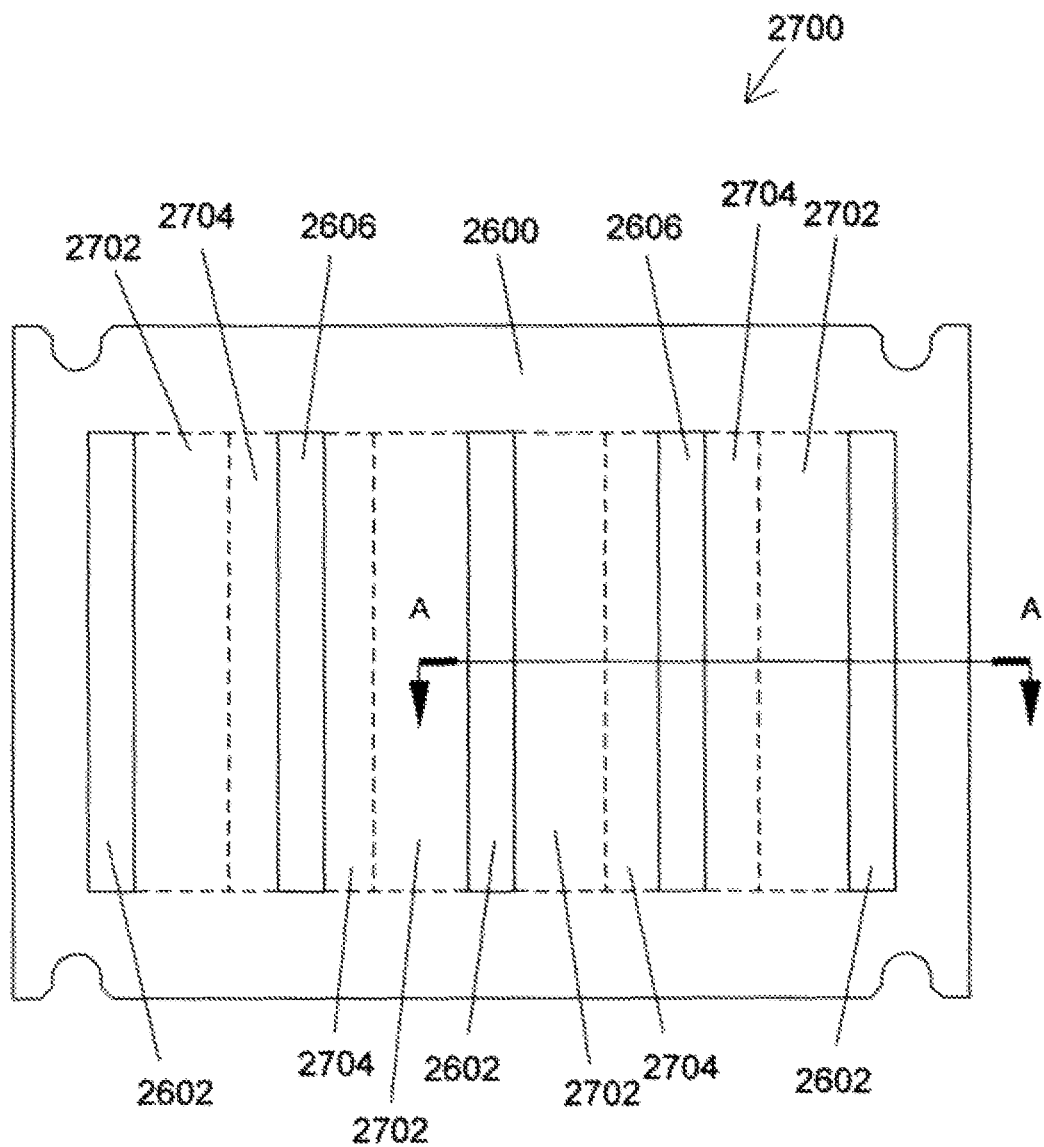
FIG. 76 is a plan view of yet another lamina assembly for an embodiment of a tunable nanofiber diffusion filter formed from a plurality of the filter laminas of FIG. 75 and the spacer laminas of FIG. 67.
Figure 77:
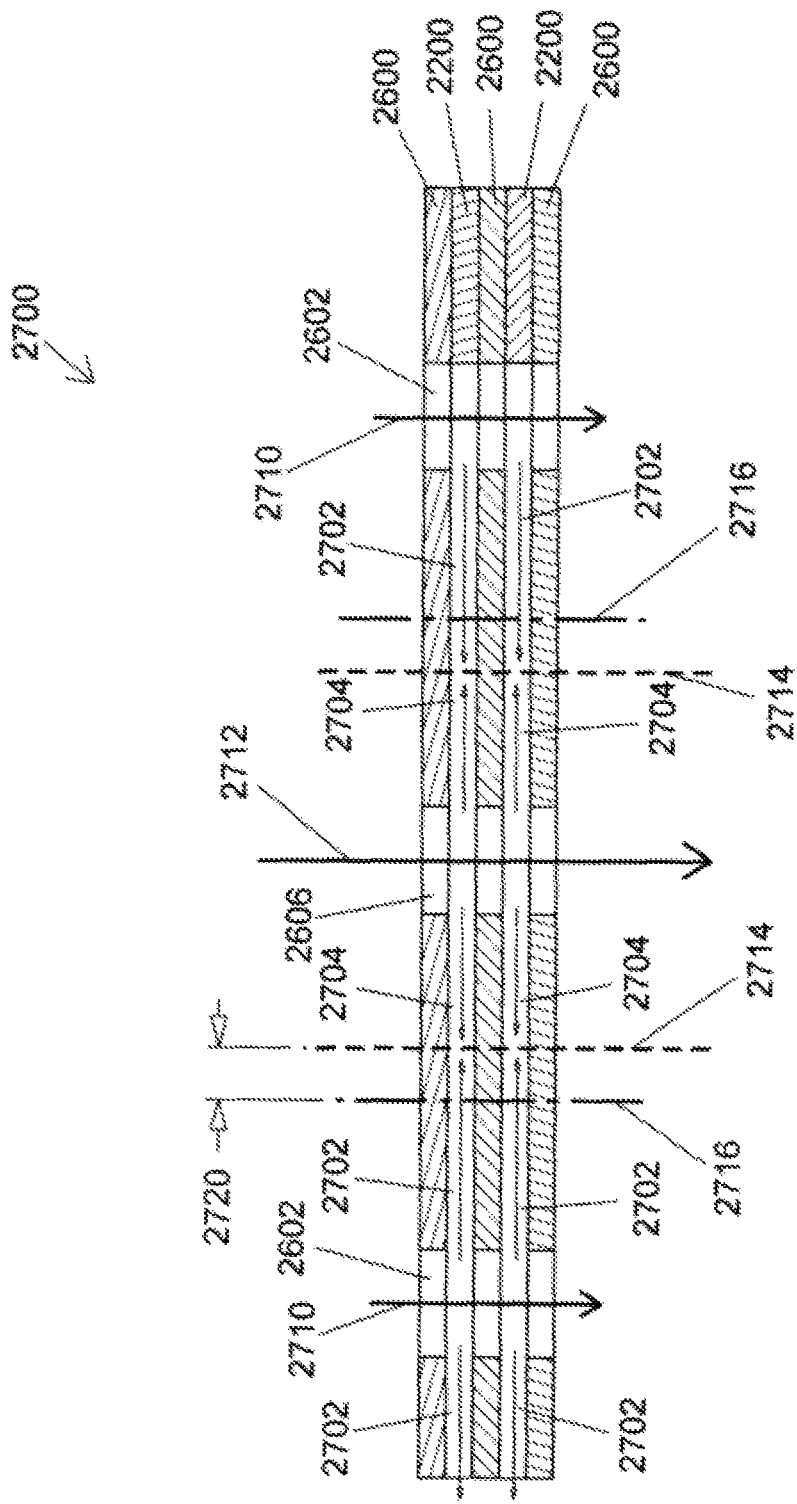
FIG. 77 is a partial sectional view of the lamina assembly of FIG. 76 at line A-A.

FIGS. 76 and 77 depict a third lamina assembly 2700 formed of tertiary laminas 2600 and spacer laminas 2200. Third lamina assembly 2700 is identical in all aspects to second lamina assembly 2500 (FIGS. 73 and 74) except that tertiary laminas 2600 replace secondary laminas 2400 of second lamina assembly 2500. Because the cross-sectional area of second slots 2606 of tertiary lamina 2600 is less than the area of second slots 2406 of secondary lamina 2400, the velocity of the dialysate through the passage formed therefrom is inversely proportionately further increased. This increase in velocity further decreases the distance which dialysate can diffuse into the third blood diffusion portions 2702 and third dialysate diffusion portions 2704 formed between tertiary laminas 2600.

Accordingly, as seen in the plan view of FIG. 76 and the sectional view of FIG. 77, the third lamina assembly 2700 has third dialysate diffusion portions 2704 adjacent to the dialysate flow passages 2712 that are formed of second slots 2606 of tertiary lamina 2600. The third dialysate diffusion portions 2704 are decreased in size relative to second dialysate diffusion portions 2504 of second lamina assembly 2500 (FIGS. 73 and 74). As a result, the boundary 2714 between portions 2702 and 2704 of the blood and dialysate diffusion zones is shifted distance 2720 toward the dialysate flow passage 2712 from the center 2716 of the region between first and second slots 2602 and 2606 of the tertiary lamina 2600. Notably, distance 2720 of the third lamina assembly 2700 is greater than distance 2520 of the second lamina assembly 2500. Thus, the diffusion zone boundary 2714 of third lamina assembly 2700 is closer to the dialysate flow passage 2712 and further from the blood flow passage 2710 than is the diffusion zone boundary 2514 of the second lamina assembly 2500.

Figure 78:
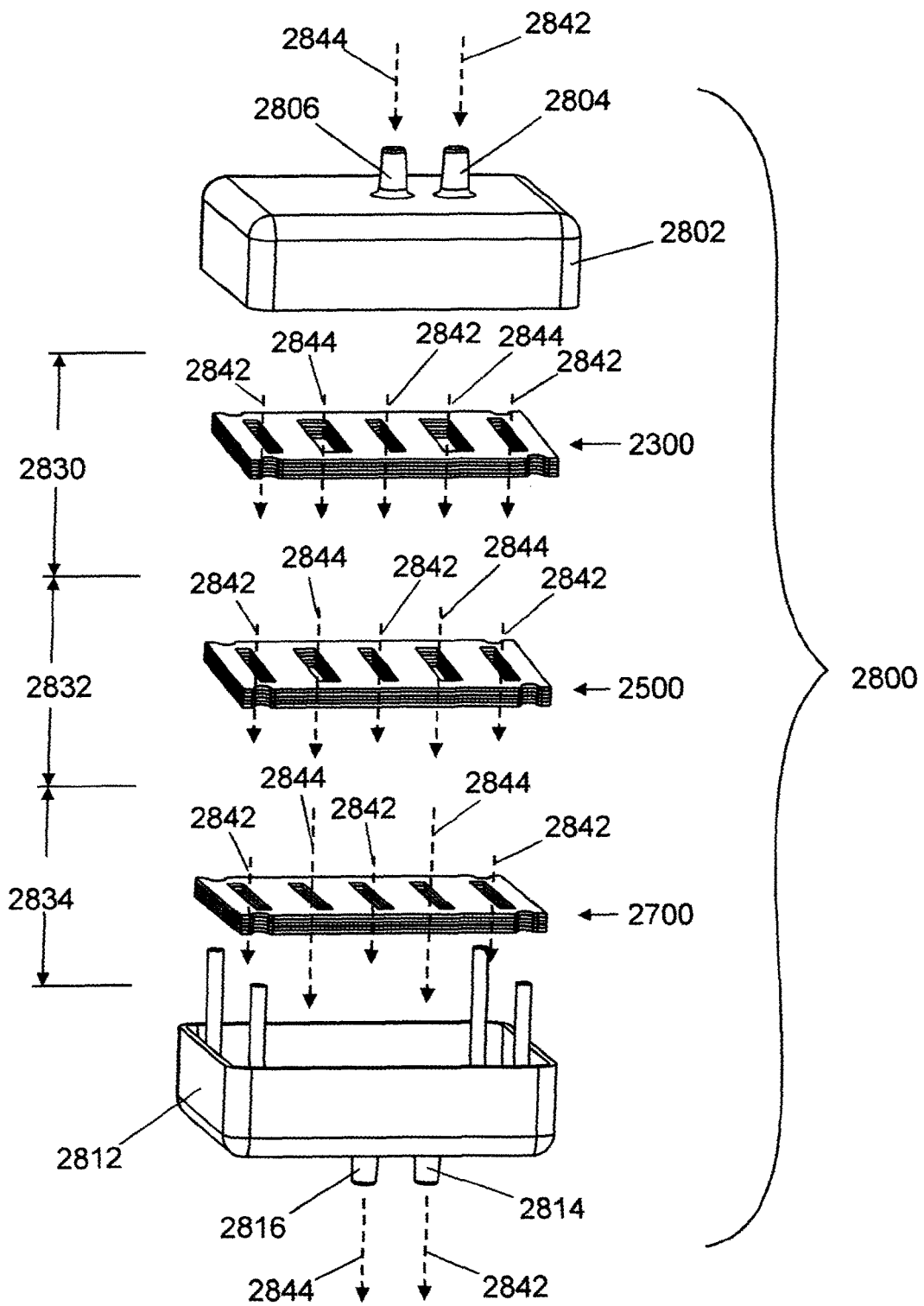
FIG. 78 is a partial exploded view of an embodiment of a tunable nanofiber dialysis filter showing the each of the lamina assemblies of FIGS. 69, 73, and 76 positioned for assembly into upper and lower halves of a filter housing.

A tunable nanofiber diffusion filter 2800 of the present disclosure can be formed from multiple lamina assemblies, for example, by combining first, second and third lamina assemblies 2300, 2500 and 2700 together to form a lamina stack as depicted in FIG. 78. First stack portion 2830 can be formed of multiple first lamina assemblies 2300, second stack portion 2832 of multiple second lamina assemblies 2500; and third stack portion 2834 of multiple third lamina assemblies 2700. Once assembled, the lamina stack can be sandwiched together and contained within a filter housing comprised of a top housing portion 2802 and a bottom housing portion 2812. The two filter housing portions can be sealed together using any of the methods specifically described herein or otherwise known in the art.

In use, blood 2842 enters diffusion filter 2800 via a blood inlet 2804 of top housing portion 2802 and can be distributed by channels within top portion 2802 to first slots 2102 in primary filter laminas 2100 of the topmost first lamina assembly 2300 (FIGS. 69 to 71) and therethrough to underlying downstream first lamina assemblies 2300 which make up first stack portion 2830. Blood 2842 then flows through multiple second lamina assemblies 2500 which comprise second stack portion 2832, and subsequently through multiple third lamina assemblies 2700 which form third stack portion 2834. Blood 2842 exiting the bottommost third lamina assembly 2700 of third stack portion 2834 can be collected by channels within bottom housing portion 2812 prior to exiting the diffusion filter 2800 via blood outlet 2814.

Dialysate 2844 enters diffusion filter 2800 via dialysate inlet 2806 of top housing portion 2802 and can be distributed by channels within top portion 2802 to second slots 2106 in the topmost first lamina assembly 2300 (FIGS. 69 to 71) and therethrough to underlying downstream first lamina assemblies 2300 which make up first stack portion 2830. Therefrom, dialysate 2844 flows through multiple second lamina assemblies 2500 which make up second stack portion 2832, and subsequently through multiple third lamina assemblies 2700 which form third stack portion 2834. Dialysate 2844 exiting the bottommost third lamina assembly 2700 of third stack portion 2834 can be collected by channels within bottom housing portion 2812 prior to exiting the diffusion filter 2800 via dialysate outlet 2816.

Referring again to FIG. 78, the length of arrows indicating blood flow 2842 and dialysate flow 2844 through diffusion filter 2800 correspond to the relative velocities of the indicated flows at different positions in the filter. The velocity of blood flow 2842 through filter 2800 is constant, whereas the velocity of dialysate flow 2844 is incrementally increased as the dialysate flow 2844 proceeds through first, second, and third stack portions 2830, 2832 and 2834 of filter 2800 in order to accomplish the objectives previously herein described.

The lamina stack of diffusion filter 2800 of the illustrative and non-limiting example depicted in FIG. 78 has three lamina configurations which create two incremental increases in the velocity of dialysate flow 2844 in order to illustrate the principles of increased dialysate flow 2844 and the related effect on the diffusion zones. The number of lamina configurations and the resulting number of incremental flow velocity increases is a design choice and may be optimized to achieve desired results or to suit a particular application. Some embodiments may have increasing downstream dialysate flow velocities, or alternatively reduced downstream blood flow rates, or a combination of the two. Flow velocity may be modulated by modifying the cross-sectional area of the appropriate flow passages. Accordingly, any filter having parallel interspersed, blood and dialysate flow passages which are separated by a diffusion zone formed of opposed arrays of freestanding nanofibers falls within the scope of this disclosure.

Blood 2842 entering diffusion filter 2800 typically will have undesirably high concentrations of solutes such as urea, potassium and phosphorus. Dialysate 2844 has low concentrations of such solutes. As a result, and with reference to FIGS. 70 and 71, such solutes flow from blood 2842 through first blood diffusion zone 2302 to first dialysate diffusion zone 2304 and therethrough to dialysate 2844, and are transported thereby downstream and out of the filter 2800. Because the concentrations of the targeted solutes increases in the dialysate flow stream as it progresses through filter 2800, the rate of diffusion from blood 2842 to dialysate 2844 will decrease unless the flow rate of dialysate 2844 is increased commensurately. If the flow rate of the dialysate 2844 is not increased in these downstream portions, the concentration of the targeted solutes in the dialysate 2844 can approach the concentrations of these solutes in the blood 2842, in which case diffusion of these solutes from blood to dialysate will decrease proportionately. In an extreme case, wherein the flow rate of the dialysate 2844 in the downstream portions of the diffusion filter 2800 is not increased, the concentration of targeted solutes in the dialysate 2844 may exceed those of the "cleaned" blood 2842 and diffusion of the targeted solutes may be reversed thereby undesirably increasing levels of the targeted solutes in the blood. Accordingly, the relative flow rates of blood 2842 and dialysate 2844 through diffusion filters of the present disclosure should not be constant but rather should be modified so as to maintain optimal diffusion rates of solutes through the nanofiber diffusion zones in all portions of the filter 2800.

In this way, a tunable nanofiber diffusion filter of the present disclosure is analogous to a metro transfer point in which red line trains represent blood flow, green line trains represent dialysate flow, and passengers represent solute. Passengers wishing to transfer from the red line to the green line need few trains if the arriving green line cars are empty. As the amount of space on arriving green line cars decreases, the number of arriving green line cars required to transport the arriving red line passengers must be increased. If there is no space on the arriving green line cars, the transport of arriving red line passengers ceases. Optimal transfer of arriving red line passengers to departing green line trains is achieved by ensuring that available space on the arriving green line cars always substantially exceeds that required for arriving red line passengers wishing to transfer. Accordingly, filters of the present invention can be configured such that the relative flow rates and solute concentrations of the blood and dialysate are optimized for solute diffusion from the blood to the dialysate in all portions of the filter.

In the previous illustrative example, diffusion filter 2800 is described with reference to blood 2842 and dialysate 2844. This choice is for example only and should not be construed as limiting upon the types of fluids that may be cleaned using a tunable nanofiber filter disclosed herein. In practice first fluid 2842 and second fluid 2844 may comprise any fluid combination in which first fluid 2842 is filtered by diffusion of materials therefrom to a second fluid 2844 by means of one or more diffusion zones comprising nanofibers.

Referring again to diffusion filter 2800, the dense nanofiber array forms an interface or boundary 2314 across which blood 2842 and dialysate 2844 do not typically directly interact and only solute molecules pass. Referring again to FIG. 71, blood 2842 penetrates the nanofiber array formed on the top and bottom surfaces of filter lamina 2100 to fill blood diffusion zones 2302. In the same manner, dialysate 2844 penetrates the nanofiber array to fill dialysate diffusion zones 2304. At the boundary of diffusion zones 2302 and 2304 (i.e., lines 2314), solute molecules pass from blood 2842 to dialysate 2844.

However, as indicated by the laterally extending arrows, blood 2842 and dialysate 2844 flow readily into the blood and dialysate diffusion zones, 2302 and 2304, respectively. A significant portion of the fluid may remain stalled (stagnant) within the diffusion zones such that after an initial solute exchange from blood 2842 to dialysate 2844, diffusion across the interface or boundary 2314 may cease because the solute concentration of the local dialysate 2844 has reached equality with that of the local blood 2842. So long as the blood 2842 and dialysate 2844 remain stagnant, no further diffusion can occur. Some exchange of the fluids may occur, but such exchange will be inefficient and limit the effectiveness of filter 2800.

To eliminate this condition it is necessary that there be flow within the diffusion zones with the flow having a component parallel to first and second slots 2102 and 2106 of primary filter lamina 2100, and to the boundary 2314 between blood and dialysate diffusion zones 2302 and 2304, respectively, so as to refresh the fluids in the zones. Accordingly, in another embodiment a flow path is created within the nanofiber array which allows a portion of the fluids within the nanofiber array to flow to the lower levels of the lamina stack so as to promote refreshing of the fluids within the array at the boundary and diffusion zones. The flow path is created for the "exposed" fluids at the interface to exchange with new fluids constantly so as to prevent stalling of fluids within the diffusion zones and resulting saturation of the filter.

Figure 79:
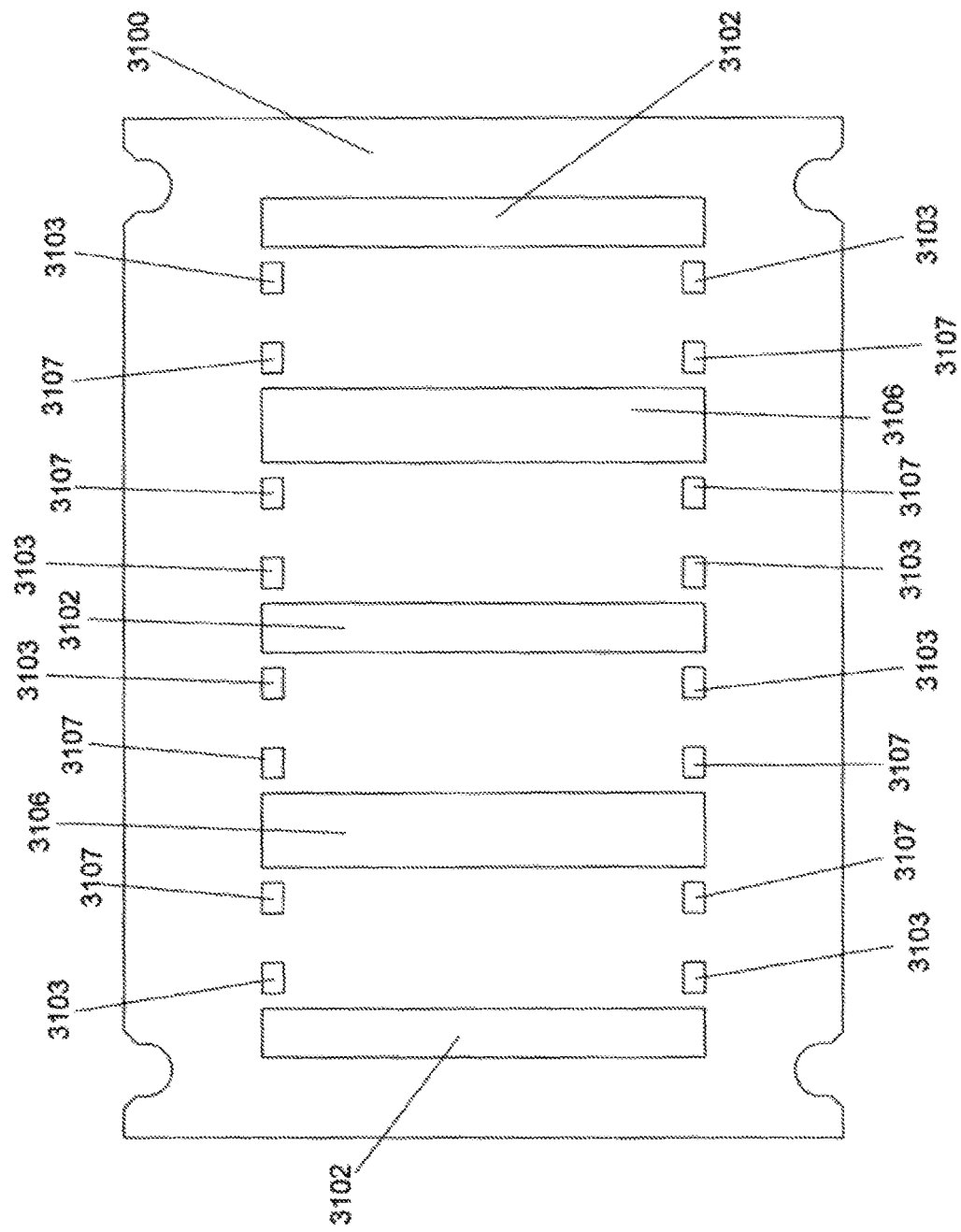
FIG. 79 is a plan view of another filter lamina for another embodiment of a tunable nanofiber diffusion filter.
Figure 80:
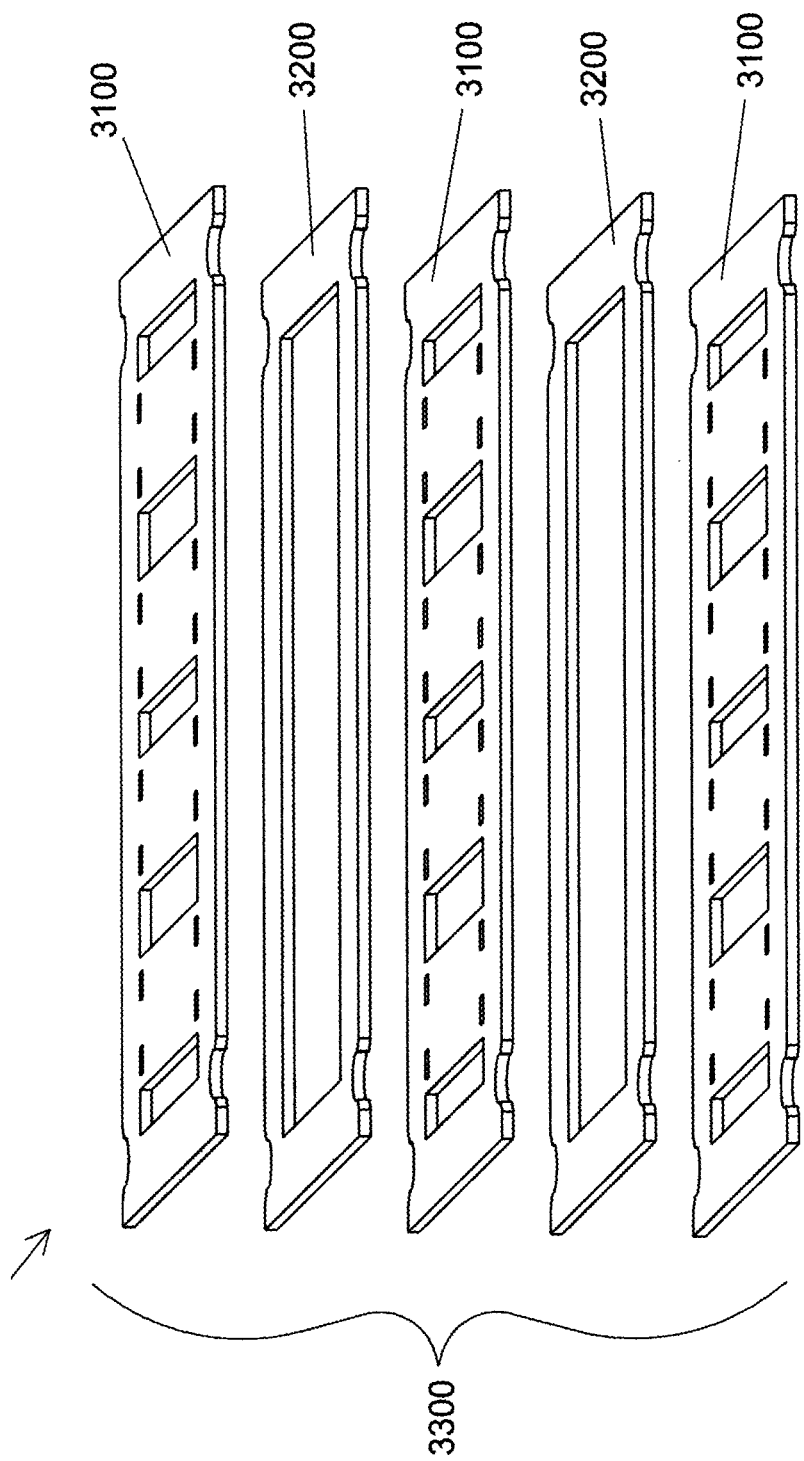
FIG. 80 is an exploded view of a lamina subassembly formed from a plurality of the filter laminas of FIG. 79 and the spacer laminas of FIG. 67.
Figure 81:
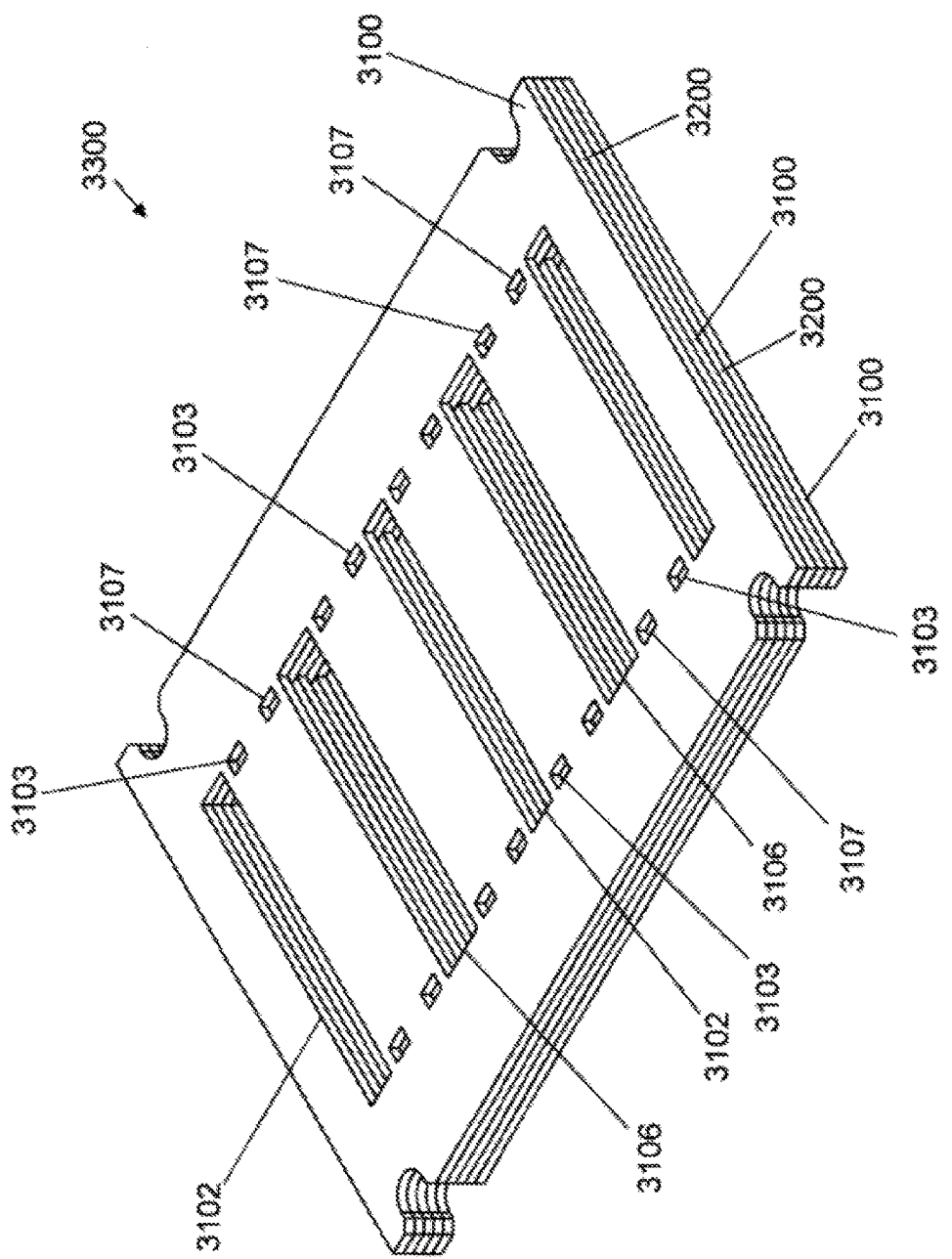
FIG. 81 is a perspective view of the assembled lamina subassembly of FIG. 80.

FIG. 79 depicts another embodiment of a primary filter lamina 3100 for a tunable nanofiber diffusion filter, the filter lamina 3100 being identical to primary filter lamina 2100 (FIGS. 65 and 66) in all aspects except as specifically described hereafter. Filter lamina 3100 has formed therein first apertures 3103 in proximity to first slots 3102, and second apertures 3107 in proximity to second slots 3106. Filter lamina 3100 is formed with parallel linear first and second slots 3102 and 3106 for primary blood and dialysate flow, and first and second apertures 3103 and 3107 for secondary blood and dialysate flow to create gradients within the diffusion zones. First and second apertures 3103 and 3107 are positioned in proximity to the lateral ends of the first and second slots 3102 and 3106, respectively.

The positioning of primary blood and dialysate flow passages and their associated secondary flow passages is a design choice, as is their size and configuration. The size, configuration and positioning of these features may be optimized to meet certain specific requirements with regard to size, flow rate, back pressures, or other requirements. For example, the slots may have non-linear shapes including semi-circular, circular, curvilinear or any combination of these. Similarly, the apertures for secondary flow (i.e., first and second apertures 3103 and 3107) may also have a variety of shapes including circular, oblong, rectilinear, or any combination of these shapes. Any diffusion filter which has parallel primary flow paths for blood and dialysate, adjacent diffusion zones which meet at an interface and comprise a nanofiber array, and one or more secondary flow paths which intersect one or more of these diffusion zones for the purpose of creating flow within the diffusion zone in proximity to the interface, falls within the scope of this invention.

FIGS. 80 to 83 depict a lamina subassembly 3300 comprising a plurality of filter laminas 3100 and spacer laminas 3200. Each spacer lamina 3200 is identical in all regards to spacer lamina 2200 shown in FIGS. 67 and 68 and described above. The dashed arrows in FIGS. 82 and 83 indicate flow within first diffusion zones 3302 adjacent to first slots 3102 and first apertures 3103, and flow within second diffusion zones 3304 adjacent to second slots 3106 and second apertures 3107. Flow exiting first and second diffusion zones 3302 and 3304, respectively, is replaced by "fresh" fluids flowing into the zones from their respective adjacent primary flow paths through flow passages formed by first and second slots, 3102 and 3106, respectively. In both cases the direction of the flow has a component parallel to the interfaces or boundaries between diffusion zones 3302 and 3304 so as to cause a refreshing of the fluids in the respective zones adjacent to their interface.

Figure 82:
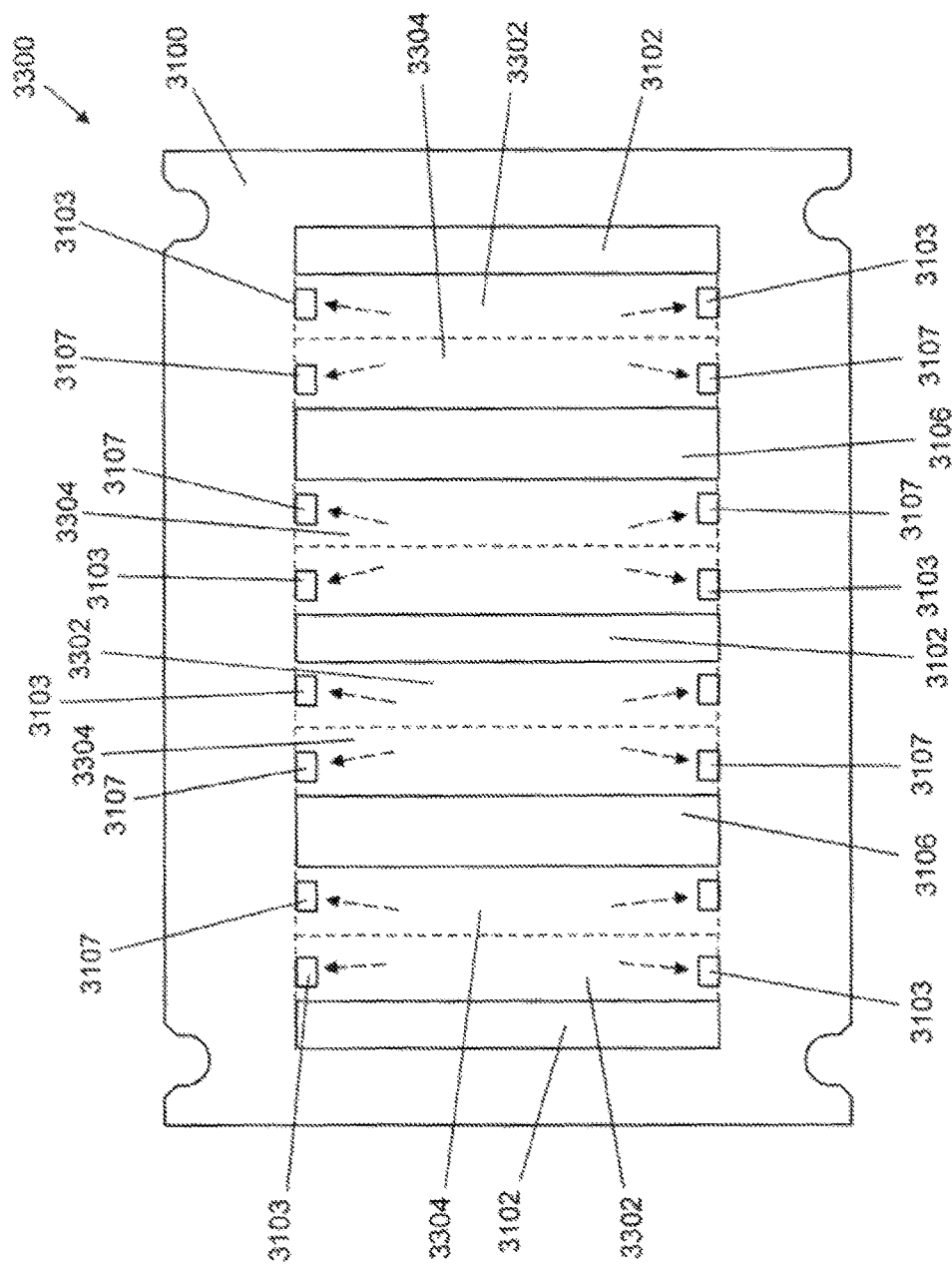
FIG. 82 is a plan view of the lamina subassembly of FIG. 81.
Figure 83:
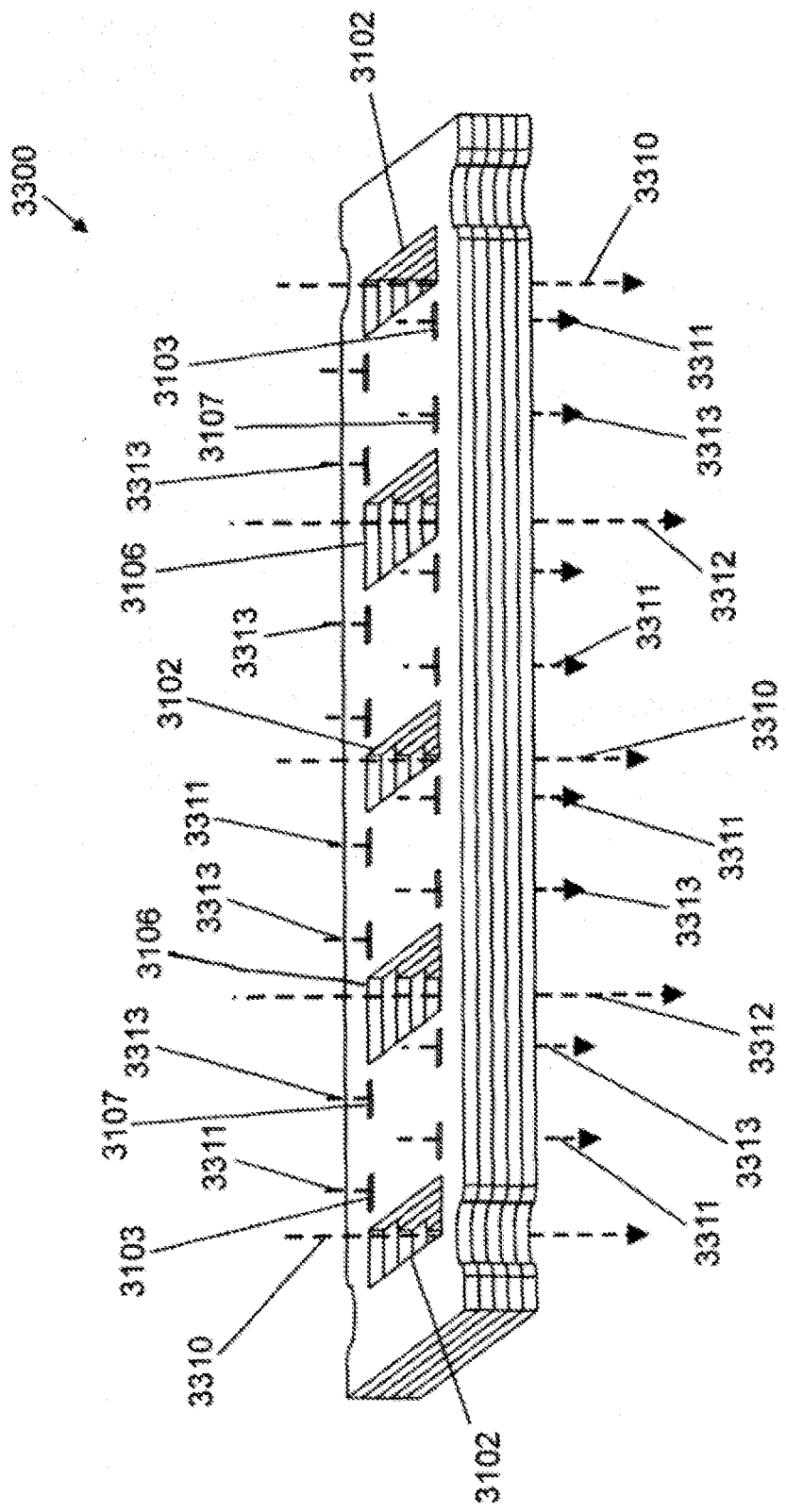
FIG. 83 is another perspective view of the lamina subassembly of FIG. 81. Dashed arrows indicate primary and secondary flow paths.

Referring now to FIG. 83, primary blood flow 3310 flows through flow passages formed by first slots 3102 downward through lamina subassembly 3300. Primary dialysate flow 3312 flows through flow passages formed by second slots 3106 downward through first lamina subassembly 3300. Secondary blood flow 3311 flows through flow passages formed by first apertures 3103 downward through lamina subassembly 3300, with the volume of blood flow increasing with the addition of blood from downstream first diffusion zones 3302 (FIG. 82). Secondary dialysate flow 3313 flows through flow passages formed by second apertures 3107 downward through lamina subassembly 3300, with the volume of dialysate flow increasing with the addition of dialysate from downstream second diffusion zones 3304 (FIG. 82). To accommodate this increased flow, the sizes of first and second apertures 3103 and 3107 in downstream primary laminas 3100 of lamina subassembly 3300 are incrementally increased with increasing distance from the uppermost lamina in the lamina subassembly 3300.

Figure 84:
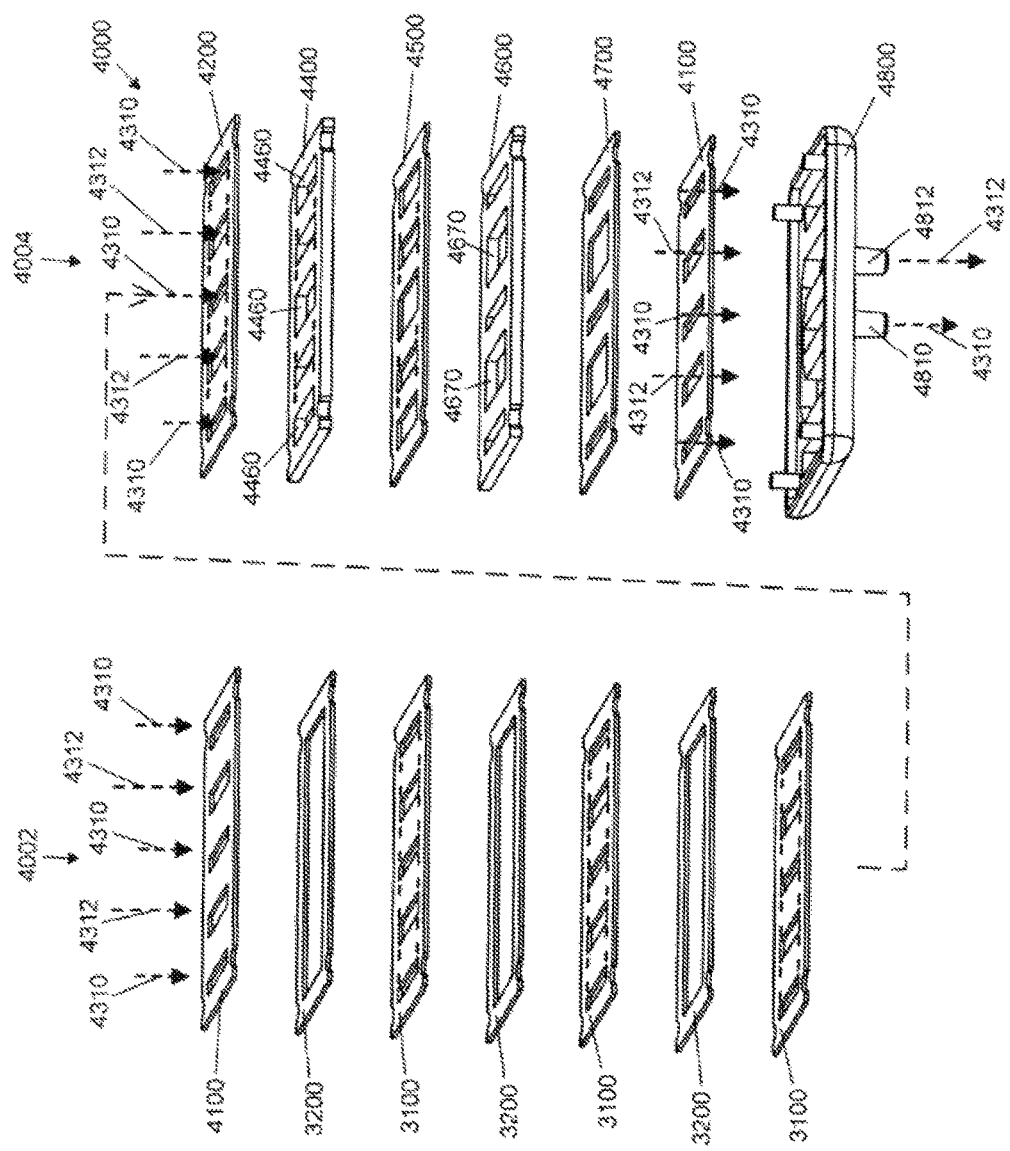
FIG. 84 is an exploded perspective view of a portion of tunable nanofiber diffusion filter showing a lamina stack showing a lamina stack comprising the lamina subassembly of FIG. 80 ready for assembly into the bottom portion of a filter housing.

FIG. 84 depicts a lamina stack and bottom portion of a filter housing for an embodiment of a tunable nanofiber diffusion filter 4000 formed in accordance with the present disclosure. The lamina stack comprises an upper stack portion 4002 including a quaternary filter filter lamina 4100 overlying the lamina subassembly 3300 of FIGS. 80 through 83, and a lower stack portion 4004 including multiple additional filter laminas overlying another a quaternary filter lamina 4100.

Specifically, lower stack portion 4004 includes a secondary spacer lamina 4200, a secondary filter lamina 4400 underlying secondary spacer lamina 4200, a tertiary spacer lamina 4500 underlying secondary filter lamina 4400, a tertiary filter lamina 4600 underlying tertiary spacer lamina 4500, a quaternary spacer lamina 4700 underlying tertiary filter lamina 4600, and a quaternary filter lamina 4100 underlying tertiary spacer lamina 4600.

Lower stack portion 4004 receives blood 4310 and dialysate 4312 from upper stack portion 4002 through secondary spacer lamina 4200 in which is formed slots and apertures matching those of the lowermost primary filter lamina 3100 of upper stack portion 4002. Secondary filter lamina 4400 has openings 4460 that receive primary and secondary blood flow 3310 and 3311 exiting first slots 3102 and first apertures 3103, respectively, of the lowermost primary filter lamina 3100 (see FIG. 83) in the lamina subassembly 3300 in the upper stack portion 4002 so as to combine primary and secondary blood flow 3310, 3311 for passage through lower stack portion 4004.

Tertiary spacer lamina 4500 has formed therein slots and apertures matching those of adjacent overlying secondary filter lamina 4400. In some embodiments, tertiary spacer lamina 4500 may be thinner than secondary filter lamina 4400. In other embodiments, tertiary spacer lamina 4500 may be of the same or greater thickness as secondary filter lamina 4400.

Tertiary filter lamina 4600 has openings 4670 which receive primary and secondary dialysate flow streams 3312 and 3313 exiting second slots 3106 and second apertures 3107, respectively, of bottom primary filter lamina 3100 (see again FIG. 83) of the lamina subassembly 3300 in the upper stack portion 4002 so as to combine primary and secondary dialysate flow 3312, 3313 for passage through the remainder of lower stack portion 4004.

Quaternary spacer lamina 4700 has formed therein slots and apertures that match those of adjacent overlying tertiary filter lamina 4600. Blood 4310 and dialysate 4312 exit quaternary filter lamina 4100 and are received by recesses within bottom filter housing portion 4800 and flow therethrough to blood and dialysate outflow connectors 4810 and 4812, respectively.

Referring again to FIG. 82, the flow within the diffusion zones indicated by the dashed arrows is due to a pressure gradient created by the presence of first and second apertures 3103 and 3107, and the flow passages formed thereby. This flow within the diffusion zones created by these pressure gradients causes a refreshing of fluids within each diffusion zone, the flow being from the primary flow passages formed by first and second slots 3102 and 3106, and the secondary flow passages formed by first and second apertures 3103 and 3107. A portion of this flow brings fresh fluid to the region within each diffusion zone that is adjacent to the interface or boundary between diffusion zones. This refreshing of the fluids adjacent to the interface brings clean dialysate and "dirty" blood to the diffusion zone interface thereby diffusing predetermined solutes from the blood to the dialysate for subsequent transport out of the filter by the dialysate flow.

Diffusion filters 2800 and 4000 previously herein described have parallel axial flow paths for blood and dialysate, the flow paths being substantially normal to the plane of the laminas. Arrays of nanofibers extending from top and bottom surfaces of the constituent laminas into the interlaminar space function as a semipermeable membrane that passes solute from the blood to the dialysate. However, in another exemplar embodiment of the present invention hereinafter described, the dialysate flow can be axial, normal to the plane of the laminas, and the blood flow path can take a circuitous path through the interlaminar spaces, the dialysate and blood flow paths being substantially perpendicular.

Figure 85A:
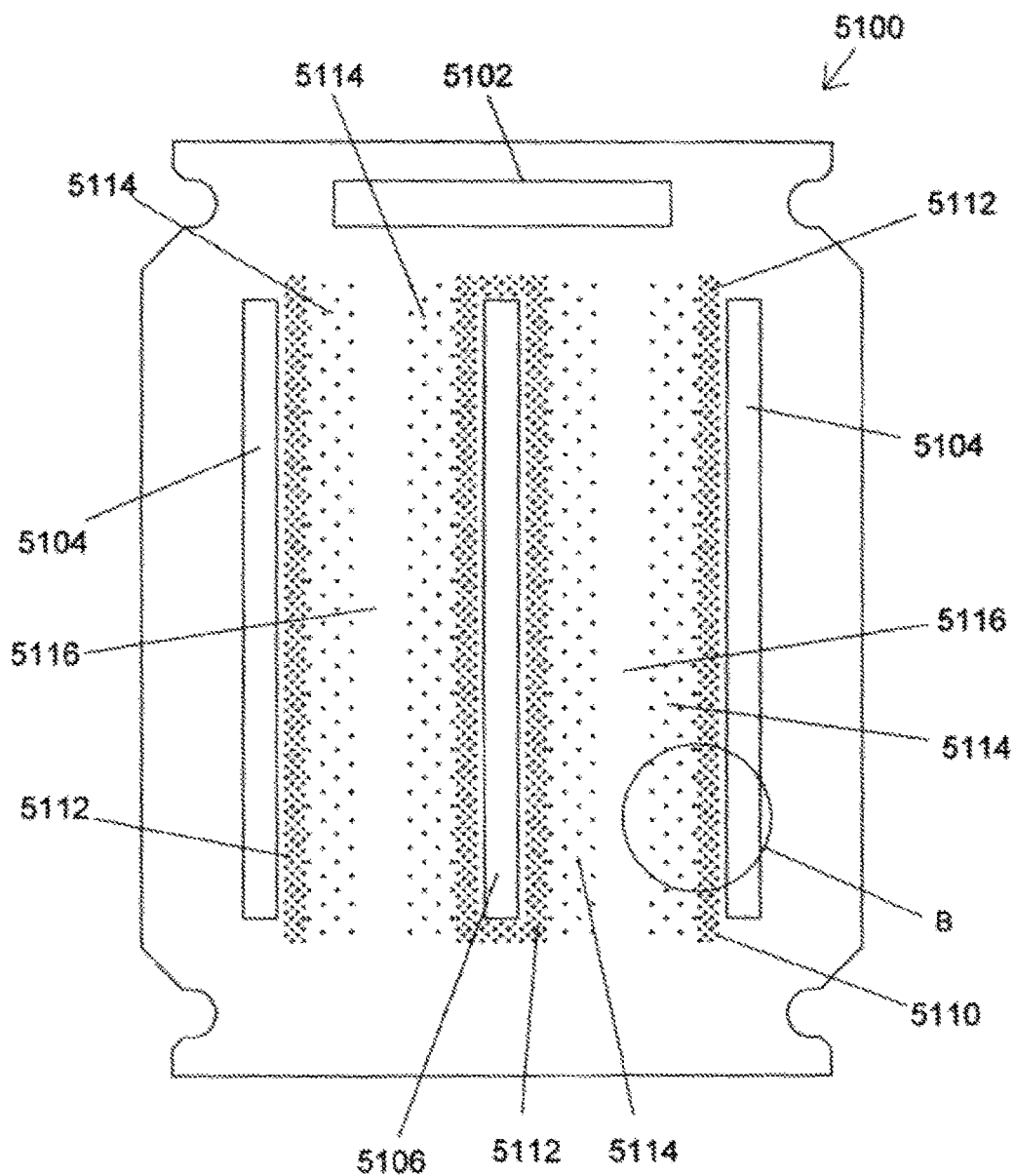
FIG. 85A is a plan view of a filter lamina for another alternate embodiment of a tunable nanofiber diffusion filter.
Figure 86:
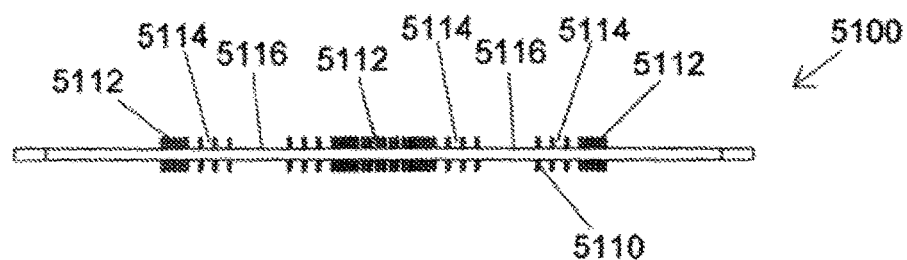
FIG. 86 is a side elevational view of the filter lamina of FIG. 85A.
Figure 85B:
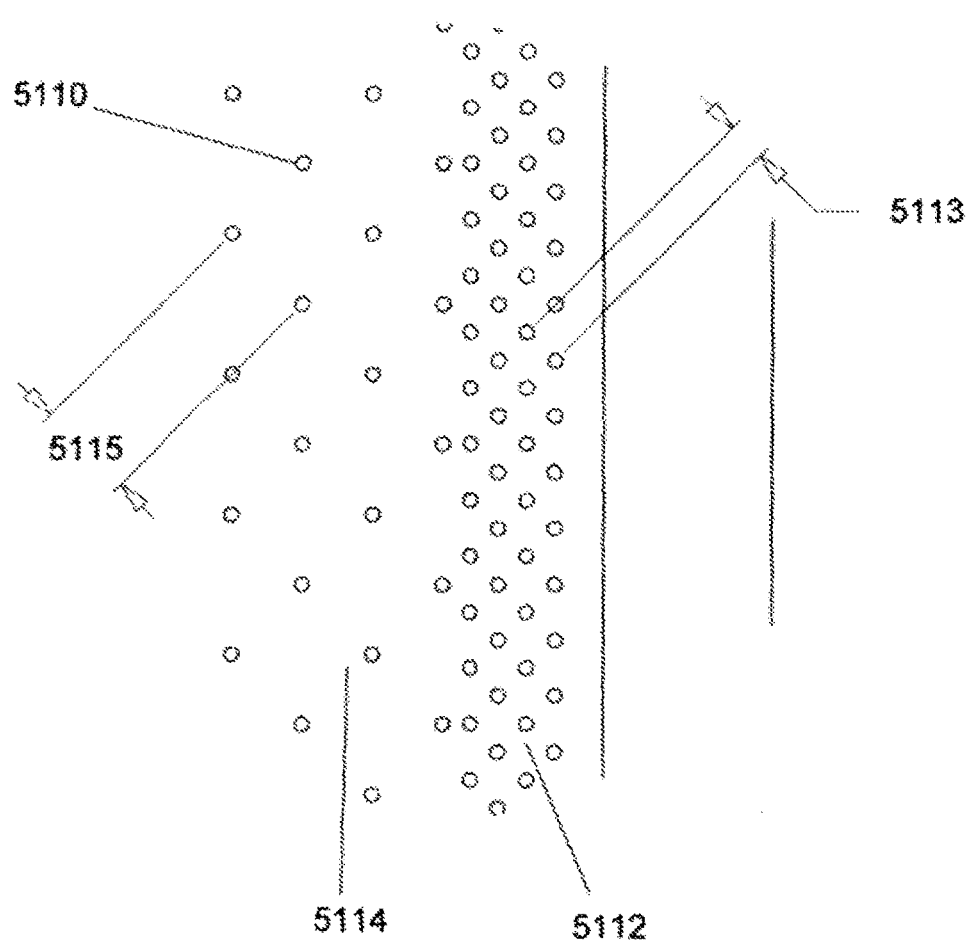
FIG. 85B is an enlarged view of the filter lamina of FIG. 85A at inset B.

Accordingly, FIGS. 85 and 86 depict a filter lamina 5100 for another embodiment of a tunable nanofiber diffusion filter constructed in accordance with the present disclosure in which the dialysate flow path is perpendicular to the filter lamina 5100 and the blood flow path passes through the interlaminar space, parallel to the plane of the filter lamina 5100.

Filter lamina 5100 has first and second longitudinal slots 5104, a third longitudinal slot 5106 centrally located between first and second longitudinal slots 5104, and a lateral slot 5102 perpendicular to longitudinal slots 5104, 5106. As shown in FIG. 86, filter lamina 5100 has symmetrically opposed arrays of nanofibers formed on its upper and lower surfaces. First nanofiber arrays 5112 can be positioned in close proximity to longitudinal slots 5104 and 5106 and can be formed of nanofibers 5110 spaced a first array distance 5113 apart. Second nanofiber arrays 5114 can be positioned adjacent to first nanofiber arrays 5112 and can be formed of nanofibers 5110 spaced a second array distance 5115 apart. First array distance 5113 can be between about one and ten microns, or between about one and five microns. In some embodiments, the first array distance 5113 can be about 1, 2, 3, 4, 5, 6, 7, 8, 9, or 10 µm. Second array distance 5115 is preferably greater than first array distance 5113, and can be between about 200 microns to 2 microns. The ratio of second array distance 5115 to first array distance 5113 can be between about 2:1 and about 20:1, or between about 4:1 and about 10:1. In some embodiments, the ratio of second array distance 5115 to first array distance 5113 can be about 10:1, 9:1, 8:1, 7:1, 6:1, 5:1, 4:1, 3:1, or 2:1. First and second nanofiber arrays 5112 and 5114 can be separated by a region 5116 having no nanofibers, as shown in FIGS. 85 through 86.

Figure 87:
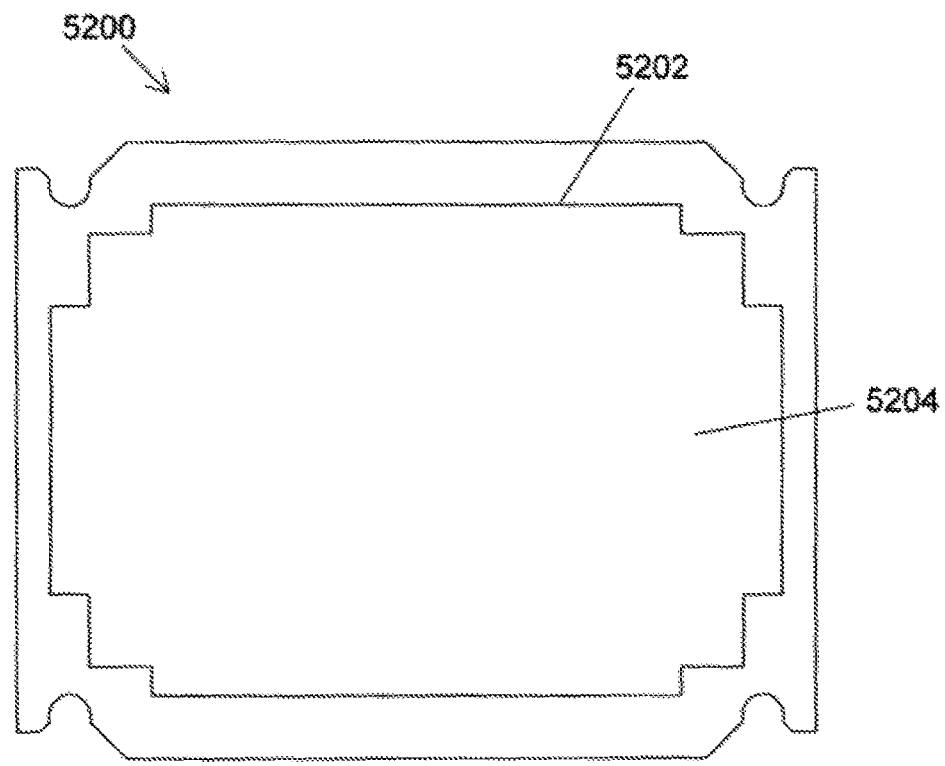
FIG. 87 is a plan view of an embodiment of a spacer lamina for use with the filter lamina of FIG. 85A.
Figure 88:
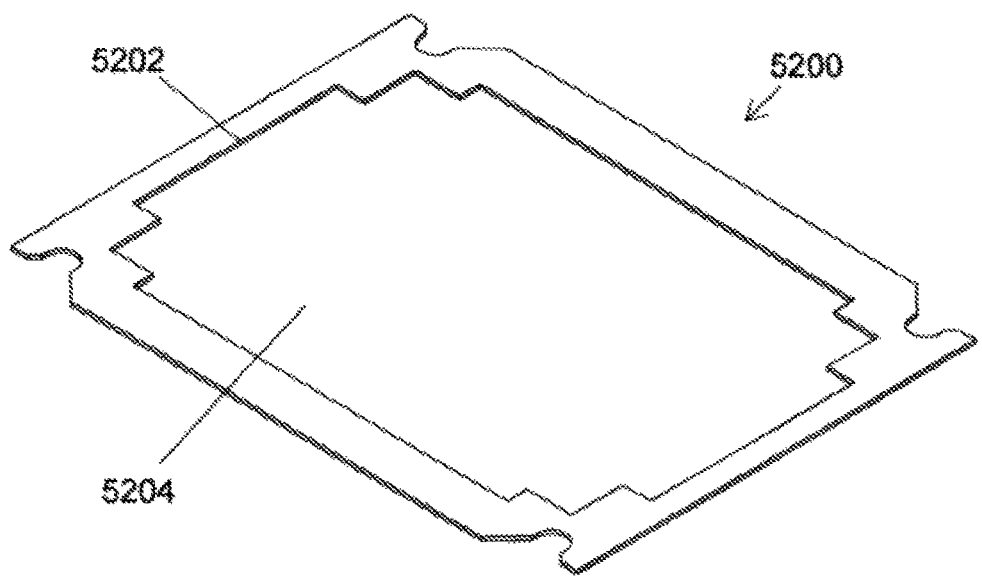
FIG. 88 is a perspective view of the spacer lamina of FIG. 87.

FIGS. 87 and 88 depict a spacer lamina 5200 for use with filter lamina 5100 in a lamina stack for a tunable nanofiber diffusion filter of the present disclosure. Spacer lamina 5200 has a large central opening 5204 defined by perimeter 5202.

Figure 89:
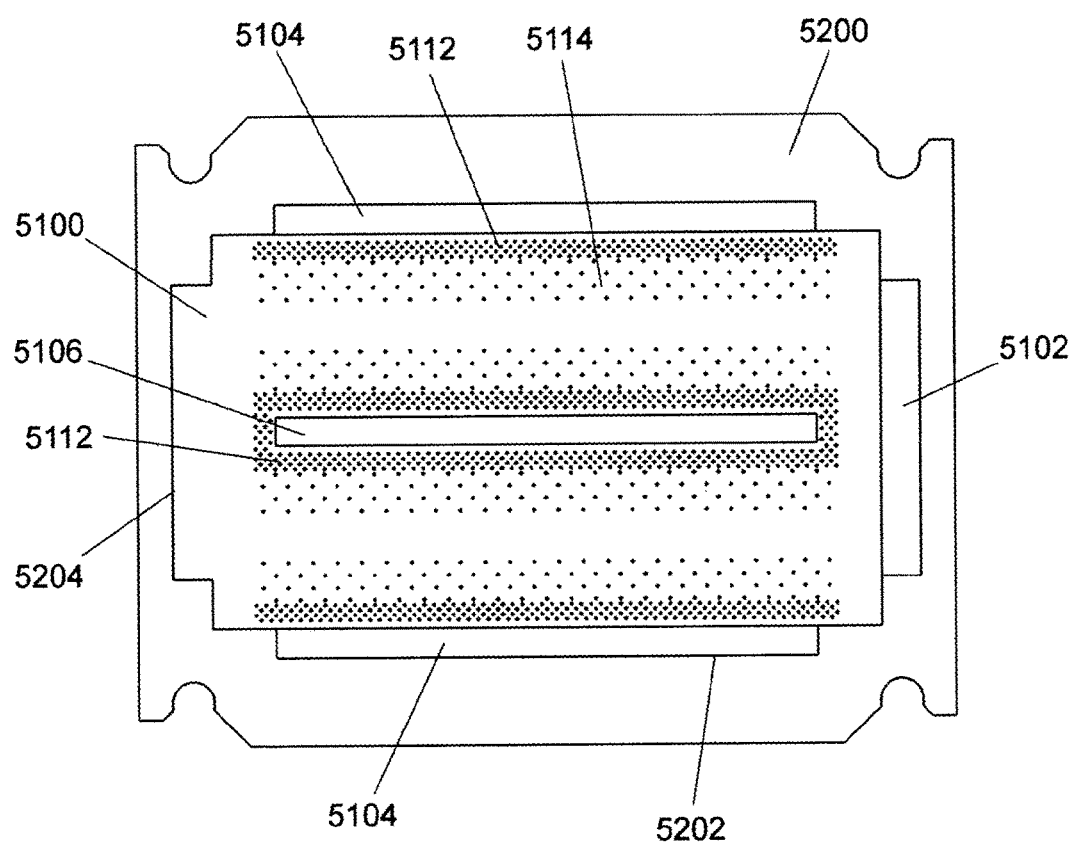
FIG. 89 is a plan view of the spacer lamina of FIG. 87 assembled on top of a filter lamina of FIG. 85A.
Figure 90:
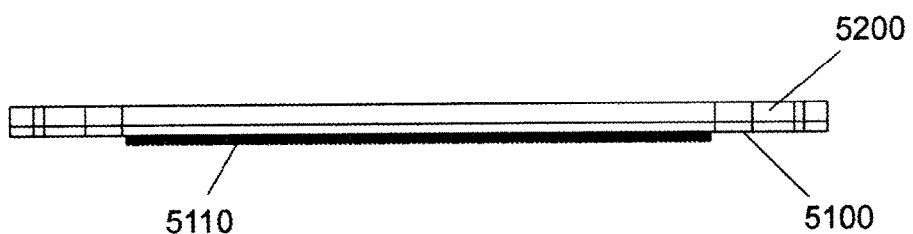
FIG. 90 is a side elevational view of the assembled laminas of FIG. 89.

FIGS. 89 and 90 depict filter lamina 5100 and spacer lamina 5200 assembled into a portion of a lamina stack for use in an embodiment of a tunable nanofiber diffusion filter of the present disclosure. Slots 5104 of filter lamina 5100 are bounded on their medial sides by first nanofiber arrays 5112, and their other (i.e., lateral) sides by perimeter 5202 of opening 5204 of spacer lamina 5200. Lateral slot 5102 of filter lamina 5100 is bounded on three sides by perimeter 5202 of opening 5204 of spacer lamina 5200.

Figure 91:
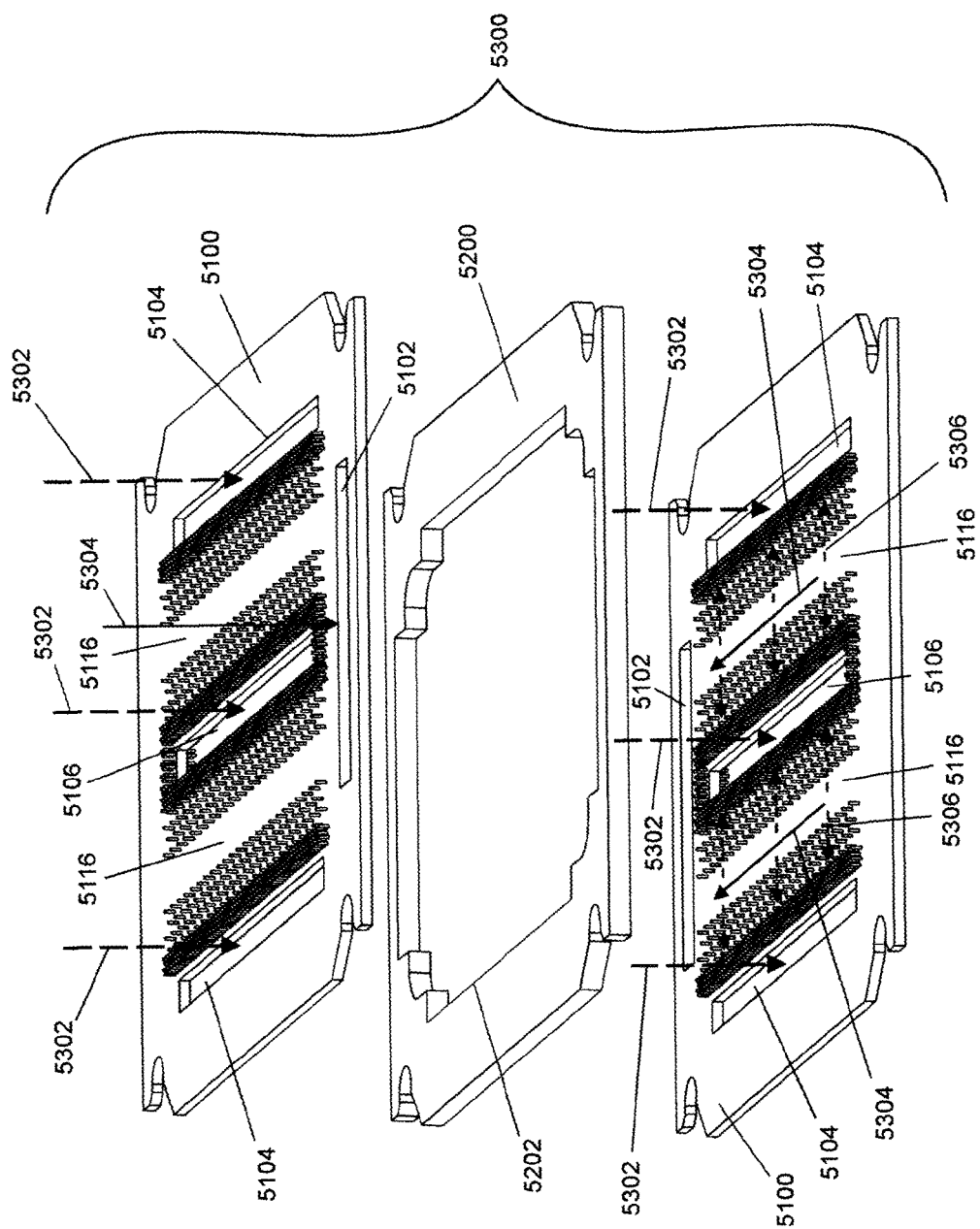
FIG. 91 is an exploded view of a lamina subassembly formed from two filter laminas of FIG. 85A and a spacer lamina of FIG. 87.

FIG. 91 depicts an exploded view of a lamina subassembly 5300 comprising a spacer lamina 5200 between two filter laminas 5100. Arrows indicate the direction of dialysate flow 5302, blood flow 5304, and diffusion flow 5306. The central opening of the spacer lamina 5200 defines an interlaminar space between adjacent overlying and underlying filter laminas 5100. Blood 5304 flows into the interlaminar space via lateral slot 5102 in overlying filter lamina 5100, through the interlaminar space primarily via nanofiber free regions 5116, but also through second nanofiber arrays 5114, and to a lesser extent through first nanofiber arrays 5112. Blood 5304 exits the interlaminar space via lateral slot 5102 in underlying filter lamina 5100. Dialysate 5302 flows vertically through lamina assembly 5300 through longitudinal slots 5104 and 5106. Blood flowing through first nanofiber arrays 5112 adjacent to longitudinal dialysate flow slots 5104 and 5106 allows the diffusion of selected solutes from blood 5304 to dialysate 5302.

Figure 92:
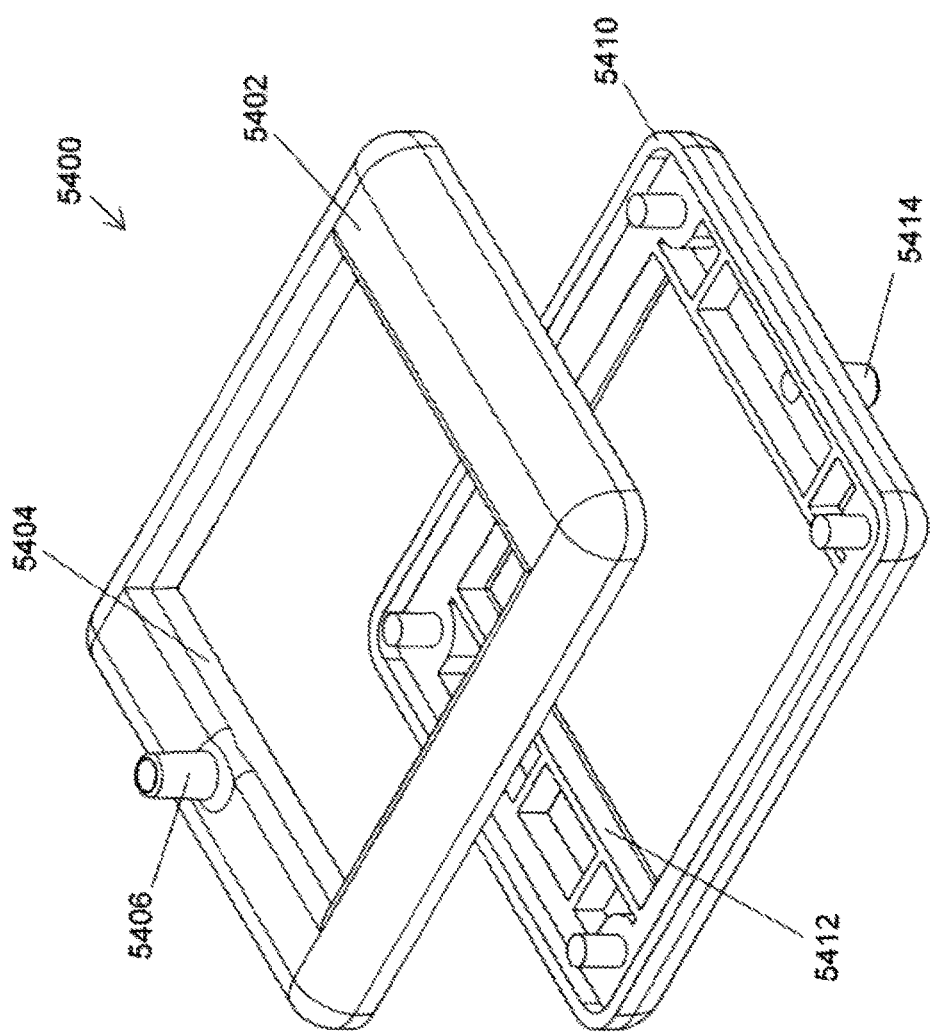
FIG. 92 is a perspective view of upper and lower portions of a housing for an embodiment of a tunable nanofiber diffusion filter comprising the lamina subassembly of FIG. 91.

FIG. 92 depicts an embodiment of a housing 5400 for an alternate embodiment of a tunable nanofiber diffusion filter constructed in accordance with the present disclosure. Housing 5400 includes an upper portion 5402 having a central window 5404 and an inlet connector 5406, and a lower portion 5410 having a central window 5412 and an outlet connector 5414. The windows in the upper and lower housing portions can be large central apertures defined through each housing portion.

Figure 93:
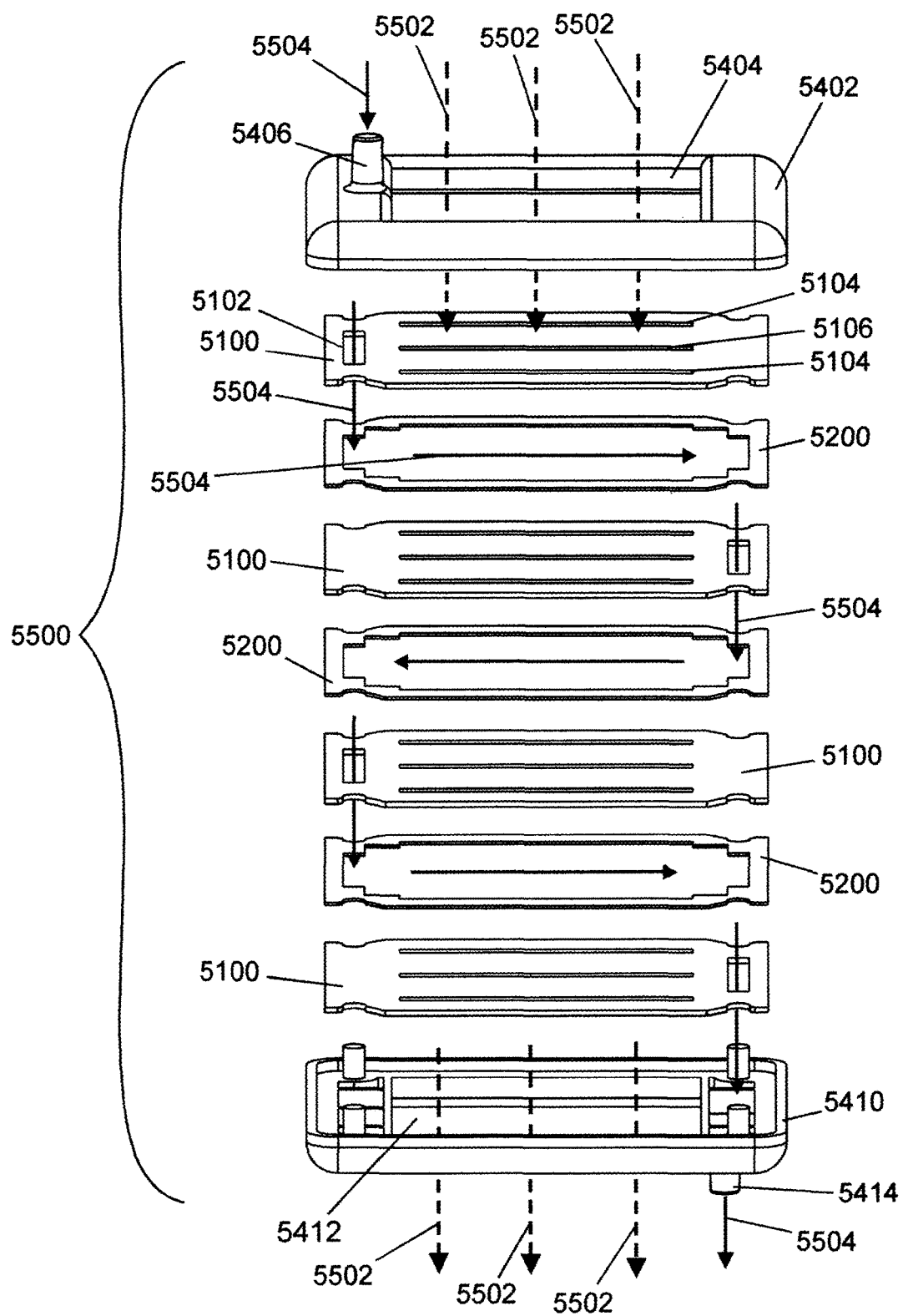
FIG. 93 is an exploded view of a tunable nanofiber diffusion filter formed from a plurality of the lamina subassemblies of FIG. 91 and the filter housing of FIG. 92.

FIG. 93 depicts a tunable nanofiber diffusion filter 5500 comprising housing 5400 and a lamina stack comprising multiple lamina subassemblies 5300 formed from a plurality of filter laminas 5100 and spacer laminas 5200. The nanofiber arrays depicted in FIG. 91 are omitted for clarity, but it should be understood that such nanofiber arrays or variations thereof can be present on the surfaces of filter laminas 5100. Dialysate 5502 enters filter 5500 via window 5404 in upper housing portion 5402 and flows via slots 5104 and 5106 in filter laminas 5100 through filter 5500, exiting via window 5412 in lower housing portion 5410. Blood 5504 enters filter 5500 via inlet connector 5406 in upper housing portion 5402 and follows an interlaminar path as previously herein described with regard to upper filter portion 1200 of filter 1500 as depicted in FIG. 59, exiting filter 5500 via outlet connector 5414.

Figure 94:
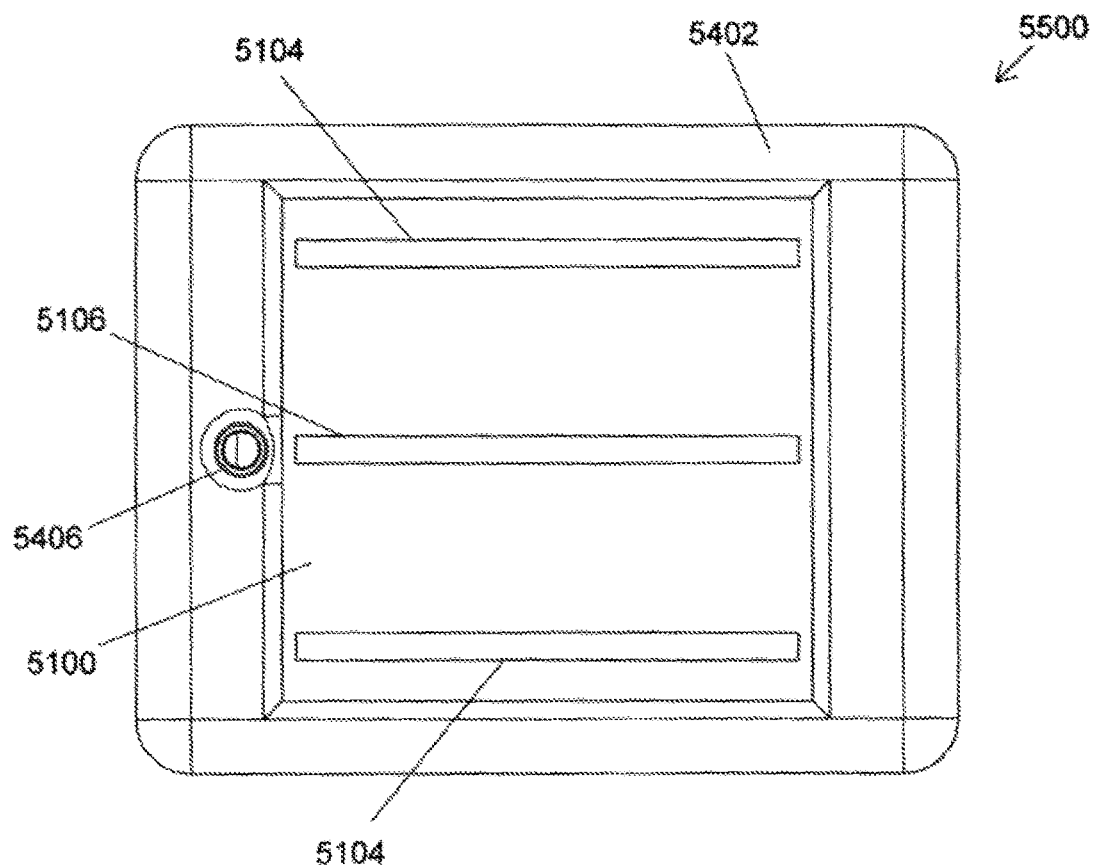
FIG. 94 is a plan view of the assembled filter of FIG. 93.
Figure 95:
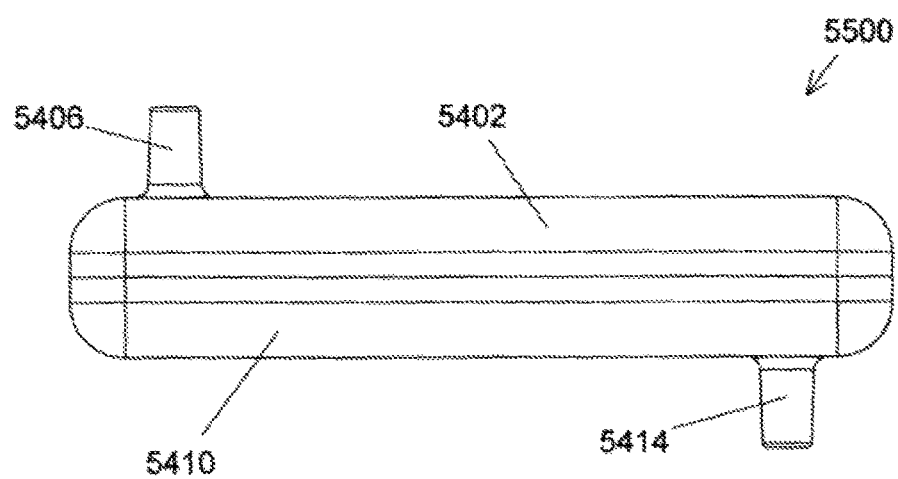
FIG. 95 is a side elevational view of the filter of FIG. 94.
Figure 96:
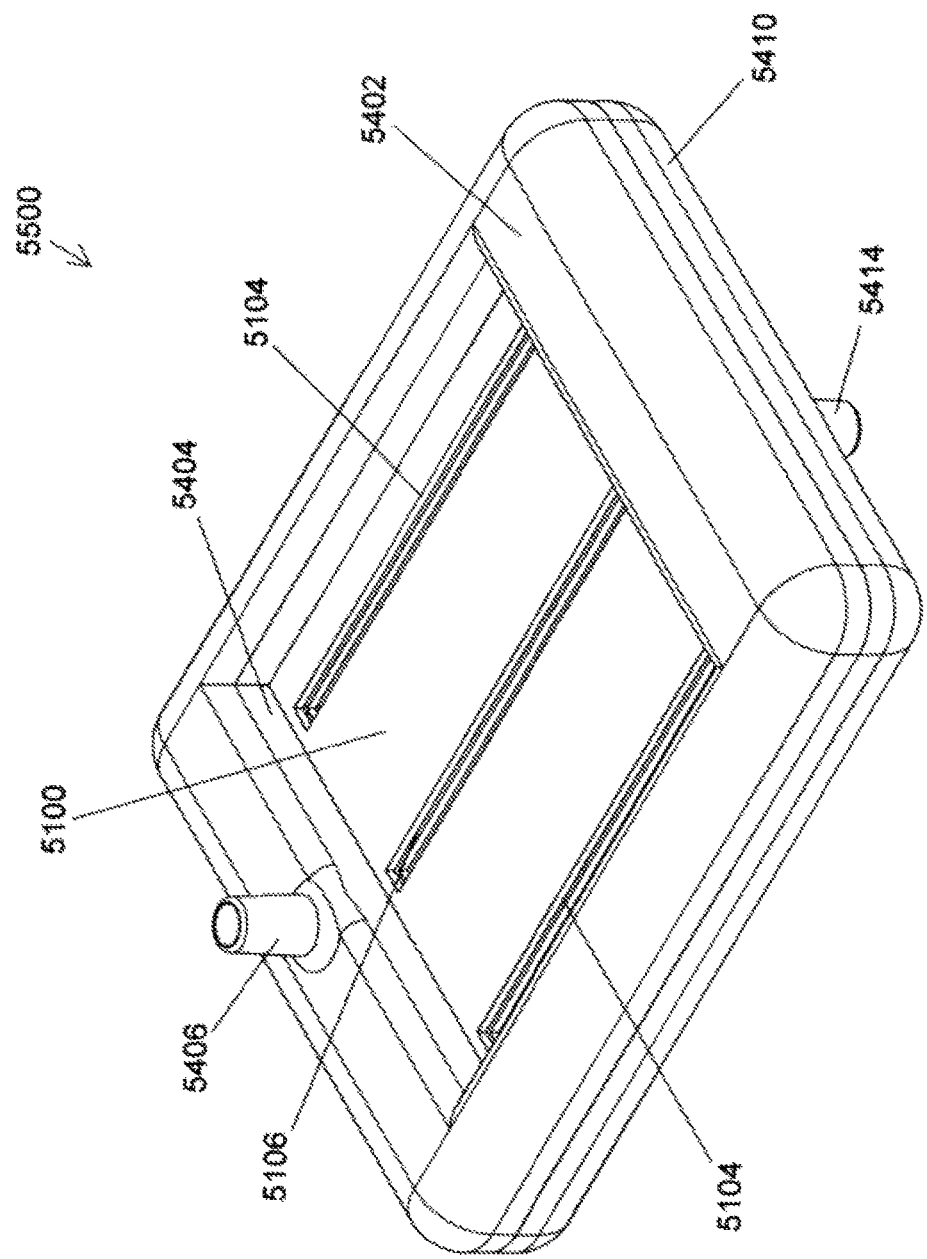
FIG. 96 is a perspective view of the filter of FIG. 94.

FIGS. 94 through 96 depict filter 5500 assembled for use with upper housing portion 5402 being permanently affixed to lower housing portion 5410 in a manner which seals the laminas shown in FIG. 93 within upper and lower housing portions 5402 and 5410. Unlike previously described diffusion filters 2800 (FIG. 78) and 4000 (FIG. 84) which have a dialysate flow path connected to an external source via tubing and connectors, filter 5500 is configured to be submerged in dialysate during use, as shown in FIG. 97.

Figure 97:
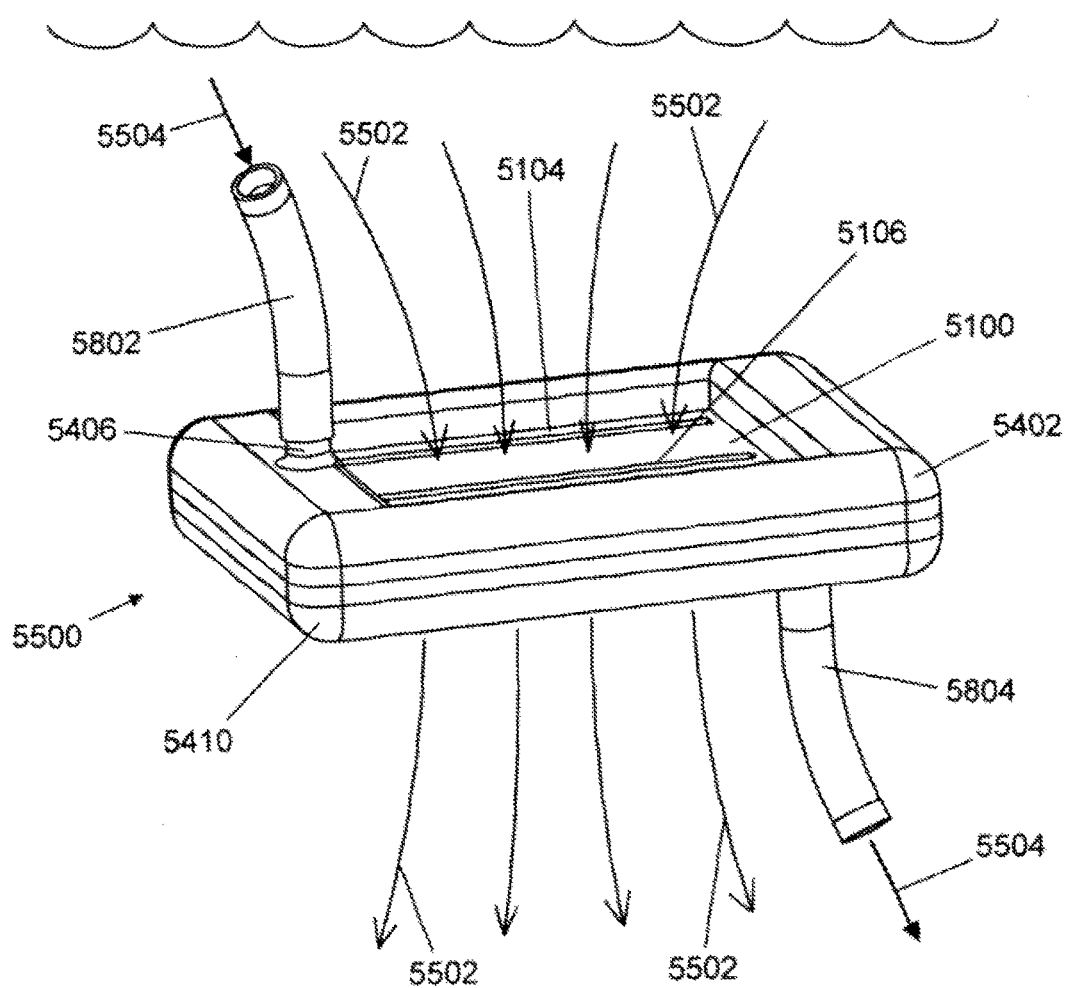
FIG. 97 is a diagram depicting the filter of FIG. 94 in use.

Referring now to FIG. 97 depicting filter 5500 submerged in a vessel filled with dialysate 5502, blood 5504 is supplied to filter 5500 by first tubular member 5802 connected to inlet connector 5406 of upper housing portion 5402. Outflow of the filtered blood 5504 is via second tubular member 5804 connected to outflow connector 5412 (not shown) of lower housing portion 5410. Dialysate in which the filter 5500 is submerged can flow from the surrounding environment through slots 5104 and 5106 of filter laminas 5100 as a result of natural convection currents, forced fluid motion, or other means.

In use, filter 5500 and other filters of the present disclosure in which the path for the flow of a fluid is primarily through the interlaminar spaces parallel to the plane of the laminas, resistance to the flow may exceed that desired for a specific application. This resistance, referred to as "back pressure," may be reduced by modifying various parameters of the flow path passing through the laminas. Such parameters include, without limitation, the distance between adjacent laminas, the depth of lamina channels, the gap or space between opposing nanofiber arrays extending into the flow space or flow passages from adjacent laminas, and the distance between nanofibers in an array of nanofibers.

Figure 98:
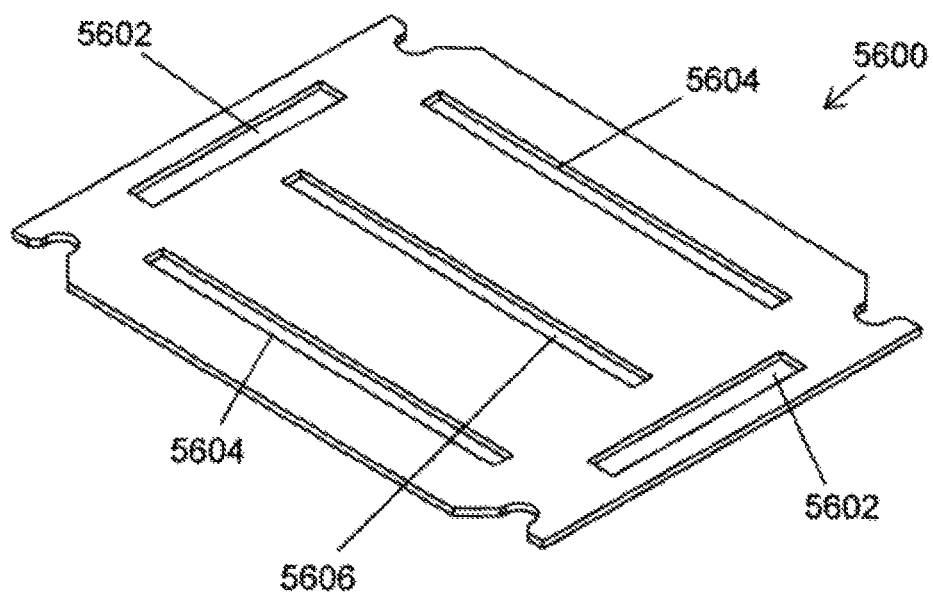
FIG. 98 is a perspective view of another filter lamina for an alternate embodiment of the tunable nanofiber diffusion filter of FIG. 93.
Figure 99:
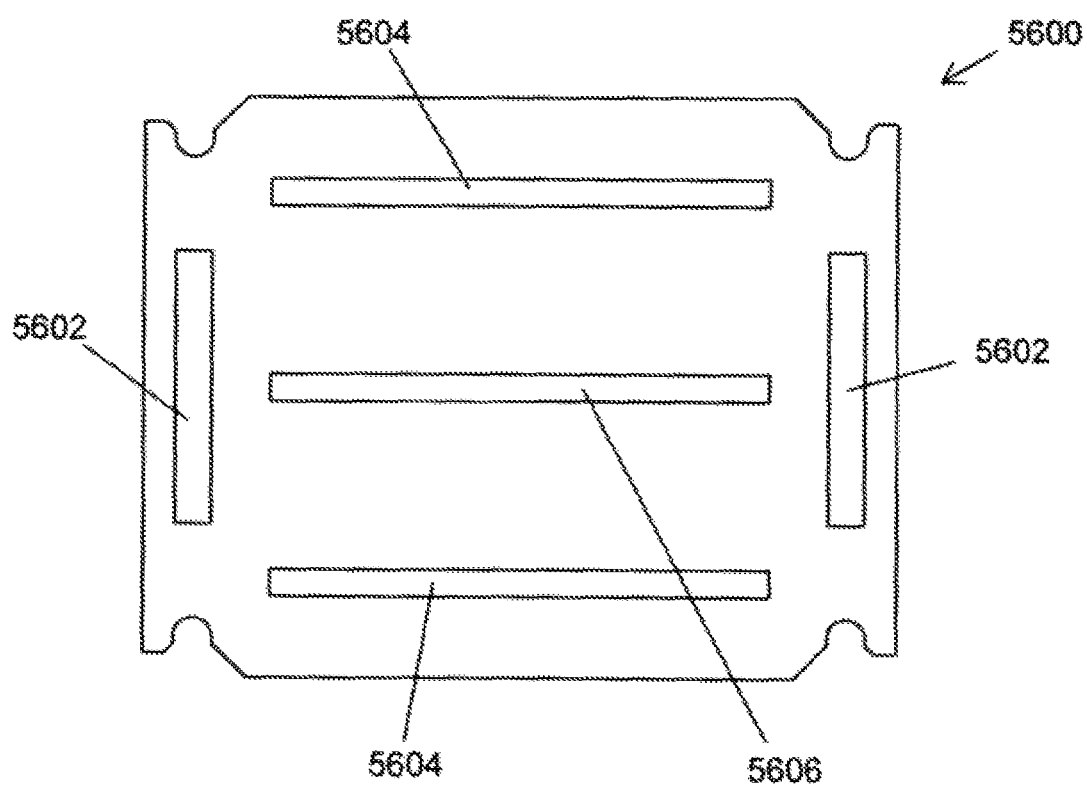
FIG. 99 is a plan view of the filter lamina of FIG. 98.

FIGS. 98 and 99 depict another filter lamina 5600 for an alternate embodiment of the tunable nanofiber diffusion filter of FIG. 93 that is similar in construction to filter 5500, but with decreased resistance to blood flow. Secondary filter lamina 5600 is identical to filter lamina 5100 in all aspects of form and function except as specifically described hereafter. Specifically, secondary filter lamina 5600 has first and second longitudinal slots 5604, a third longitudinal slot 5606 centrally located between first and second longitudinal slots 5604, and a lateral slot 5602 perpendicular to longitudinal slots 5104, 5106. However, secondary filter lamina 5600 also has a second lateral slot 5602 disposed symmetrically opposite to first lateral slot 5602 relative to longitudinal slots 5604, 5606, whereas filter lamina 5100 does not have this second lateral slot.

Figure 100:
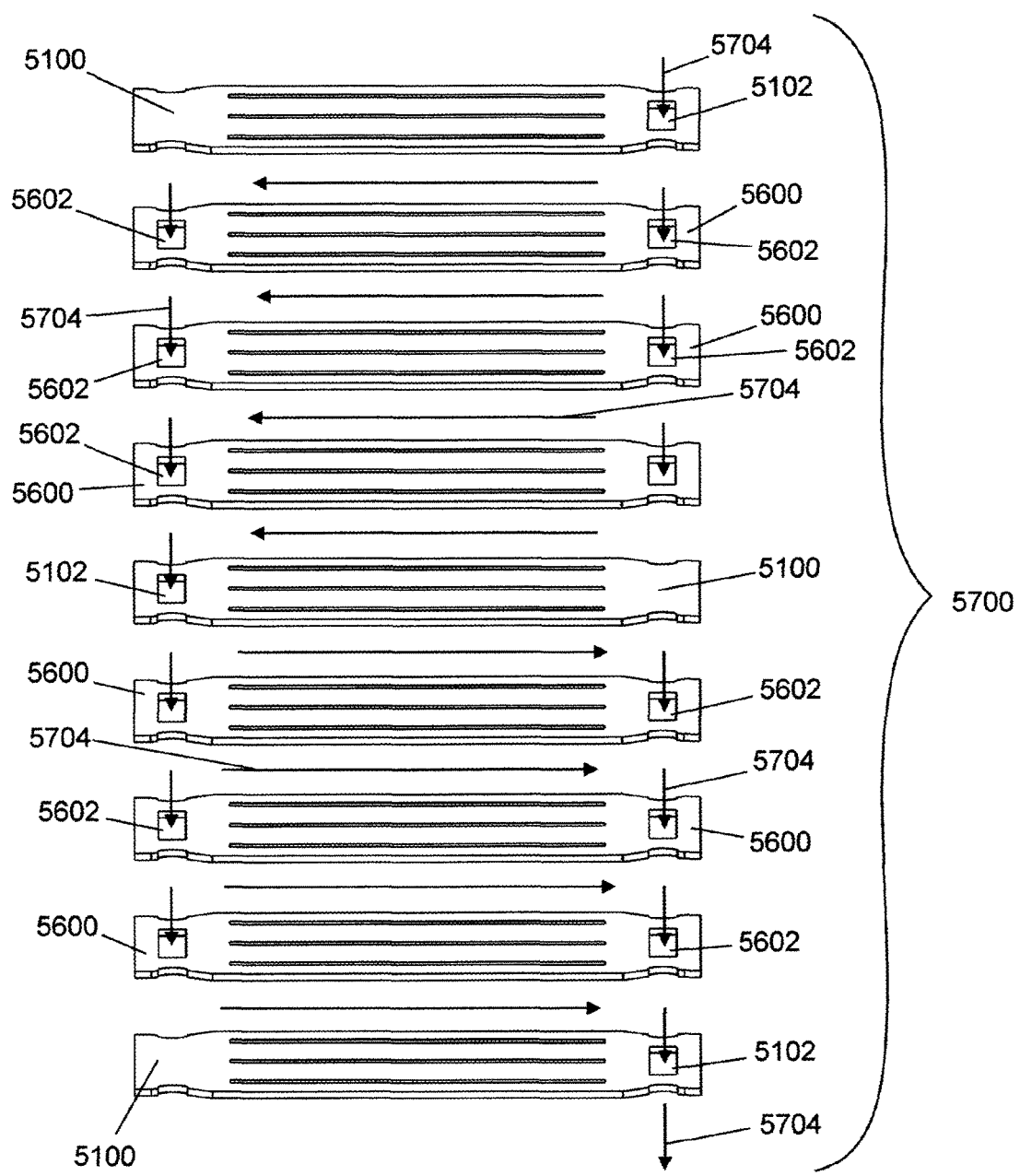
FIG. 100 is an exploded view of a portion of a lamina stack for an alternate embodiment of the tunable nanofiber diffusion filter of FIG. 93. Spacer laminas are omitted.

FIG. 100 depicts a partial lamina stack 5700 for use in the decreased resistance to blood flow embodiment of the tunable nanofiber diffusion filter shown in FIG. 93. For clarity in depicting the interlaminar flow paths, the spacer laminas 5200 are not shown. It will be understood that the construction of filter 5500 is like that of embodiments previously herein described (for example, the embodiment shown in FIG. 93) in that spacer laminas 5200 are interspersed between adjacent filter laminas 5100 and 5600.

As with the lamina stack of filter 5500, dialysate flow 5702 in lamina stack 5700 is substantially normal to a plane containing the stacked laminas through longitudinal slots 5104 and 5106 of filter laminas 5100, and through longitudinal slots 5604 and 5606 of secondary laminas 5600. The flow path of blood 5704 through lamina stack 5700 allows the blood flow 5704 to divide between multiple parallel flow paths extending through the interlaminar spaces.

Blood 5704 enters through slot 5102 in the uppermost filter lamina 5100 and fills a flow space created by the multiple coaxially positioned lateral slots 5602 in secondary filter laminas 5600 thereunder, the bottom of the flow space being formed by the portion of filter lamina 5100 which is positioned beneath the last filter lamina 5100 forming the flow space. Blood flow from the flow space is through the parallel interlaminar spaces formed by the uppermost and middle primary filter laminas 5100 and secondary filter laminas 5600 positioned therebetween. Blood flows from the interlaminar spaces to a flow space formed by opposite lateral slots 5602 of the secondary filter laminas 5600 and slot 5102 of filter lamina 5100 positioned in the center of the stack segment. The top of the flow space is formed by coaxially positioned portion of the uppermost filter lamina 5100, and the bottom of the flow space is formed by the coaxially positioned portion of the lowermost filter lamina 5100.

Blood flows from the upper portion of the cavity through slot 5102 in the middle filter lamina 5100 to the lower portion of the flow space. From the lower portion of the flow space the blood flows through the interlaminar spaces formed by the middle and lowermost filter laminas 5100 and by the secondary filter laminas 5600 positioned therebetween. The blood is collected in a flow space formed by the first lateral slots 5602 in secondary filter laminas 5600 with the top of the flow space being formed by the coaxially located portion of the middle filter lamina 5100. Blood flows downward from this flow space to an adjacent portion of the lamina stack or to an outflow connector.

It will be understood that the parallel flow path model illustrated in FIG. 100 may be applied to any filter of the present disclosure in which one or more fluids flow through the interlaminar spaces. The number of parallel interlaminar paths among which the flow is divided can be optimized for specific applications, as can the number of laminas used in the lamina stack.

Diffusion filters 2800 and 4000 previously herein described have parallel axial flow paths for blood and dialysate that flow through the filter in the same direction. Diffusion filters 5500 and 5700 have axial dialysate flow paths, the dialysate flow paths being substantially normal to the plane of the laminas, and blood flow paths which flow through the interlaminar spaces extending back and forth between adjacent laminas down through the stack. However, it can be beneficial in some instances to have a tunable nanofiber diffusion filter in which the blood and dialysate both flow through the interlaminar spaces, the flow paths being separated by nanofiber arrays as previously herein described. Further, it can be beneficial in certain cases to have a counterflow condition between the dialysate and blood flows within these interlaminar spaces, the flow paths being parallel but flowing in opposite directions.

Figure 101:
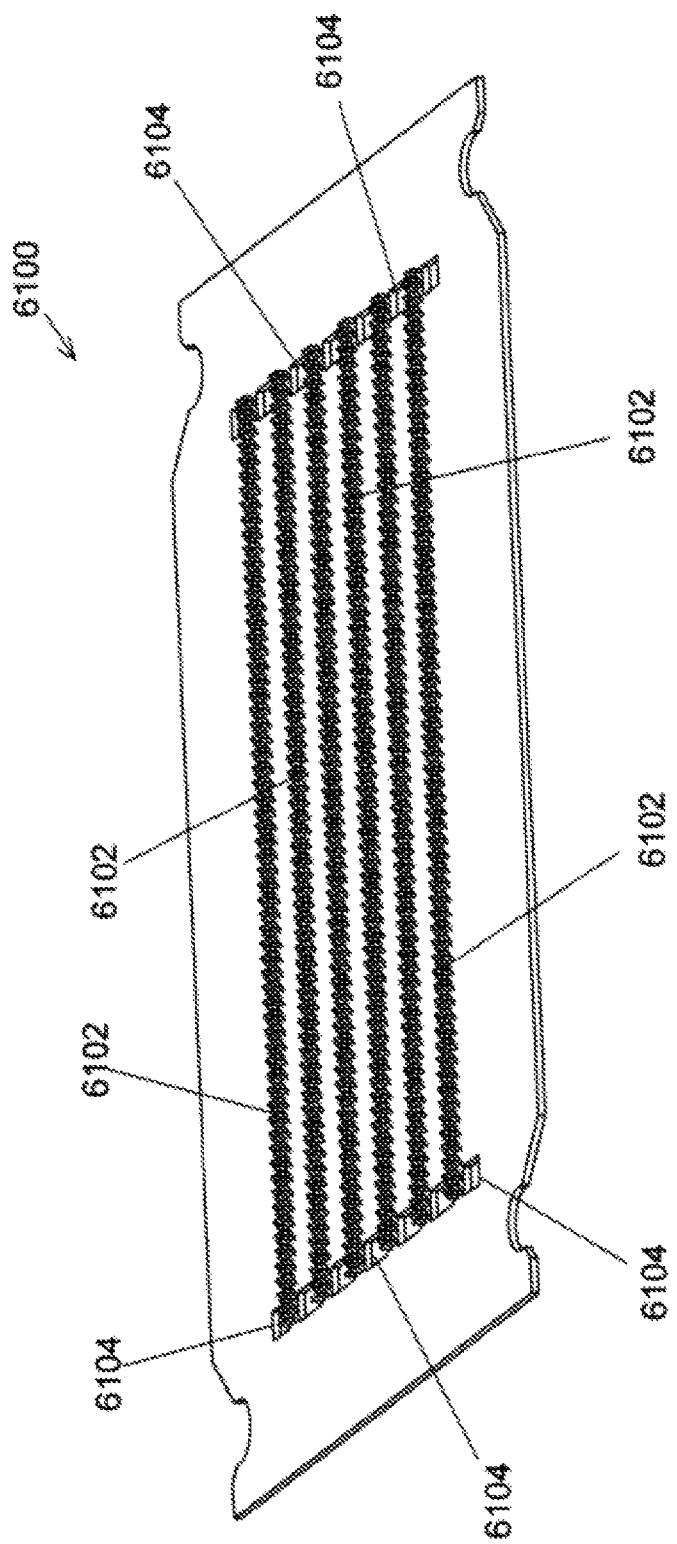
FIG. 101 is a perspective view of another filter lamina for yet another embodiment of a tunable nanofiber diffusion filter.
Figure 102:
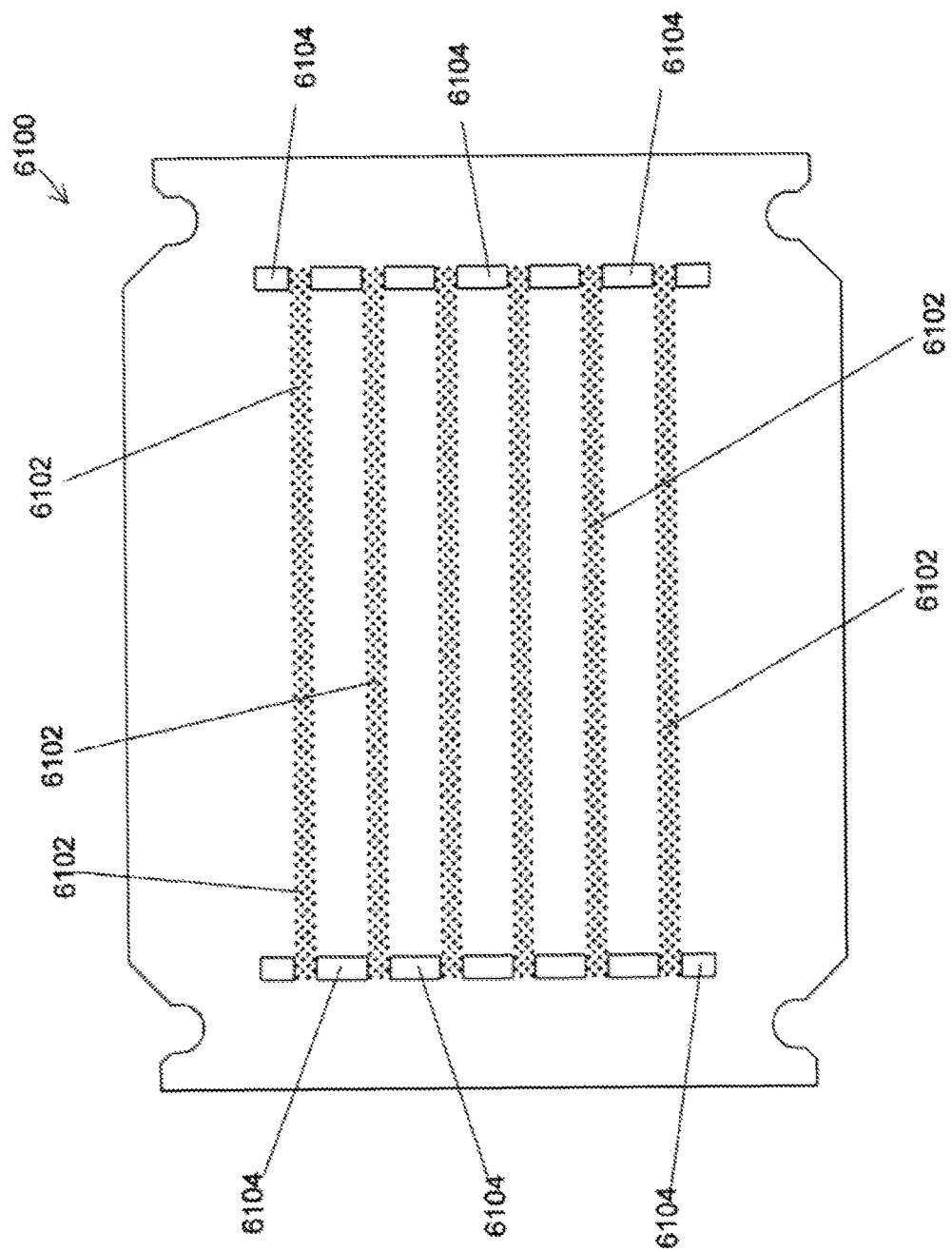
FIG. 102 is a plan view of the filter lamina of FIG. 101.

Accordingly, FIGS. 101 and 102 depict a primary filter lamina 6100 for another embodiment of a tunable nanofiber diffusion filter constructed in accordance with the present disclosure in which blood and dialysate flow through the interlaminar space via parallel but counterflowing flow paths. Primary filter lamina 6100 can have on its upper and lower surfaces symmetrically opposed parallel nanofiber arrays 6102 and slots 6104.

Figure 103:
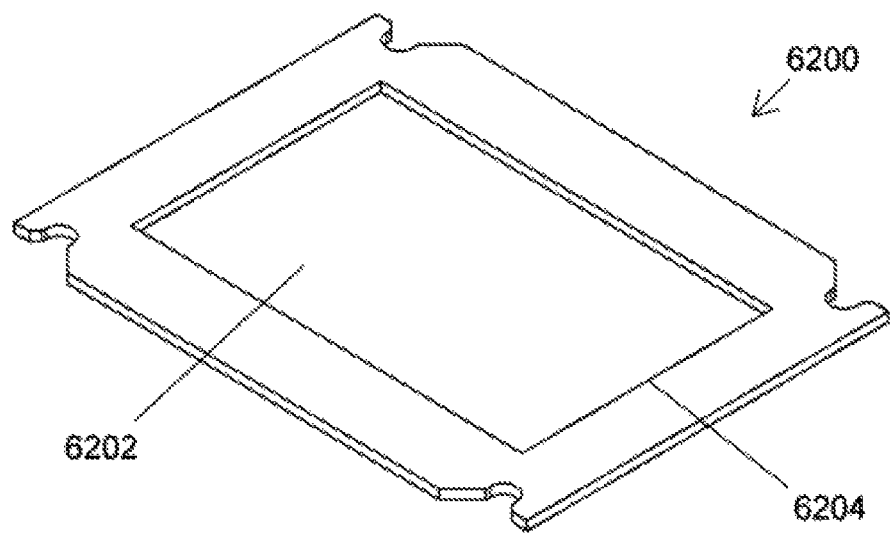
FIG. 103 is a perspective view of a spacer lamina for use with the filter lamina of FIG. 101.
Figure 104:
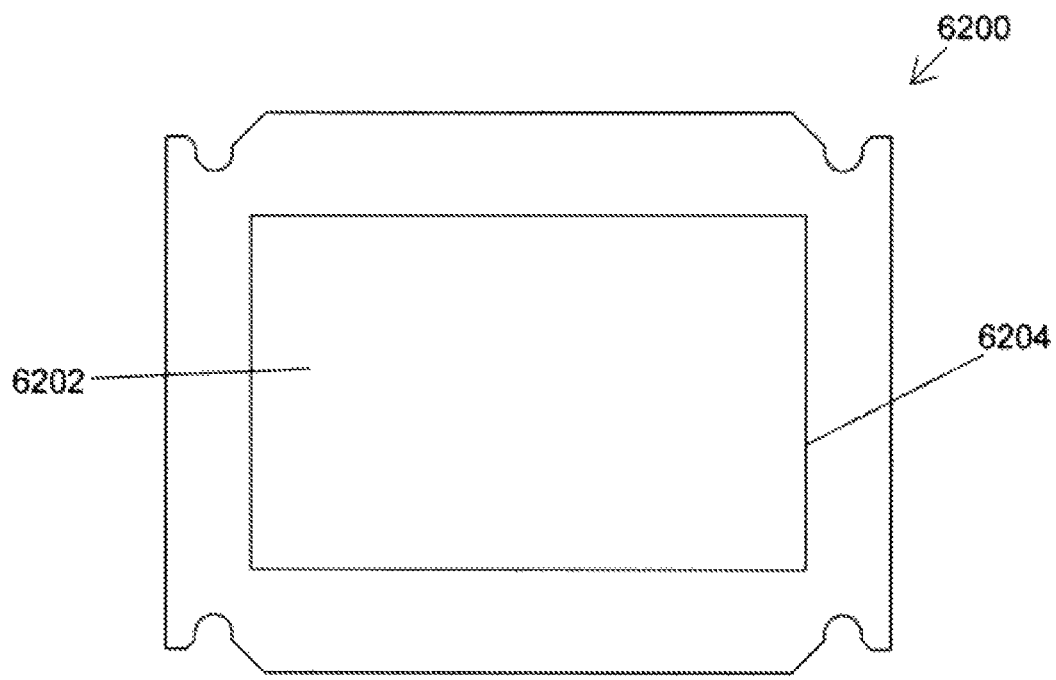
FIG. 104 is a plan view of the spacer lamina of FIG. 103.

FIGS. 103 and 104 depict a spacer lamina 6200 for use with primary filter lamina 6100 in a lamina stack for a tunable nanofiber diffusion filter of the present disclosure. Spacer lamina 6200 has a large central opening 6202 defined by perimeter 6204.

Figure 105:
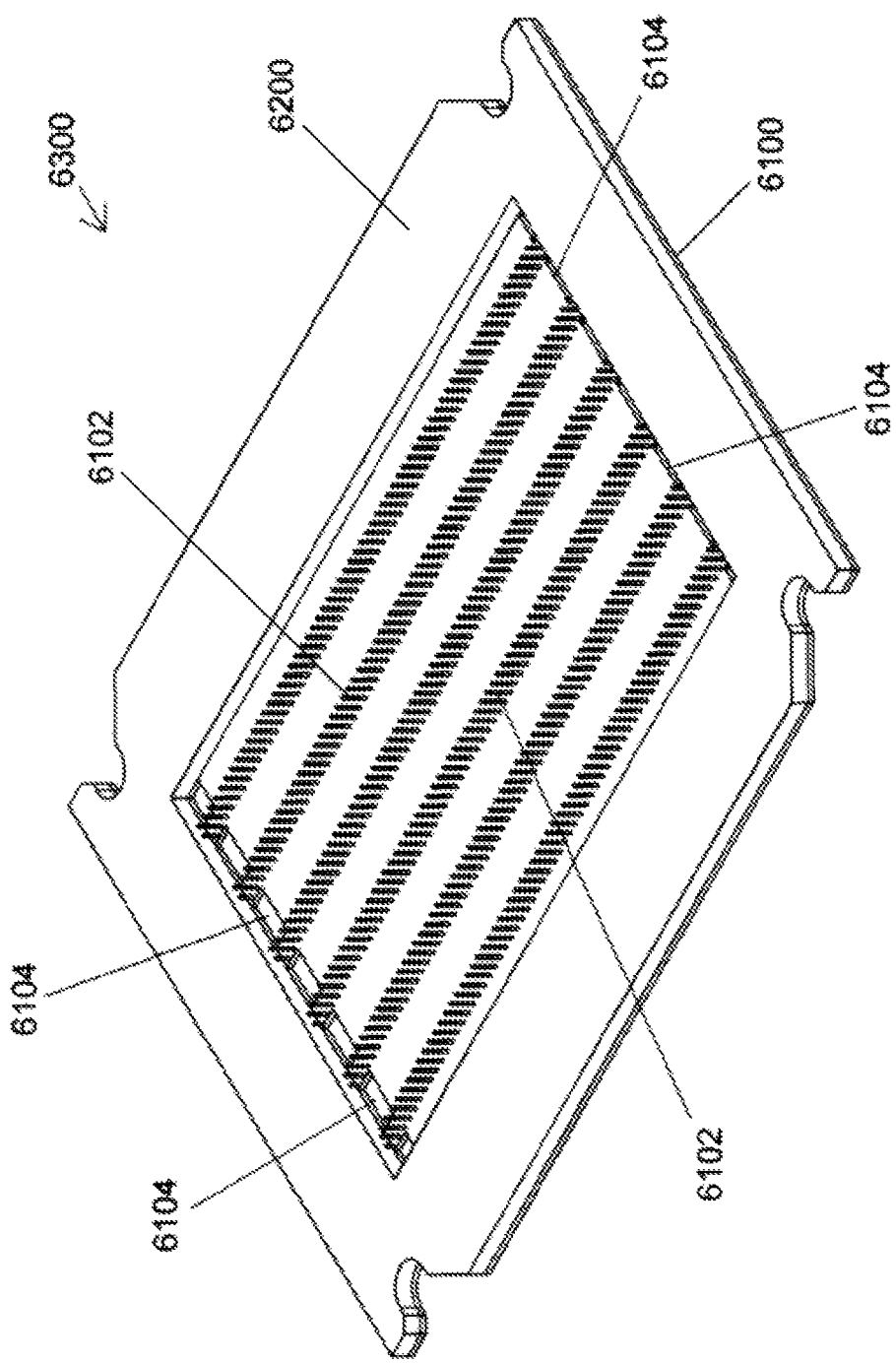
FIG. 105 is a perspective view of a lamina subassembly formed from a spacer lamina of FIG. 103 and a filter lamina of FIG. 101.
Figure 106:
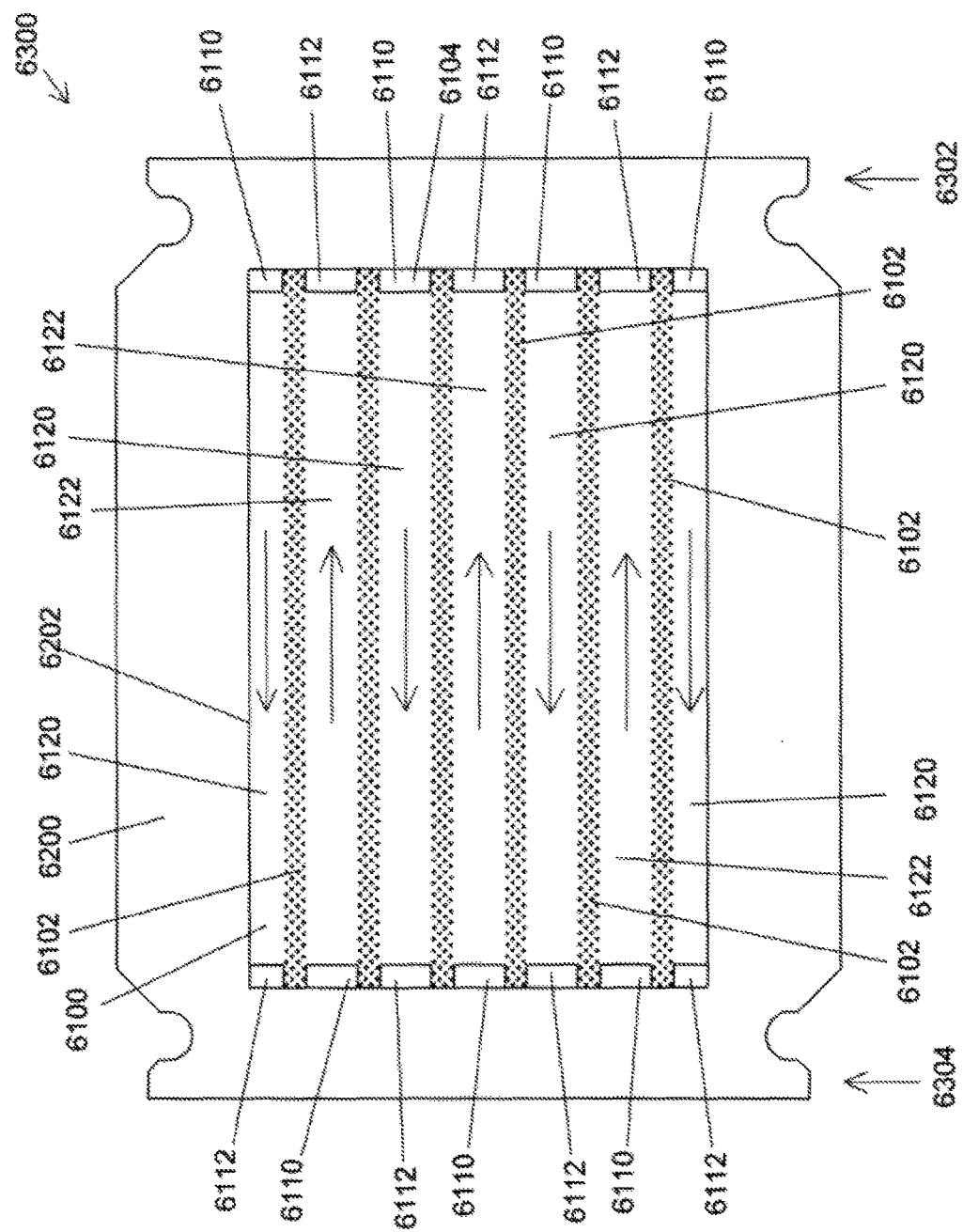
FIG. 106 is a plan view of the lamina subassembly of FIG. 105.

FIGS. 105 and 106 depict a lamina subassembly 6300, the subassembly 6300 being formed from a spacer lamina 6200 and a primary filter lamina 6100. The lamina subassembly 6300 can have a first end 6302 and a second end 6304. Nanofiber arrays 6102 of primary filter lamina 6100 and perimeter 6204 of opening 6202 of spacer lamina 6200 together define alternating first and second channels 6120, 6122 for counterflowing blood and dialysate, with each channel 6120, 6122 having a slot 6104 at each end thereof.

FIG. 106 depicts counterflowing blood and dialysate flow paths (indicated by arrows) in the interlaminar space, which can be defined by the central opening 6202 of the spacer lamina 6200, the bottom surface of an adjacent overlying primary filter lamina 6100, and the upper surface of an adjacent underlying primary filter lamina 6100. The direction of flow in a given channel 6120, 6122 is determined by the pressure differential at the ends of the channel. Each channel has an inflow slot 6110 and an outflow slot 6112 positioned at its opposite ends, slots 6110 and 6112 being formed by slots 6104 of primary filter lamina 6100. First channels 6120 have inflow slots 6110 at first end 6302 of the subassembly 6300. Second channels 6122, positioned between first channels 6120, have inflow slots 6110 at second end 6304 of the subassembly 6300.

Figure 107:
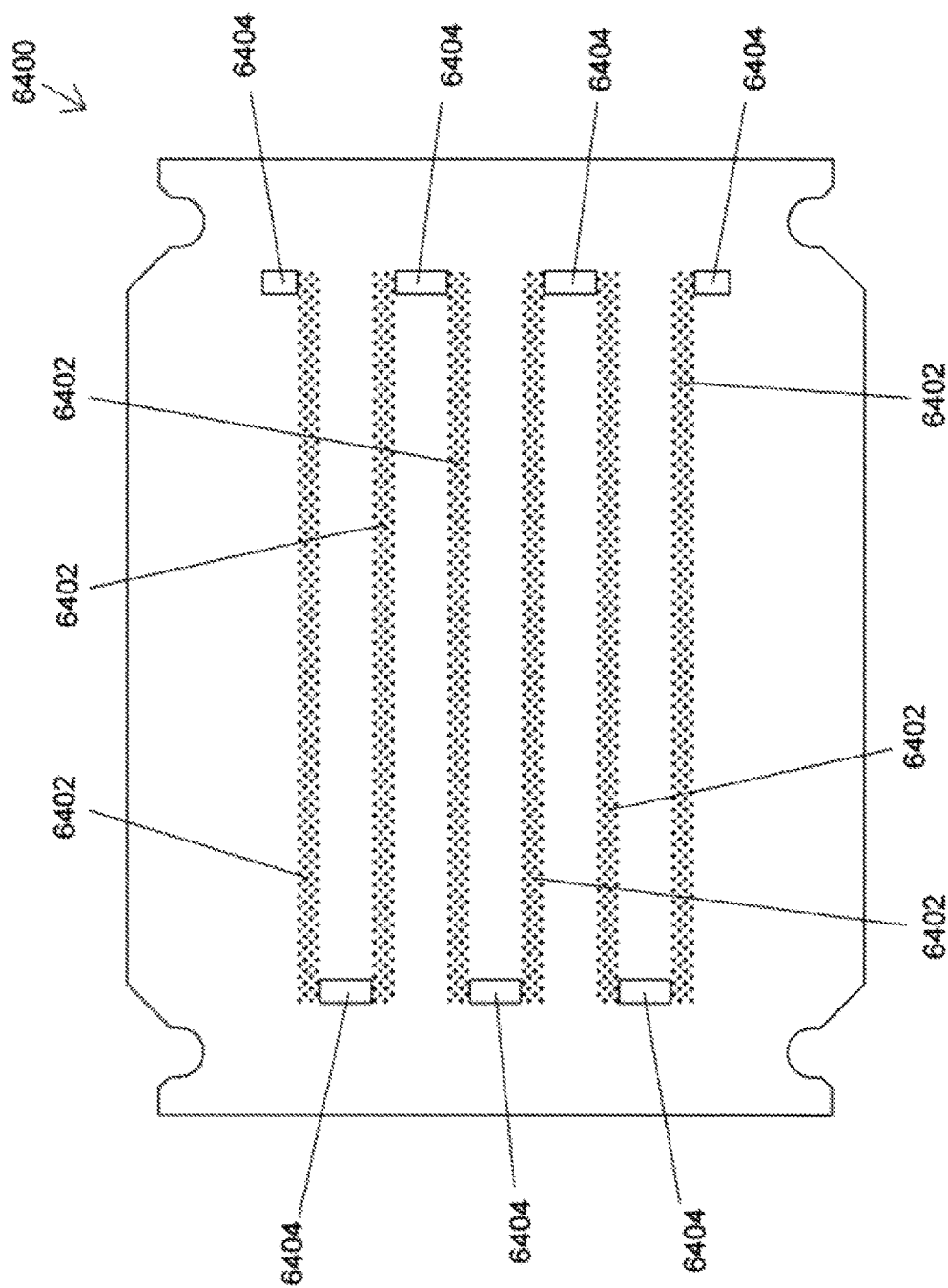
FIG. 107 is a plan view of another filter lamina for use in a lamina stack with the filter lamina of FIG. 101.

FIG. 107 depicts a secondary filter lamina 6400, which is identical in all aspects of form and function to primary filter lamina 6100 except as specifically described herein. Notably, nanofiber arrays 6402 are formed on only one side of secondary filter lamina 6400, secondary filter lamina 6400 has fewer and slots 6404 than primary filter lamina 6100, and the slots 6404 of secondary filter lamina 6400 are not symmetrically opposed. In some embodiments, the slots 6404 of secondary filter lamina 6400 can be positioned as depicted.

Figure 108:
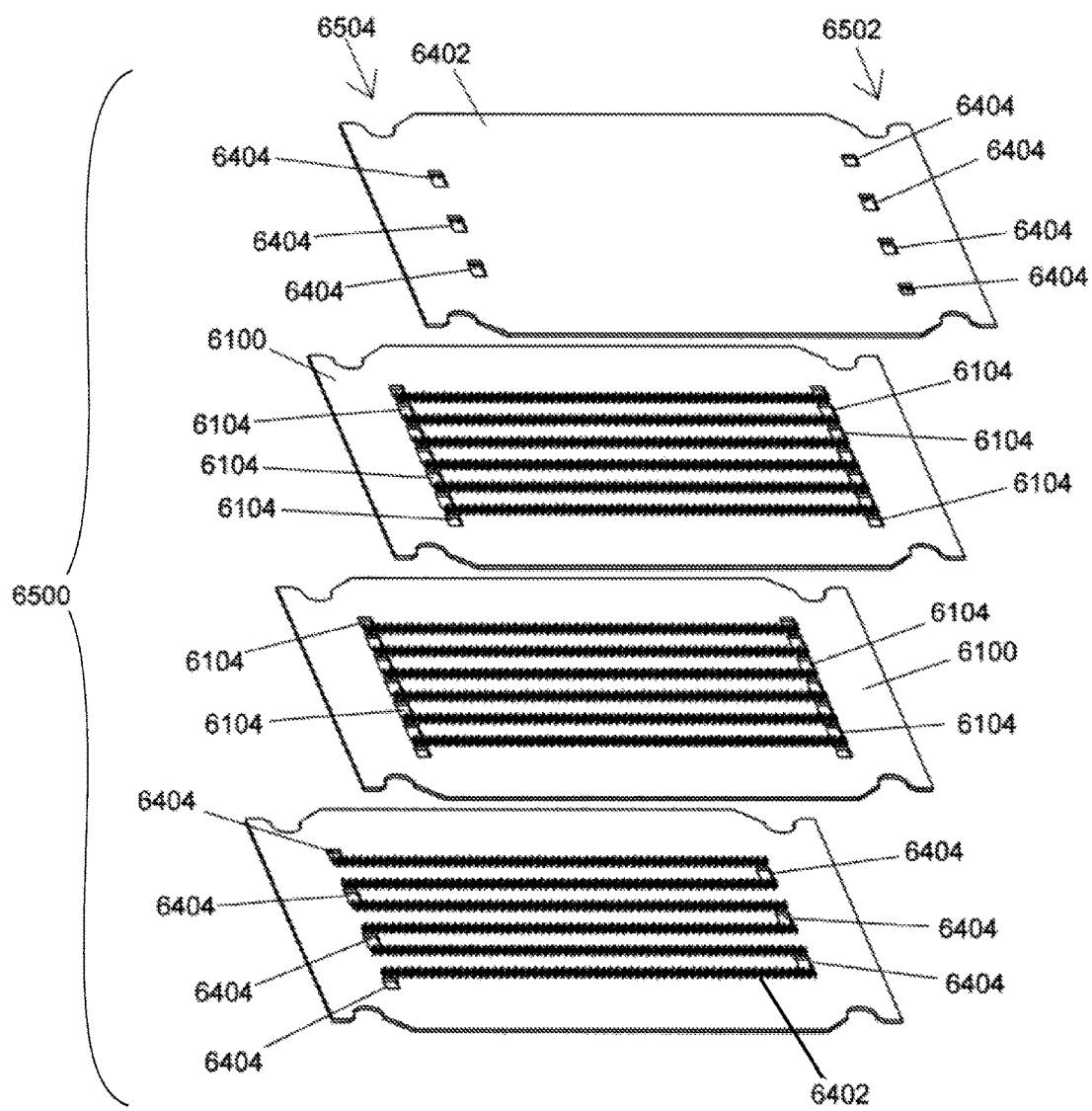
FIG. 108 is an exploded view of a lamina stack for an alternate embodiment of a tunable nanofiber diffusion filter formed from two filter laminas of FIG. 101, three spacer laminas of FIG. 103, and two filter laminas of FIG. 107. Spacer laminas are omitted for clarity.

FIG. 108 depicts a lamina stack 6500 for an embodiment of a tunable nanofiber diffusion filter of the present disclosure. The lamina stack 6500 can be formed of two primary filter laminas 6100 (FIGS. 101 and 102), three spacer laminas 6200 (FIGS. 103 and 104), and two secondary filter laminas 6400 (FIG. 107). Spacer laminas 6200 are not depicted for improved clarity, but should be positioned in stack 6500 between adjacent filter laminas 6100, 6400 in accordance with the principles previously described herein. Slots 6404 of the uppermost secondary filter lamina 6400 align with inflow slots 6110 of the primary filter laminas 6100 (see FIG. 106), and slots 6404 of the bottommost secondary filter lamina 6400 align with outflow slots 6112 of the primary filter laminas 6100.

A first flow path is formed through the lamina stack 6500 by slots 6404 in the uppermost secondary filter lamina 6400 at the first end 6502 of the stack 6500, together with slots 6110, channels 6120, and slots 6112 of lamina subassemblies 6300, and slots 6404 in the lowermost secondary filter lamina 6400 at the second end 6504 of the stack 6500. A second flow path is formed through the lamina stack 6500 by slots 6404 in the uppermost secondary filter lamina 6400 at the second end 6504 of the stack 6500, together with slots 6110, channels 6120, and slots 6112 of lamina subassemblies 6300, and slots 6404 in the lowermost secondary filter lamina 6400 at the first end 6502 of the stack 6500. The first and second flow paths are parallel through the interlaminar spaces but the flow of each is in opposite directions. Nanofiber arrays 6102, 6402 between the first and second flow paths in the interlaminar space can diffuse solutes between fluids in the first flow path and the second flow path.

In another embodiment, the nanofiber arrays 6102 on primary filter laminas 6100 forming a first portion of the lamina stack 6500 can have a first configuration while the nanofiber arrays 6102 on primary filters laminas 6100 forming a second portion of a lamina stack 6500 can have a second configuration such that a first solute can be removed from a fluid passing through the first portion and a second solute can be removed from the fluid in the second portion.

Figure 109:
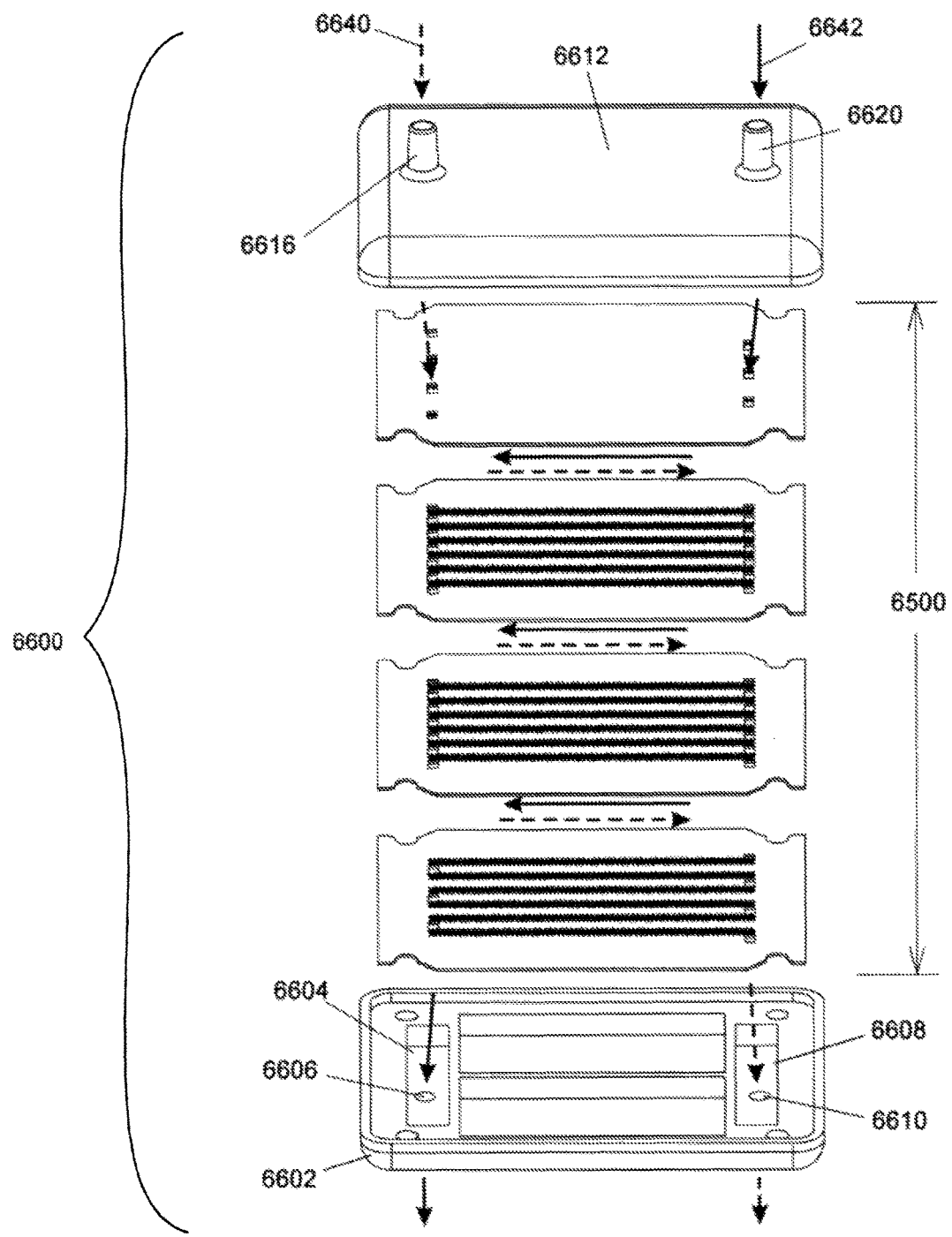
FIG. 109 is an exploded view of an embodiment of a tunable nanofiber diffusion filter comprising the lamina stack of FIG. 108 and two halves of a filter housing.

FIG. 109 depicts an embodiment of a tunable nanofiber diffusion filter 6600 of the present disclosure. The filter 6600 includes the lamina stack 6500 of FIG. 108 contained within housing formed from a lower housing portion 6602 and an upper housing portion 6612. It should be noted that the orientation of the lamina stack 6500 as it is depicted in FIG. 109 is reversed from that shown in FIG. 108 such that the first and second ends 6502, 6504 of the lamina stack 6500 are shown on opposite sides. It should also be noted that the lamina stack 6500 depicted in FIG. 109 includes sufficient primary filter laminas 6100 to illustrate the parallel interlaminar counterflowing flow paths, however, as many additional primary filter laminas 6100 can be used in the stack 6500 as may be needed or desired to satisfy specific filtering requirements for any given application.

Filter 6600 can have a lower housing portion 6602 wherein can be formed a first recess 6604 which receives flow from slots 6404 (FIG. 108) positioned axially adjacent thereto and which conducts the flow via first passage 6606 to a first outflow connector (not shown). Lower housing portion 6602 can also have formed therein a second recess 6608 which receives flow from slots 6404 positioned axially adjacent thereto and which conducts the flow via second passage 6610 to a second outflow connector (not shown). Filter 6600 can also have an upper housing portion 6612, which can be symmetrically identical to lower housing portion 6602 and have formed therein first and second recesses for conducting flow from a first input connector 6616 to slots 6404 with which the first recess is axially aligned, and for conducting flow from a second input connector 6620 to slots 6404 with which the second recess is axially aligned.

First fluid 6640, the flow path of which is depicted by dashed arrows in FIG. 109, enters filter 6600 via first inflow connector 6616 and thereafter flows through the flow path indicated by dashed arrows through lamina stack 6500 and then via second recess 6608 and second passage 6610 to a second outflow connector (not shown). Second fluid 6642, the flow path of which is depicted by solid arrows in FIG. 109, enters filter 6600 via second inflow connector 6620 and thereafter flows through the flow path indicated by solid arrows through lamina stack 6500 and then via first recess 6604 to a first output connector (not shown). The flow of first fluid 6640 and of second fluid 6642 are symmetrically opposite in the interlaminar spaces between adjacent filter laminas of lamina stack 6500.

Filters of the present invention use tuned topographies of freestanding nanofiber arrays extending from portions of filter laminas to separate particles and solutes from fluid streams passing over, across, or through the topographies. A filter of the present disclosure can include filter laminas having a single topography configured to remove a single preselected substance, or filter laminas having two or more different topographies, each optimized to removed a different preselected substance. Additionally, a filter lamina for a filter disclosed herein can include a single topography tuned to remove a single preselected substance, or two or more topographies on the same filter lamina, each topography configured to remove a different substance. In some embodiments filter laminas can also, or alternatively, include one or more arrays of nanopores to allow outgassing of selected substances from the fluid stream. The unique custom configurations which may be constructed using the principles previously herein described allow filters of the present disclosure to accommodate a wide range of fluids, including any liquid or gas which can be passed through such a filter.

In certain embodiments, the filters disclosed herein can be diffusion filters having one or more arrays of freestanding nanofibers that form a semi-permeable membrane which allows one or more preselected solutes to diffuse from a second fluid stream to a first fluid stream. As with the embodiments previously described, the nanofiber arrays between the flow paths of the first and second fluid streams may have a single configuration in a filter so as to remove a single solute or family of solutes, or may have two or more configurations so as to remove two or more selected solutes. A variety of flow paths are anticipated. These may include parallel axial flow paths for the two fluids, parallel axial counter-flowing fluid paths, flow paths in which a first fluid flows axially and a second fluid flows through the interlaminar spaces between adjacent filter laminas, or flow paths in which both fluids flow through the interlaminar spaces between adjacent filter laminas. In each case the two flow paths are separated by nanofiber arrays which allow diffusion of one or more selected solutes from a second fluid stream to a first fluid stream.

The optimal flow configuration for a given diffusion filter constructed in accordance with the principles disclosed herein can be determined by, among other factors, the viscosity of each fluid, the relative required flow rates and velocities for each fluid, and the acceptable back pressure for each fluid source. For example, diffusion filters of the present invention may be used for dialysis wherein certain solutes are removed from the blood. As referenced above, the first fluid can be dialysate and the second fluid can be blood. In some embodiments, such as those exemplified by filter 2800 (FIG. 78), filter 4000 (FIG. 84) and filter 6600 (FIG. 109), the dialysate can be pumped through the filter. In other embodiments, such as that exemplified by filter 5500 (FIG. 97), the filter may be submerged in a dialysate filled vessel. The configuration of the first (dialysate) flow path can be constructed to achieve optimal flow rates for each of the above filter requirements using techniques previously herein described.

Similarly, in some applications, it can be desirable for the heart of a patient to act as the pump for the blood flow. This would necessitate that the back pressure of the filter be appropriately low. If the heart of a patient is unable to provide the pressure required to achieve optimal blood flow through a filter, an external pump may be used. If an external pump is used the filter can be configured to advantageously use the increased pressure to achieve optimal performance. The design and construction of an optimized filter for these varying requirements may be accomplished using methods and principles previously herein described.

Additionally, certain patients with unique medical conditions can require removal from their blood of certain solutes which are not present in the absence of the medical conditions. Using the principles and methods described previously herein, a diffusion filter can be constructed in which laminas configured to remove these solutes are included in the filter. Indeed, the methods and principles disclosed herein enable the construction of highly efficient dialysis filters tailored to meet the unique requirements of any individual patient.

Thus, although there have been described particular embodiments of the present invention of new and useful tunable nanofiber filters, it is not intended that such referenced be construed as limitations upon the scope of the invention.

The invention claimed is:

1. A filter device, comprising:
a housing defining an interior space, the housing having defined therein an inlet and an outlet, the inlet and outlet each in fluid communication with the interior space;
a plurality of filter laminas disposed within the interior space, each filter lamina including an upper surface, a lower surface, a first peripheral portion, a second peripheral portion opposite the first peripheral portion, a central region between the first and second peripheral portions, and an aperture defined through the first peripheral portion, the plurality of filter laminas arranged in a stack wherein:
the aperture of the uppermost lamina is in fluid communication with the inlet,
the aperture of the lowermost lamina is in fluid communication with the outlet, and
the opposing surfaces of adjacent filter laminas define a portion of an interlaminar flow space extending between said opposing surfaces, the flow space in fluid communication with the apertures of the corresponding adjacent filter laminas to form a continuous flow passage extending through the lamina stack from the inlet to the outlet; and
an array of nanofibers extending from a portion of each filter lamina into the flow passage such that a fluid flowed through the flow passage flows across a portion of said array.

2. The filter device of claim 1, wherein the array of nanofibers extends into the flow passage from a portion of the upper surface of each filter lamina underlying the uppermost lamina, and a portion of the lower surface of each filter lamina overlying the lowermost lamina.

3. The filter device of claim 1, wherein the filter laminas are arranged in the stack such that the first peripheral portion of each filter lamina is proximal to the second peripheral portion of each corresponding adjacent filter lamina and the flow passage extends through the stack in alternating directions between adjacent filter laminas from the inlet to the outlet.

4. The filter device of claim 3, wherein the first and second peripheral portions are a first end and a second end opposite the first end, or a first longitudinal side and a second longitudinal side opposite the first longitudinal side.

5. The filter device of claim 4, wherein the plurality of filter laminas comprises a plurality of primary filter laminas and a secondary filter lamina, and wherein the uppermost filter lamina in the stack is the secondary lamina.

6. The filter device of claim 5, further comprising:
a flow channel formed in the upper surface of each primary lamina, the flow channel including a downstream end and an upstream end opposite the downstream end, said aperture extending through a portion of the downstream end, the flow channel defining a portion of the interlaminar flow space;
wherein the primary filter laminas are arranged in the stack such that the upstream end of each flow channel is in fluid communication with the aperture of a corresponding adjacent overlying filter lamina.

7. The filter device of claim 4, further comprising a plurality of spacer laminas having an aperture defined through a central portion thereof, each spacer lamina of the plurality disposed between a corresponding pair of adjacent filter laminas such that the central aperture of each spacer lamina defines a portion of the interlaminar flow space between said corresponding pair of adjacent filter laminas.

8. The filter device of claim 7, wherein the central region of the upper surface of each filter lamina underlying the uppermost lamina comprises a plurality of protrusions, the protrusions extending upwardly into a portion of the interlaminar flow space defined by the central aperture of a corresponding overlying adjacent spacer lamina.

9. The filter device of claim 7, further comprising a plurality of longitudinal slots defined though a portion of the central region of each filter lamina, the slots in fluid communication with the interlaminar flow space to form a flow path extending axially through the lamina stack from the longitudinal slots of the uppermost filter lamina to the longitudinal slots of the lowermost filter lamina.

10. The filter device of claim 9, wherein:
the array of nanofibers is a plurality of symmetrically opposed arrays of nanofibers formed on a portion of the upper and lower surfaces of each filter lamina adjacent to the longitudinal slots; and
a first fluid flowed through the flow passage is filtered of a solute by diffusion of the solute across a portion of the array of nanofibers to a second fluid flowed through the flow path.

11. A diffusion filter for dialysis, comprising:
a housing defining an interior space, the housing having defined therein first and second inlets and first and second outlets, the inlets and outlets in fluid communication with the interior space;
an assembly of laminas disposed within the interior space, the lamina assembly comprising:
a plurality of filter laminas, each filter lamina including a first and second slot defined therethrough, and
a plurality of spacer laminas, each spacer lamina having a central aperture defined therethrough;
the filter and spacer laminas arranged alternatingly in a stack wherein the central aperture of each spacer lamina defines an interlaminar space between opposing surfaces of corresponding adjacent filter laminas, the interlaminar space in fluid communication with the first and second slots of said adjacent filter laminas such that the first slots form a first flow path extending through the stack from the first inlet to the first outlet, and the second slots form a second flow path extending through the stack from the second inlet to the second outlet;
a plurality of diffusion zones formed in the interlaminar space, each diffusion zone comprising an array of nanofibers extending into the interlaminar space from a portion of a corresponding adjacent filter lamina such that the array of nanofibers separates the first and second flow paths throughout the interlaminar flow space;
wherein a first fluid flowed through the first flow path interfaces across said diffusion zones with a second fluid flowed through the second flow path.

12. The diffusion filter of claim 11, wherein the first slot is a pair of parallel first slots defined through a central portion of each filter lamina, and the second slot is positioned between the first slots.

13. The diffusion filter of claim 12, wherein each first slot has a first slot width, and the second slot has a second slot width greater than the first slot width such that the second fluid flows through the second flow path at a greater rate than the first fluid flows through the first flow path.

14. The diffusion filter of claim 12, further comprising:
a plurality of first apertures defined through a portion of each filter lamina proximal to a lateral end of the first slots, the first apertures forming a secondary flow path for the first fluid; and
a plurality of second apertures defined through a portion of each filter lamina proximal to a lateral end of the second slots, the second apertures forming a secondary flow path for the second fluid;
wherein the first and second apertures create gradients within the diffusion zones.

15. The diffusion filter of claim 12, wherein the first and second flow paths are substantially parallel and extend substantially axially through the stack at an angle normal to a reference plane containing the laminas.

16. The diffusion filter of claim 11, wherein the first slot is defined through a peripheral portion of each filter lamina, and the second slot is a plurality of parallel second slots defined through a central portion of each filter lamina circumscribed by the peripheral portion, the first slot perpendicular to the plurality of second slots.

17. The diffusion filter of claim 16, wherein the first flow path extends through the stack in alternating directions through the interlaminar space between adjacent filter laminas from the first inlet to the first outlet, and the second flow path extends axially through the stack from the second inlet to the second outlet at an angle substantially normal to a reference plane containing the laminas.

18. The diffusion filter of claim 11, wherein when said first fluid interfaces with said second fluid across said diffusion zone, a solute is filtered from the first fluid to the second fluid by diffusion of the solute across said diffusion zone.

19. The diffusion filter of claim 11, wherein:
the first slot is a plurality of first slots defined through a first end of each filter lamina, and the second slot is a plurality of second slots defined through a second end of each filter lamina opposite the first end;
the filter laminas are arranged in the stack such that the first end of each filter lamina is proximal to the second end of each corresponding adjacent filter lamina and the first and second flow paths extends through the stack in alternating directions between adjacent filter laminas from the corresponding inlet to the corresponding outlet; and
the diffusion zones are configured to form a plurality of flow channels extending through the interlaminar space between the first and second ends of corresponding adjacent filter laminas.

20. The diffusion filter of claim 19, wherein the first and second flow paths counterflow through the interlaminar space of the stack in alternating directions between adjacent filter laminas from the corresponding inlet to the corresponding outlet.

21. The diffusion filter of claim 11, wherein:
the first slot is defined through a first end of each filter lamina opposite a second end, and the second slot if a pair of lateral slots defined through opposing sides of each filter lamina between the first and second ends, the pair of second slots perpendicular to the first slot;
at least one filter lamina of the plurality is a secondary filter lamina having an array of nanoholes defined through a central portion thereof between the first and second ends and opposing sides, the array of nanoholes in fluid communication with the aperture of a spacer lamina; and the first flow path extends through the stack in alternating directions through the interlaminar space between adjacent filter laminas from the first inlet to the first outlet, and the second flow path extends axially through the stack from the second inlet to the second outlet at an angle substantially normal to a reference plane containing the laminas.

22. A filter media comprising an assembly of filter laminas, each filter lamina including an upper surface, a lower surface, an array of nanofibers form on a portion thereof, and an aperture extending from the upper surface to the lower surface, the filter laminas arranged in a stacked orientation wherein the apertures define a portion of a flow passage extending through the assembly and the nanofibers extend into a portion of the flow passage to form a nanoscale topography therein such that when a fluid containing a retentate is flowed through the flow passage, the retentate is filtered from the fluid.

\* \* \* \* \*